United States Patent
Tour et al.

(10) Patent No.: US 11,970,399 B2
(45) Date of Patent: Apr. 30, 2024

(54) THREE-DIMENSIONAL (3D) PRINTING OF GRAPHENE MATERIALS

(71) Applicant: WILLIAM MARSH RICE UNIVERSITY, Houston, TX (US)

(72) Inventors: James M. Tour, Bellaire, TX (US); Junwei Sha, Tianjin (CN); Yilun Li, Sugar Land, TX (US); Jordan Miller, Houston, TX (US); Ian Kinstlinger, Solon, OH (US); Savannah Cofer, Houston, TX (US); Yieu Chyan, Houston, TX (US)

(73) Assignee: William Marsh Rice University, Houston, TX (US)

( * ) Notice: Subject to any disclaimer, the term of this patent is extended or adjusted under 35 U.S.C. 154(b) by 962 days.

(21) Appl. No.: 16/317,404

(22) PCT Filed: Jul. 12, 2017

(86) PCT No.: PCT/US2017/041768
§ 371 (c)(1),
(2) Date: Jan. 11, 2019

(87) PCT Pub. No.: WO2018/017369
PCT Pub. Date: Jan. 25, 2018

(65) Prior Publication Data
US 2019/0308880 A1   Oct. 10, 2019

Related U.S. Application Data

(60) Provisional application No. 62/361,412, filed on Jul. 12, 2016.

(51) Int. Cl.
*B33Y 10/00* (2015.01)
*C01B 32/184* (2017.01)
(Continued)

(52) U.S. Cl.
CPC ............ *C01B 32/184* (2017.08); *B33Y 10/00* (2014.12); *C01B 32/186* (2017.08);
(Continued)

(58) Field of Classification Search
None
See application file for complete search history.

(56) References Cited

U.S. PATENT DOCUMENTS

2012/0077020 A1 * 3/2012 Muramatsu ............ B82Y 40/00
                                                      428/319.1
2014/0110049 A1    4/2014 Yuen et al.
(Continued)

FOREIGN PATENT DOCUMENTS

CN      104401968 A       3/2015
CN      104401968 B   *   3/2016
(Continued)

OTHER PUBLICATIONS

Effect of Laser Scanning Speed on the Wear Behavior of Nano-SiC-Modified Fe/WC composite coatings by Laser Remelting. (Year: 2018).*
(Continued)

*Primary Examiner* — Farah Taufiq
(74) *Attorney, Agent, or Firm* — Dickinson Wright PLLC; Ross Spencer Garsson

(57) ABSTRACT

Three-dimensional (3D) printing of graphene materials and methods and apparatuses for making same. In some embodiments, combined metal powder and carbon growth sources (such as powder Ni and sucrose) are utilized in the 3D printing process. In other embodiments, metal powders with binders (such as powder Ni and a polymer bases binder) are utilized in the 3D printing process. The metal in the resulting 3D printed composite material can then be etched or otherwise removed yielding the 3D printed graphene materials.

31 Claims, 55 Drawing Sheets

(51) Int. Cl.
- *C01B 32/186* (2017.01)
- *C01B 32/194* (2017.01)
- *H01B 1/04* (2006.01)
- *H01B 13/00* (2006.01)
- *H01G 11/24* (2013.01)
- *H01G 11/26* (2013.01)
- *H01G 11/32* (2013.01)
- *H01G 11/44* (2013.01)
- *H01G 11/86* (2013.01)

(52) U.S. Cl.
CPC ............ *C01B 32/194* (2017.08); *H01B 1/04* (2013.01); *H01B 13/0016* (2013.01); *H01B 13/0036* (2013.01); *H01G 11/24* (2013.01); *H01G 11/26* (2013.01); *H01G 11/32* (2013.01); *H01G 11/44* (2013.01); *H01G 11/86* (2013.01); *C01B 2204/22* (2013.01); *C01B 2204/26* (2013.01); *C01B 2204/32* (2013.01); *C01P 2002/01* (2013.01); *C01P 2002/72* (2013.01); *C01P 2002/82* (2013.01); *C01P 2004/03* (2013.01); *C01P 2004/24* (2013.01); *C01P 2006/12* (2013.01); *C01P 2006/17* (2013.01); *C01P 2006/40* (2013.01); *C01P 2006/90* (2013.01); *Y02E 60/13* (2013.01)

(56) References Cited

U.S. PATENT DOCUMENTS

2014/0255776 A1* 9/2014 Song ............... H01M 4/602
  427/508
2016/0271843 A1* 9/2016 Lee ............... B29C 43/003
2017/0327379 A1* 11/2017 Ghimire ............ C01B 32/184

FOREIGN PATENT DOCUMENTS

CN  104668554 B  *  3/2017
WO  2015175060 A2  11/2015
WO  2016066843 A1  5/2016

OTHER PUBLICATIONS

Micro laser-milling of graphite: Analysis of process parameters (Year: 2010).*
Authorized Officer Simin Baharlou; International Preliminary Report on Patentability; dated Jan. 24, 2019; 16 pages.
XP-002776645; WPI/2017 Clarivate Analytics; 2 pages.
Munoz-Manneken, Toni; International Search Report and Written Opinion; dated Feb. 26, 2018; 25 pages.

* cited by examiner

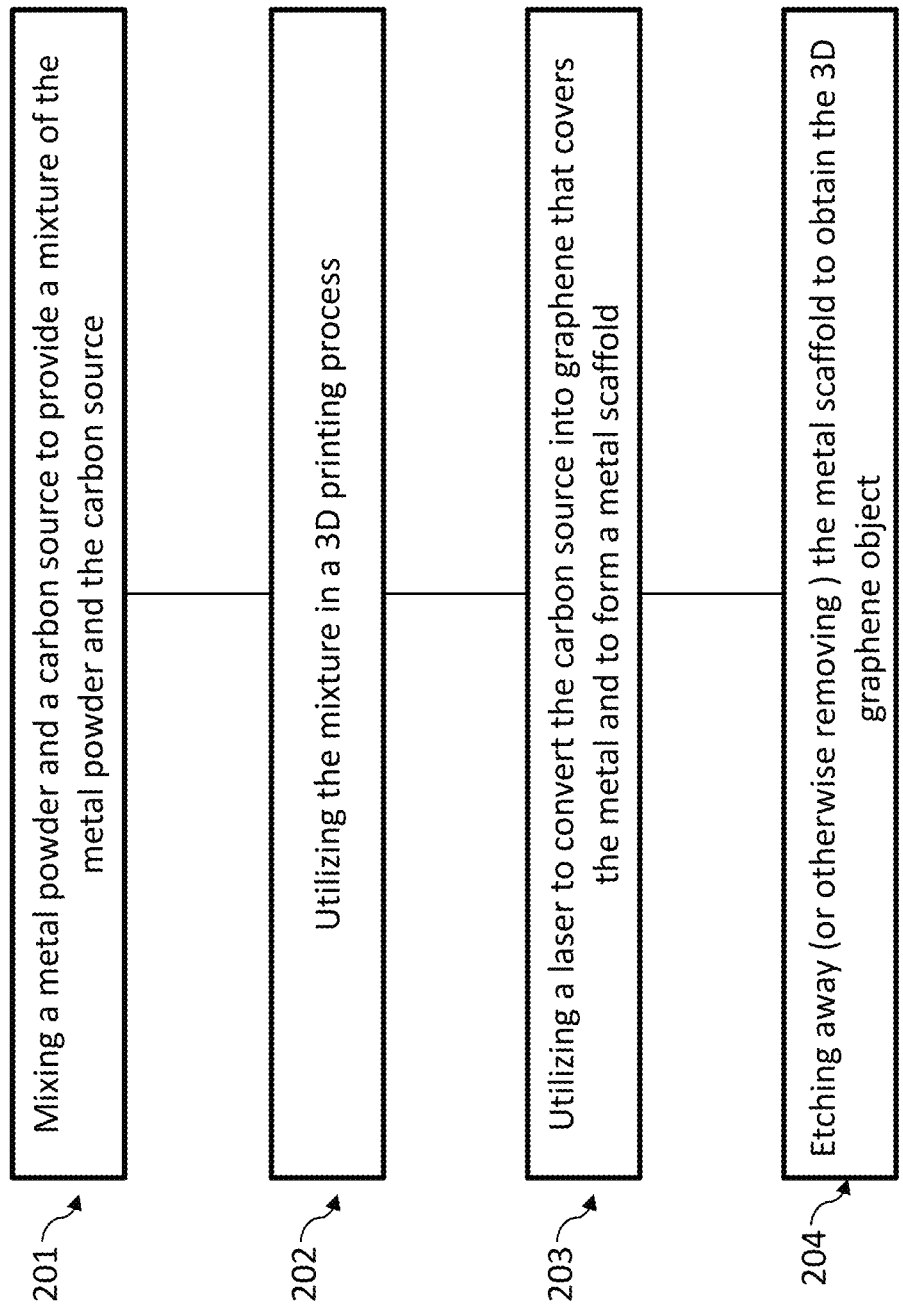

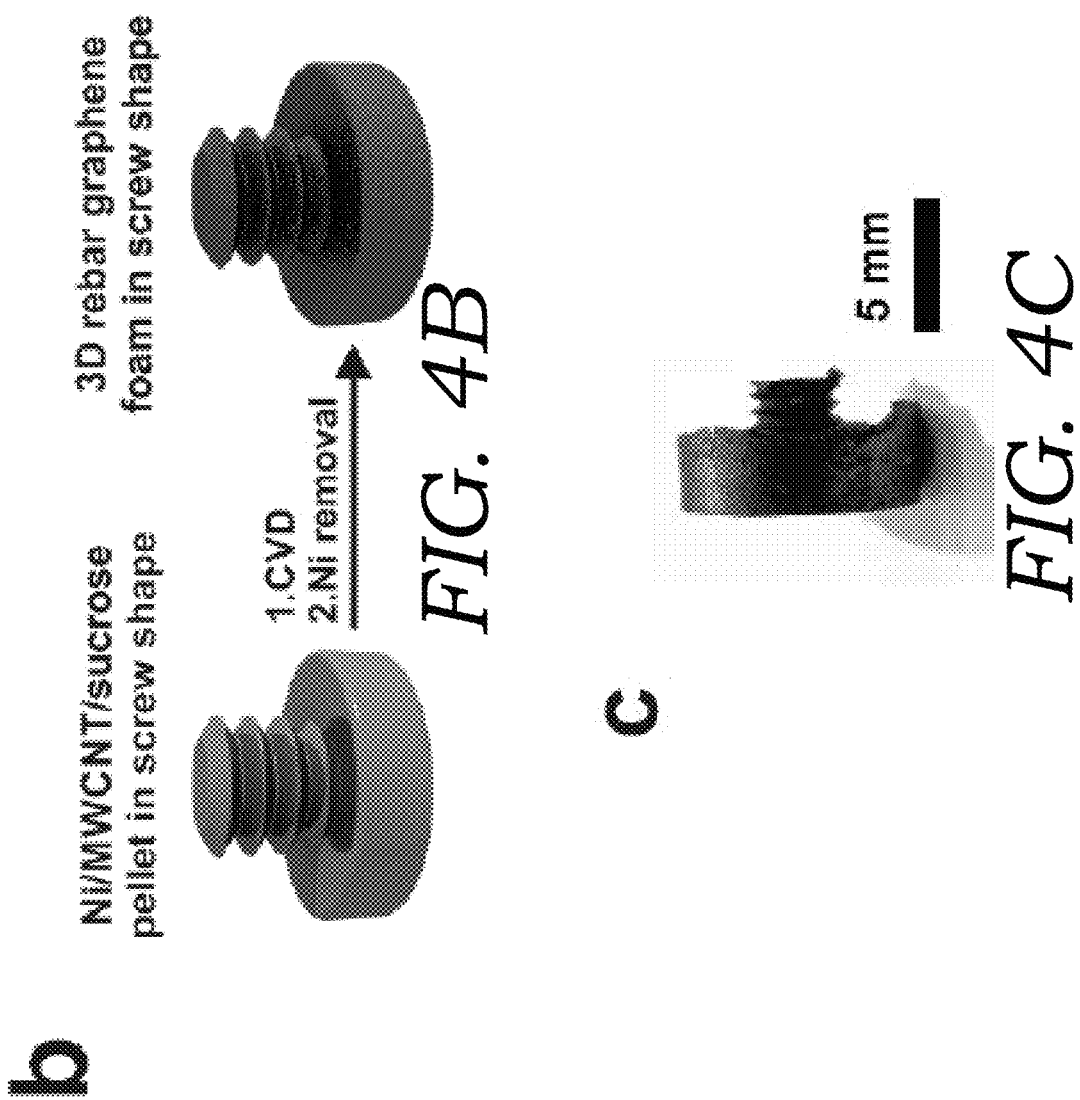

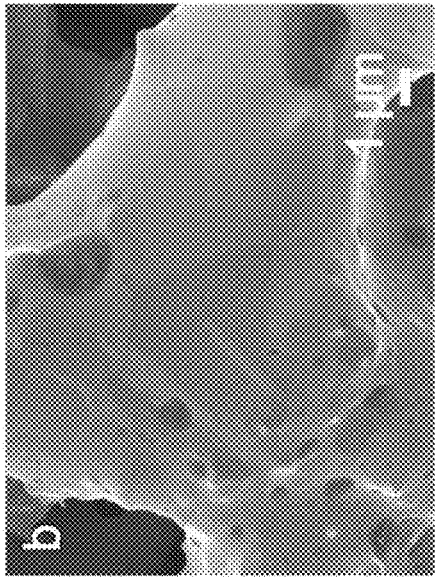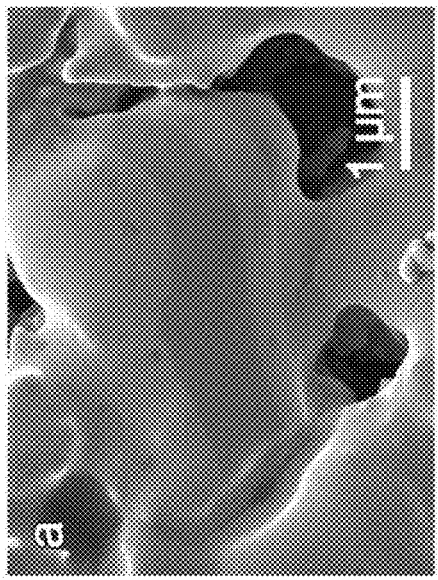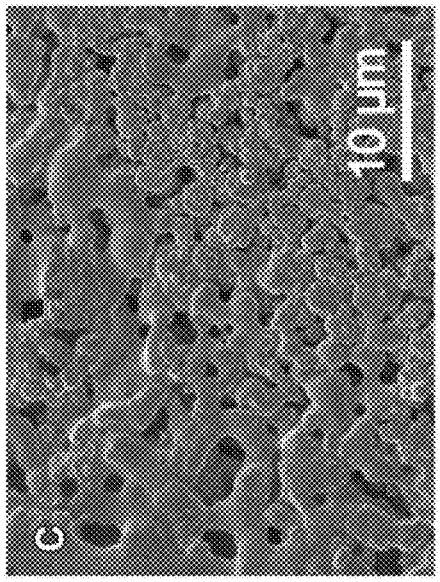

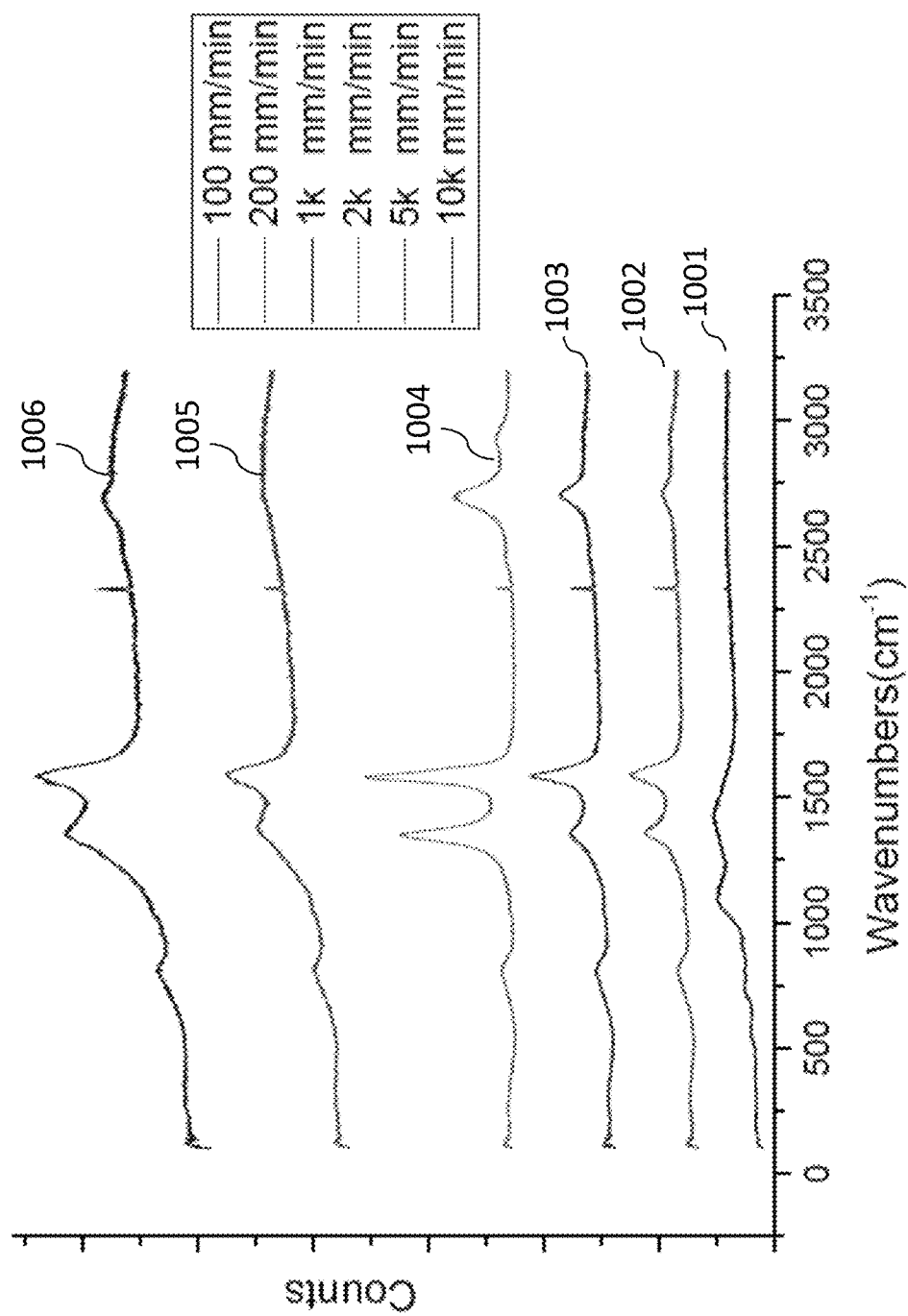

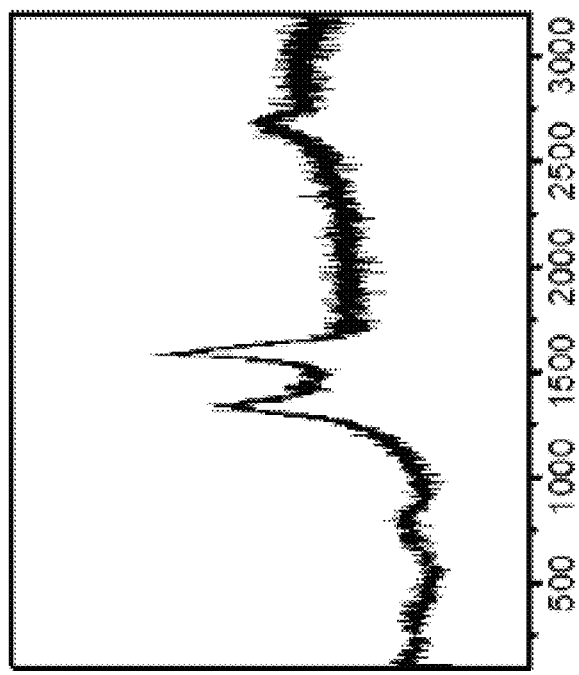
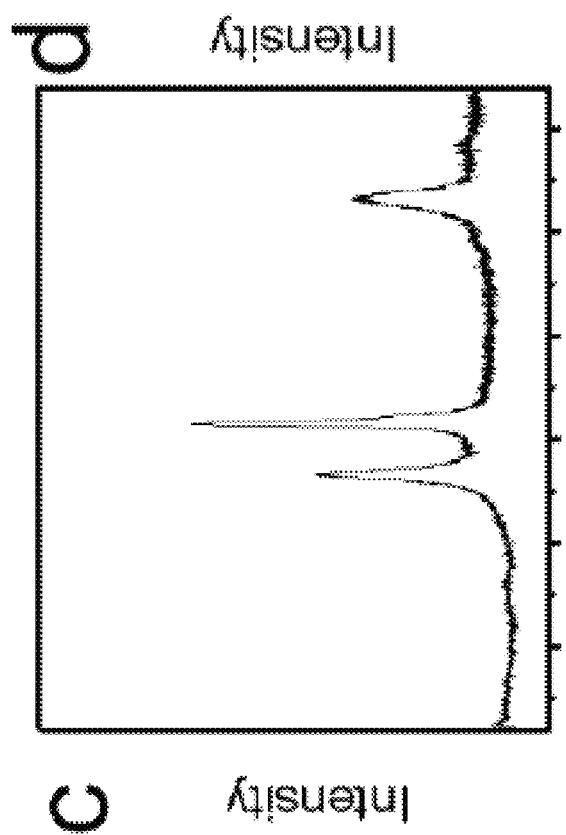
FIG. 16C
FIG. 16D

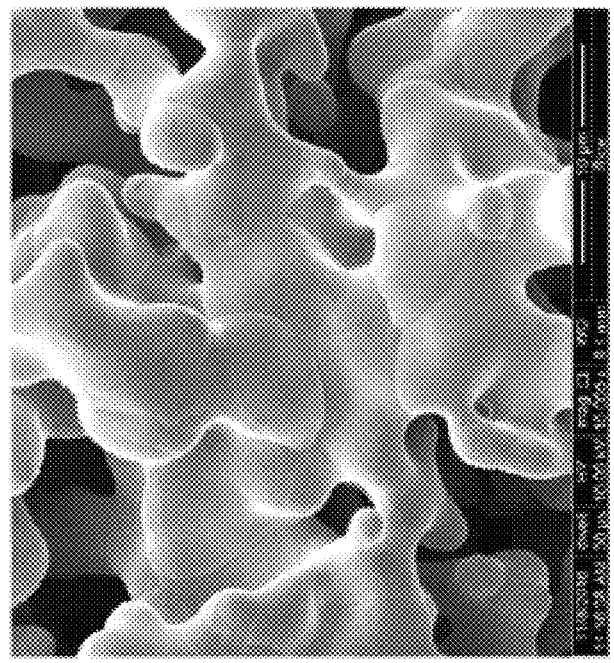
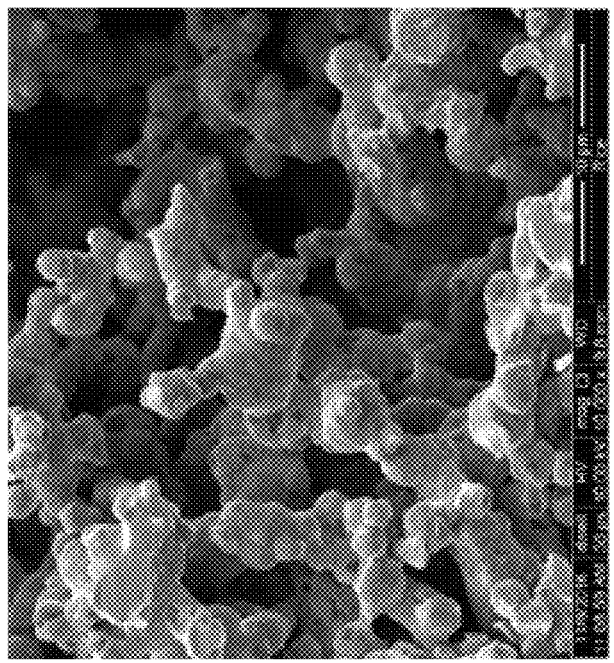
FIG. 17A
FIG. 17B

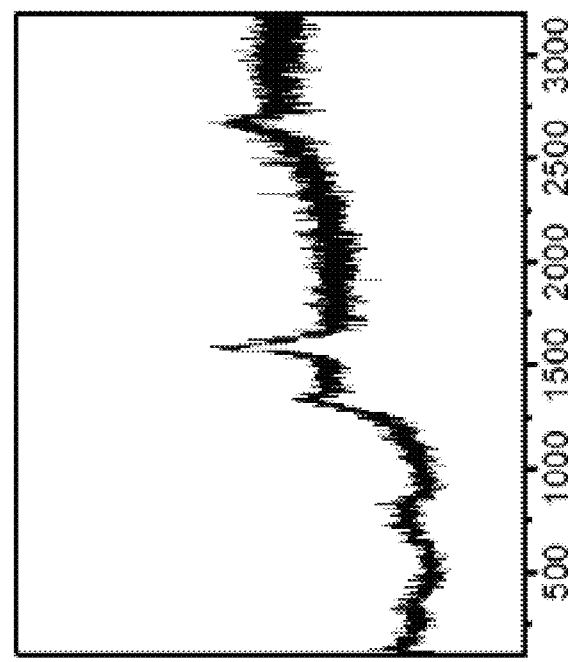
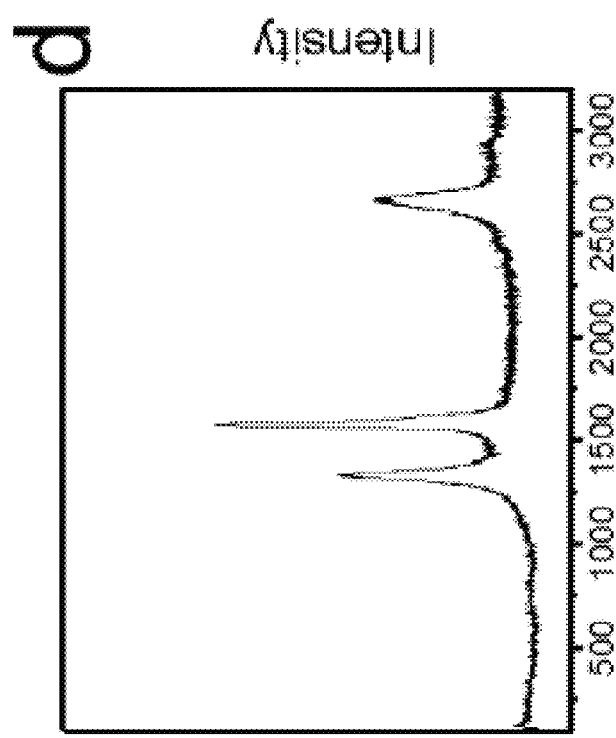
FIG. 17C
FIG. 17D c d

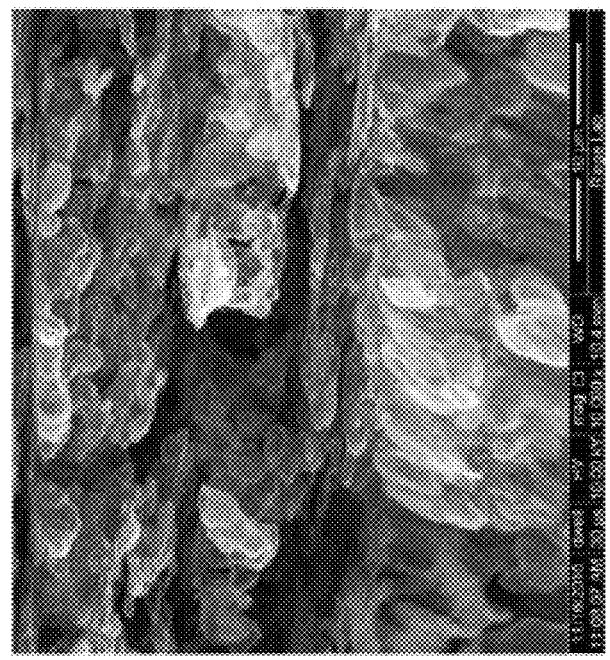
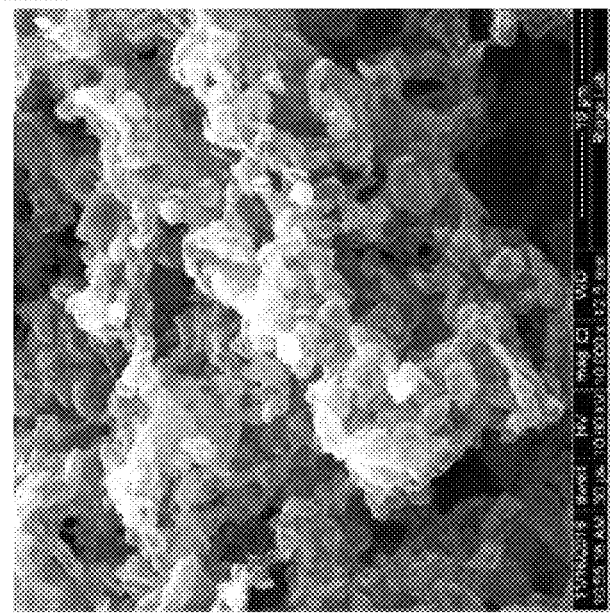
FIG. 19B
FIG. 19A

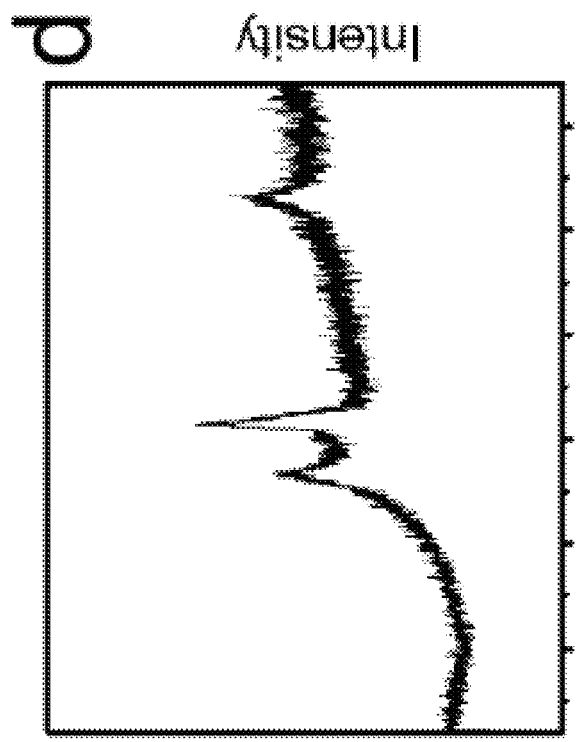
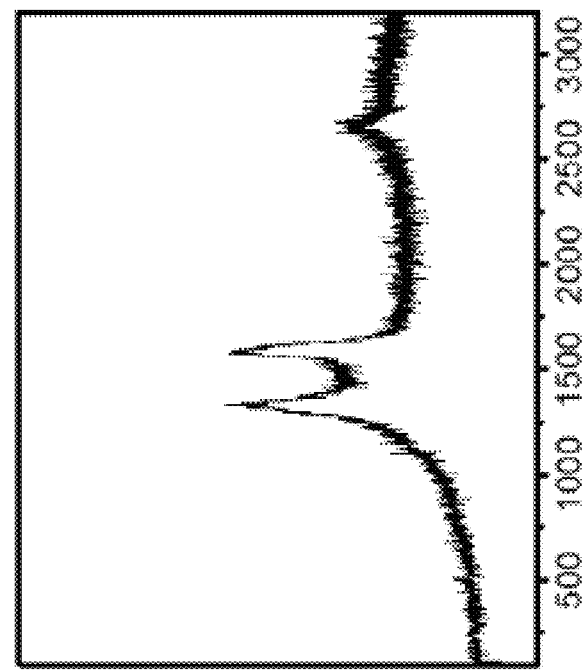
FIG. 19C
FIG. 19D

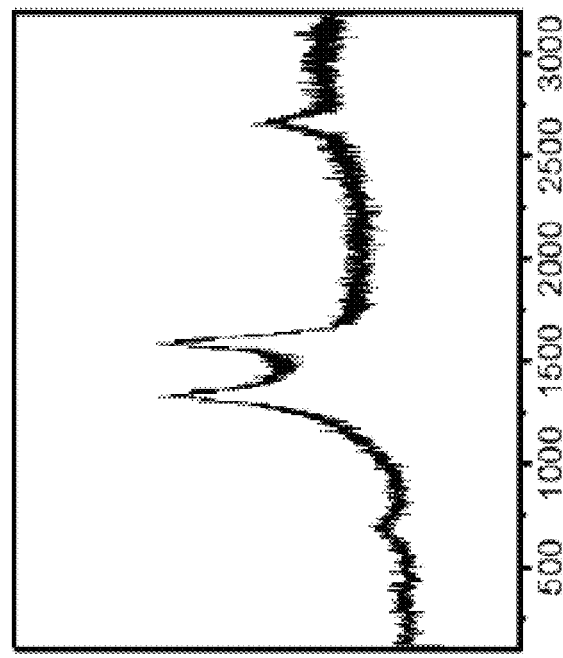
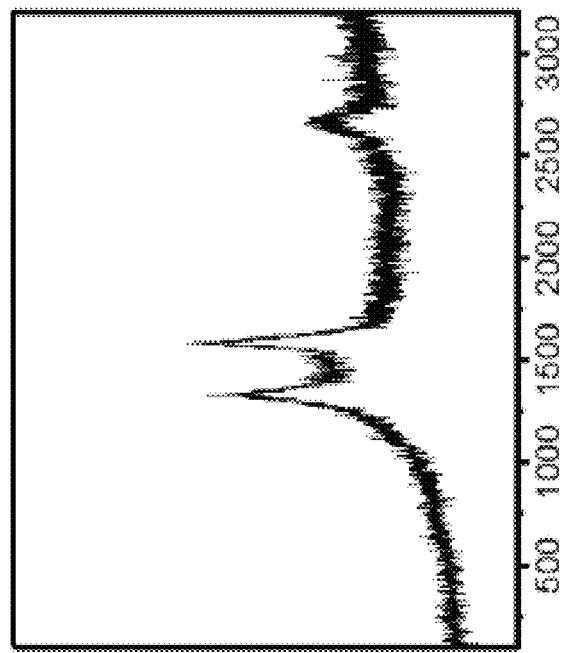
FIG. 20C
FIG. 20D

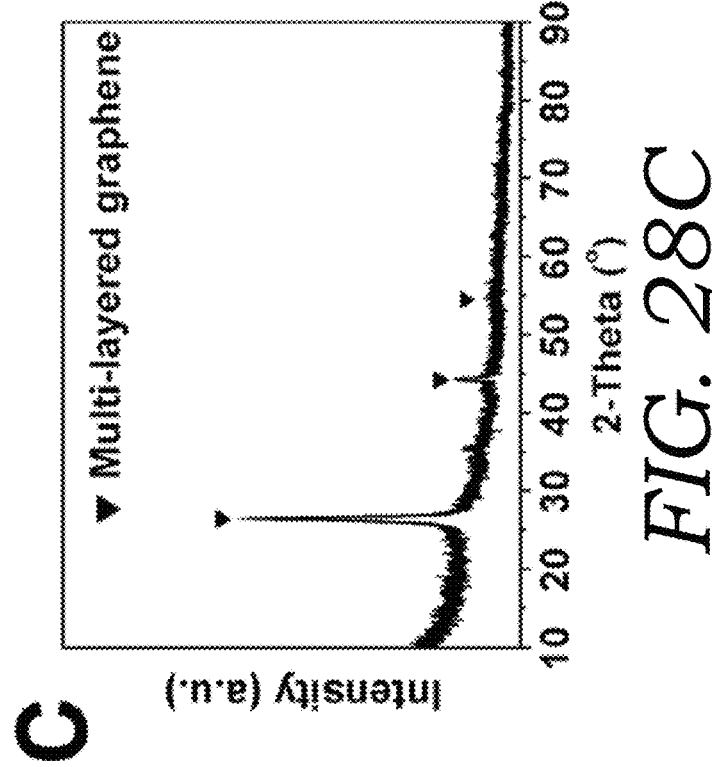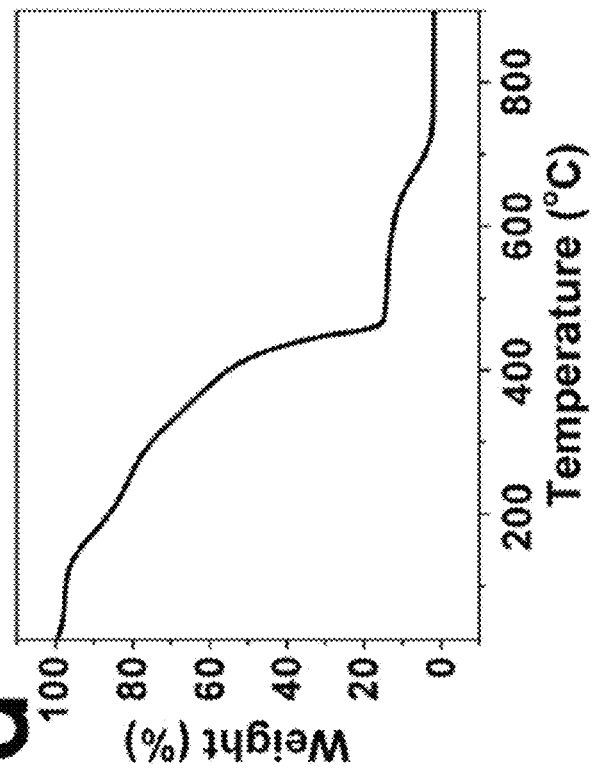
FIG. 28C
FIG. 28D

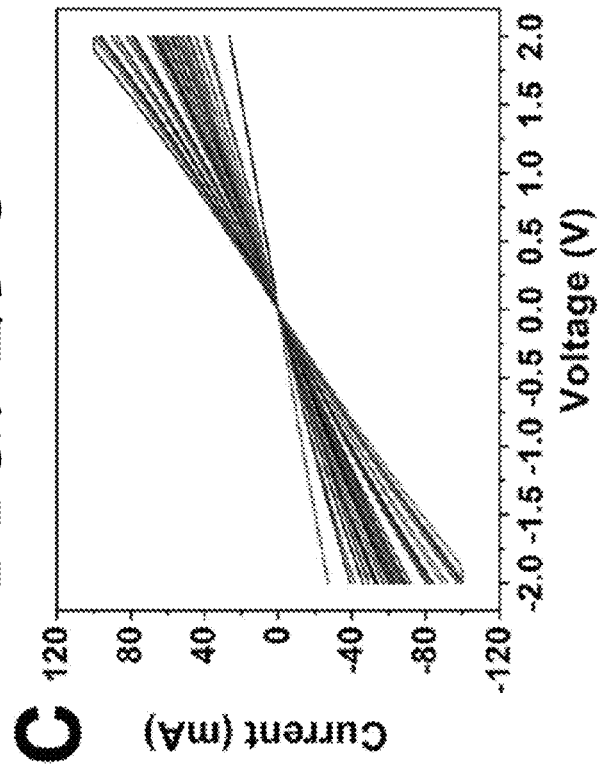
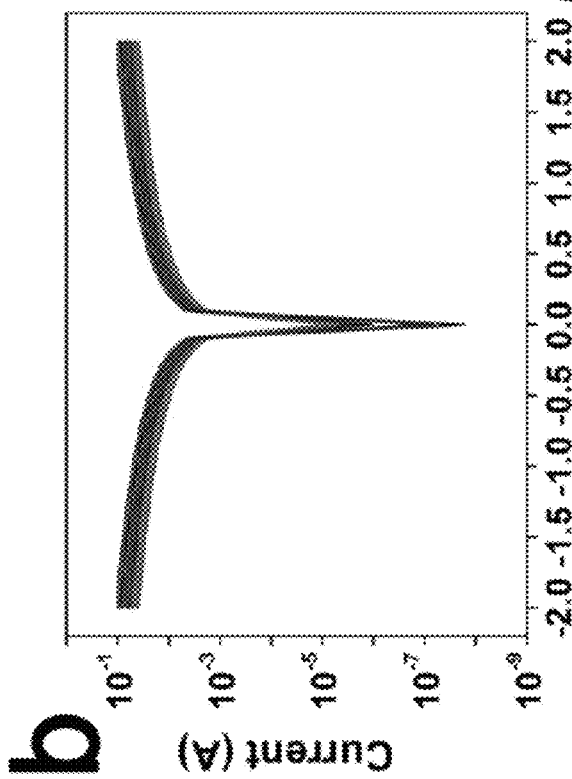
FIG. 29B
FIG. 29C

THREE-DIMENSIONAL (3D) PRINTING OF GRAPHENE MATERIALS

CROSS-REFERENCE TO RELATED PATENT APPLICATIONS

This application is a 35 U.S.C § 371 national application of International PCT Application No. PCT/US17/41768, filed on Jul. 12, 2017, entitled "Three-Dimensional (3D) Printing Of Graphene Materials," which designated the U.S., and which claims priority to U.S. Patent Appl. Ser. No. 62/361,412, filed Jul. 12, 2016, entitled "Three-Dimensional (3D) Printing Of Graphene Materials," which patent application is commonly owned by the owner of the present invention. These patent applications are hereby incorporated by reference in their entirety for all purposes.

GOVERNMENT INTEREST

This invention was made with government support under Grant Nos. FA9550-14-1-0111 and FA9550-12-1-0035, awarded by the United States Department of Defense/Air Force Office of Scientific Research. The government has certain rights in the invention.

FIELD OF INVENTION

The present invention relates to three-dimensional (3D) printing of graphene materials and methods and apparatuses for making same.

BACKGROUND OF INVENTION

Graphene has drawn tremendous attention in fields of energy storage devices [Biswas 2010; Botas 2015; Dong I 2012; Huang 2013; Lei 2012; Liao 2015; Luo 2013; Qiu 2015; Xie 2015; Ye 2013; Zhang 2015; Li 2016; Ai 2015; Ai 2014; Ai 2017], catalysis [Sha 2014; Williams 2008; Xiang 2012], transparent conductive films [Bult 2013; Choo 2015; Lee 2011; Mattevi 2009; Veronese 2015; Wang 2010], and lightweight materials [Hu 2016] due to its remarkable properties, such as high thermal and electrical conductivity, high specific surface area, and good mechanical strength [Guo 2011; Kim 2009; Sun 2010; Wang 2014; Zhu 2010; Zhu 2011]. However, as most of these applications require a large mass or volume of graphene materials, two-dimensional (2D) graphene films or individual graphene nanosheets need to be extended into the third dimension to build a three-dimensional (3D) macroscopic structure [Geim 2007]. Several methods have been developed to prepare 3D graphene materials (also called graphene foams), such as chemical vapor deposition (CVD) using commercial Ni or Cu foams [Chen 2011], pyrolysis using templates such as NaCl [Qin 2014], polystyrene colloidal particles [Choi 2012], or porous silica opal crystals [Zakhidov 1998], and self-assembly of graphene oxide (GO) by hydrothermal reactions [Xu 2010]. However, these methods still have limitations, such as an inability to control pore structures, incapability to be free-standing, and low mechanical strength, and they often require complicated preparation processes. The GO-derived 3D GF is framed on discrete defective GO sheets rather than a single and uniform graphene structure. The GO-derived method starts with a graphene material, oxidizes it, and then often reduces it back to a graphene after the printing process; those methods do not form the graphene material during the 3D printing routine.

In Applicant's previous work, a powder metallurgy template method was developed to prepare 3D graphene foams [Sha 2016; Sha 2017]. Yet, this process required the fabrication of a mold to contain the monolith that was formed. A 1000° C. CVD process, as well as an approximate 2.8 hour heating and cooling process, was required. Thus, a simple and efficient method to directly prepare 3D carbon materials was sought.

Laser-induced graphene (LIG) was another promising technique to prepare graphitic carbon nano-materials (see FIGS. 1A-1F, which are respectively, reproductions of FIGS. 2A-2F of the Tour '060 PCT Application). [Tour '060 PCT Application; Lin 2014; Peng 2015]. The LIG can be directly grown on commercial polyimide sheets at room temperature by laser scribing with a precisely controlled 2D pattern. Yet, the thickness of LIG is normally limited to a micrometer (μm) scale, and an approach to prepare 3D graphene structures is needed. 3D printing is a technique for directly creating 3D bulk objects.

3D printing, which is also called additive manufacturing (AM) and solid freeform fabrication (SFF), is a process for producing 3D objects directly from a digital model. 3D printing is a simple and efficient technique that enables the direct production of 3D bulk objects. In conventional 3D printing, polymers, ceramics, or metals are deposited layer by layer to build 3D structure products designed and controlled by a computer [Farahani 2016]. However, when this 3D printing technique has been used for carbon or carbon-containing objects, the as-prepared material has been limited to micro-sized scales, with the precursors contained in inkjet-printable or UV-curable inks [Farahani 2016; Compton 2014]. Thus, for the fabrication of graphene or graphene-related materials by 3D printing, GO or chemically modified graphene have been used as the precursor or the ink additive. For example, Wang et al. printed a conductive silver-nanoparticle-decorated graphene nanocomposite film by inkjet printing, which showed a high conductivity of $2.16 \times 10^3$ S $m^{-1}$ [Wang 2015]. Kim et al. reported a nm-scale 3D printing method to write freestanding reduced GO wires [Kim 2015]. Garcia-Tunon et al. functionalized GO with a branched copolymer surfactant (BCS) to prepare a water-based ink to print 3D graphene [Garcia-Tunon 2015]. Azhari et al. investigated a powder-bed technology to develop 3D porous structures using a blend of hydroxyapatite and GO nanoparticles [Azhari 2015]. Yet, the direct 3D printing of all-carbon objects with a binder-free system remains a challenge, especially when inkjet printing is not possible due to solubility or contamination concerns.

Moreover, these previous methods involved inkjet printing of relatively expensive graphene oxide or other graphene derivative sources followed by reduction to obtain a graphene object. By contrast, a sintered metal powder method as discovered by Applicants allows for the conversion of inexpensive carbon sources, such as sucrose or other polysaccharides and polymer binders into graphene

SUMMARY OF INVENTION

The present invention relates to three-dimensional (3D) printing of graphene materials and metal/graphene composite materials and further relates to methods and apparatuses for making same. In some embodiments, combined metal powder and carbon sources (such as Ni coated with sucrose) are utilized in the 3D printing process to yield a 3D metal/graphene object. In other embodiments, a 3D printing process is used to apply binder to metal powders to yield a 3D metal/binder object, and the binder is subsequently thermally converted to graphene to yield a 3D metal/graphene object. The metal in the resulting 3D printed composite material can then be etched or otherwise removed yielding the 3D printed graphene object.

In general, in one embodiment, the invention features a method of making a 3D graphene material. The method includes mixing a metal powder and a carbon source to form a metal and carbon source mixture. The carbon source is not graphene, graphene oxide, or a graphene derivative. At least some of the metal powder is covered by the carbon source. The method further includes utilizing a 3D printing process to fuse the metal powder into a specific structure. The method further includes converting the carbon source into graphene sheets that cover the metal powder. The method further includes removing the metal to form the 3D graphene material.

Implementations of the invention can include one or more of the following features:

The step of utilizing the printing process to fuse the metal powder into the specific structure can be performed while performing the step of converting the carbon source into the graphene sheets that cover the metal powder.

A laser can be utilized to convert the carbon source into the graphene sheets that cover the metal powder.

The laser can be a $CO_2$ laser.

The wavelength of the laser can be 10.6 μm.

The laser can be set at a scanning speed of at least about 1000 mm/min.

The laser can be set at a power of at least 4 W.

The laser can be set at a power of at least 15 W.

The laser can be set at a power of at least 37.5 W.

The metal powder can include a metal is selected from a group consisting of Ni, Cu, Ni—Cu alloys, Ru, Ag, Fe, Co, Al, and combinations and alloys thereof.

The metal powder can include Ni.

The metal powder can have an average particle size in the range between about 100 nm and about 1 cm.

The average particle size can be in the range of about 1 μm and 100 μm.

The carbon source can include a material selected from a group consisting of step growth polymers, chain growth polymers, condensation polymers, vinyl polymers, and combinations thereof.

The carbon source can include a material selected from a group consisting of sucrose, polymethyl methacrylate, glucose, poly(phenylene sulfide), carbohydrates, poly(acrylonitrile), polysaccharides, polyimide, and combinations thereof.

The carbon source can include sucrose.

The weight ratio the metal powder to the carbon source is between about 1:1 and 20:1.

The 3D graphene material can be selected from a group consisting of in-situ N-doped graphene foams, carbon nanotube/graphene composites, carbon fibers, carbon nanotube fibers, carbon nanoonions/graphene composites, phosphorene foams, 3D MX and/or $MX_2$ foams, and combinations thereof. M can be selected from a group consisting of Mo, W, Bi, Hf, Ga, Ge, Ta, Sn, Zn, Cd, Pb, B, Nb, Zr, and combinations thereof. X can be selected from a group consisting of S, N, Se, P, and combinations thereof.

The 3D graphene material can have a porosity of at least 98%.

The porosity can be at least 99%.

The 3D graphene material can be a graphene foam.

The 3D graphene material can have an average pore diameter in the range between 1 nm and about 1 cm.

The average pore diameter can be between about 1 nm and about 500 nm.

The average pore diameter can be between about 1 nm and about 10 nm.

The 3D graphene material can include a surface area ranging from about 50 $m^2/g$ to about 2,500 $m^2/g$.

The 3D graphene material can have an electrical conductivity ranging from about 6.9 S/cm and about 10.5 D/cm.

The 3D graphene material can have a mechanical robustness that is at least about 11 kPa storage modulus.

The 3D graphene material can have a damping capacity of at least 0.05.

The step of removing the metal to form the 3D graphene material can include etching away the metal.

The step of etching away the metal can include etching with a $FeCl_3$ solution.

The step of removing the metal to form the 3D graphene material can include etching away the metal, purifying with DI water, and then drying by a critical point dryer.

The method can further include recovering the metal removed during the step of removing the metal and recycling the recovered for use as the metal powder in the method.

The metal powder can be at room temperature. The metal powder and the carbon source can be converted into graphene sheets that cover the metal powder without preheating.

The step of converting the carbon source into graphene sheets that cover the metal powder can be performed in air.

The step of converting the carbon source into graphene sheets that cover the metal powder can be performed in an atmosphere of $H_2$, Ar, or both.

The step of converting the carbon source into graphene sheets that cover the metal powder can further include a step of heat treatment.

The step of heat treatment can be performed at a temperature of at least 800° C. in an atmosphere of $H_2$, Ar, or both.

The temperature can be at least 1000° C.

The step of mixing the metal powder and the carbon source to form the metal and carbon source mixture can include mixing the metal powder and the carbon source in water, and then removing the water to form the metal and carbon source mixture.

The carbon source can be an organic polymer. The step of mixing the metal powder and the carbon source to form the metal and carbon source mixture can include mixing the metal powder and the carbon source in a solvent, and then removing the solvent to form the metal and carbon source mixture.

The method can further include incorporating the 3D graphene material into a device.

The device can be selected from is a group consisting of electrodes, battery electrodes, capacitors, supercapacitors, batteries, lithium batteries, lithium ion batteries, photovoltaic devices, photovoltaic cells, transistors, current collectors, fuel cell devices, water desalination devices, capacitive deionization devices, water-splitting devices, water-oil separation devices, water/gas purification devices, sensors, mechanical dampening devices, cell scaffolds for artificial wood, scaffolds for growth of bone or animal/human tissue in vivo or in vitro, scaffolds for neuronal growth in vitro or in vivo, and spinal cord regeneration scaffolds.

The method can further include incorporating the 3D graphene material into an electrode.

The method can further include incorporating the electrode into a device that is selected from a group consisting of capacitors, supercapacitors, batteries, lithium batteries, lithium ion batteries, photovoltaic devices, photovoltaic cells, transistors, current collectors, fuel cell devices, water desalination devices, capacitive deionization devices, water-splitting devices, water-oil separation devices, water/gas purification devices, sensors, and mechanical dampening devices.

In general, in another embodiment, the invention features a method of making a 3D graphene material. The method includes selecting a metal powder. The method further includes utilizing a 3D printing process to selectively fuse binder or selectively apply the binder to the metal powder to obtain a metal/binder structure. The method further includes forming graphene sheets that cover the metal powder and sintering the metal powder. The graphene sheets are formed from a carbon source that is not graphene, graphene oxide, or a graphene derivative. The method further includes removing the metal to form the 3D graphene material.

Implementations of the invention can include one or more of the following features:

The metal powder can be mixed with the binder before the 3D printing process and the 3D printing process selectively fuses the binder to the metal process.

The binder can be selectively applied in situ during the 3D printing process.

The binder can be not fused to the metal powder during the 3D printing process.

The binder can be the carbon source. A heating process can be utilized to covert the binder into the graphene sheets that cover the metal powder.

The heating process can be performed by a CVD apparatus.

The heating process can be performed in a furnace that is at a temperature of at least 800° C.

The temperature can be at least 1000° C.

The carbon can be precipitated out as graphene upon cooling after heating in the furnace.

The step of cooling can be performed for at least about 10 minutes.

The heating process can be performed in an atmosphere of $H_2$, Ar, or mixtures thereof.

The atmosphere can be an atmosphere of $H_2$ and Ar. The flowrates of Ar to $H_2$ can be at a ratio between about 1:1 and about 3:1. The combined flow rate of the Ar and $H_2$ can be between about 500 sccm and about 1000 sccm. The pressure can be between about 5 and 15 Torr.

A CVD apparatus can be utilized to covert the carbon source into the graphene sheets that cover the metal powder.

The binder can be the carbon source and can include a polymer-based binder.

The binder can be the carbon source and can include step growth polymers, chain growth polymers, condensation polymers, vinyl polymers, and combinations thereof.

The binder can be the carbon source and can include sucrose.

The binder can be not the carbon source. The CVD apparatus can be utilized with an atmosphere that includes the carbon source.

The carbon source can be $CH_4$.

The flow rate of the $CH_4$ can be in the range of about 10 and about 100 sccm.

The atmosphere can further include $H_2$, Ar, or mixtures thereof.

The metal powder can include a metal is selected from a group consisting of Ni, Cu, Ni—Cu alloys, Ru, Ag, Fe, Co, Al, and combinations and alloys thereof.

The metal powder can include Ni.

The metal can have an average particle size in the range between about 100 nm and about 1 cm.

The average particle size can be in the range of about 1 μm and 100 μm.

The binder can include a material selected from a group consisting of sucrose, polymethyl methacrylate, glucose, poly(phenylene sulfide), carbohydrates, poly(acrylonitrile), polysaccharides, polyimide, and combinations thereof.

The binder can include a polysaccharide.

The weight ratio of the metal powder to the binder can be between about 1:1 and 20:1.

The 3D graphene material can be selected from a group consisting of in-situ N-doped graphene foams, carbon nanotube/graphene composites, carbon fibers, carbon nanotube fibers, carbon nanoonions/graphene composites, phosphorene foams, 3D MX and/or $MX_2$ foams, and combinations thereof. M can be selected from a group consisting of Mo, W, Bi, Hf, Ga, Ge, Ta, Sn, Zn, Cd, Pb, B, Nb, Zr, and combinations thereof. X can be selected from a group consisting of S, N, Se, P, and combinations thereof.

The 3D graphene material can have a porosity of at least 98%.

The porosity can be at least 99%.

The 3D graphene material can be a graphene foam.

The 3D graphene material can have an average pore diameter in the range between 1 nm and about 1 cm.

The average pore diameter can be between about 1 nm and about 500 nm.

The average pore diameter can be between about 1 nm and about 10 nm.

The 3D graphene material can increase a surface area ranging from about 50 $m^2/g$ to about 2,500 $m^2/g$.

The 3D graphene material can have an electrical conductivity ranging from about 6.9 S/cm and about 10.5 D/cm.

The 3D graphene material can have a mechanical robustness that is at least about 11 kPa storage modulus.

The 3D graphene materials can have a damping capacity of at least 0.05.

The step of removing the metal to form the 3D graphene material can include etching away the metal.

The step of etching away the metal can include etching with a $FeCl_3$ solution.

The step of removing the metal to form the 3D graphene material can include etching away the metal, purifying with DI water, and then drying by a critical point dryer.

The method can further include recovering the metal removed during the step of removing the metal and recycling the recovered for use as the metal powder in the method.

The method can further include incorporating the 3D graphene material into a device.

The device can be selected from is a group consisting of electrodes, battery electrodes, capacitors, batteries, lithium batteries, lithium ion batteries, photovoltaic devices, photovoltaic cells, transistors, current collectors, fuel cell devices, water desalination devices, capacitive deionization devices, water-splitting devices, water-oil separation devices, water/gas purification devices, sensors, mechanical dampening devices, cell scaffolds for artificial wood, scaffolds for growth of bone or animal/human tissue in vivo or in vitro, scaffolds for neuronal growth in vitro or in vivo and spinal cord regeneration scaffolds.

The method can further include incorporating the 3D graphene material into an electrode.

The method can further include incorporating the electrode into a device that is selected from a group consisting of capacitors, supercapacitors, batteries, lithium batteries, lithium ion batteries, photovoltaic devices, photovoltaic cells, transistors, current collectors, fuel cell devices, water desalination devices, capacitive deionization devices, water-splitting devices, water-oil separation devices, water/gas purification devices, sensors, and mechanical dampening devices.

In general, in another embodiment, the invention features a method that includes mixing a metal powder and a carbon source to form a metal and carbon source mixture. At least some of the metal powder is covered by the carbon source. The method further includes utilizing a 3D printing process to fuse the metal powder into a specific structure. The method further includes converting the carbon source into graphene sheets that cover the metal powder to form a 3D metal/graphene composite material.

Implementations of the invention can include one or more of the following features:

The method can further include removing at least some of the metal from the 3D metal/graphene composite material.

The method can further include removing essentially all of the metal to form a 3D graphene material.

The carbon source can be not graphene, graphene oxide, or a graphene derivative.

In general, in another embodiment, the invention features a method that includes selecting a metal powder. The method further includes utilizing a 3D printing process to selectively fuse binder or selectively apply the binder to the metal powder to obtain a metal/binder structure. The method further includes forming graphene sheets that cover the metal powder and sintering the metal powder to form a 3D metal/graphene composite material.

Implementations of the invention can include one or more of the following features:

The method can further include removing at least some of the metal from the 3D metal/graphene composite material.

The method can further include removing essentially all of the metal to form a 3D graphene material.

The graphene sheets can be formed from a carbon source that is not graphene, graphene oxide, or a graphene derivative.

In general, in another embodiment, the invention features a 3D graphene material made from one or more of the above methods.

In general, in another embodiment, the invention features a device that includes one or more of the above 3D graphene materials.

Implementations of the invention can include one or more of the following features:

The device can be selected from is a group consisting of electrodes, battery electrodes, capacitors, supercapacitors, batteries, lithium batteries, lithium ion batteries, photovoltaic devices, photovoltaic cells, transistors, current collectors, fuel cell devices, water desalination devices, capacitive deionization devices, water-splitting devices, water-oil separation devices, water/gas purification devices, sensors, mechanical dampening devices, cell scaffolds for artificial wood, scaffolds for growth of bone or animal/human tissue in vivo or in vitro, and scaffolds for neuronal growth in vitro or in vivo, spinal cord regeneration scaffolds.

In general, in another embodiment, the invention features an electrode that includes one or more of the above 3D graphene materials.

In general, in another embodiment, the invention features a device that includes one or more of the above electrodes.

Implementations of the invention can include one or more of the following features:

The device can be selected from a group consisting of capacitors, supercapacitors, batteries, lithium batteries, lithium ion batteries, photovoltaic devices, photovoltaic cells, transistors, current collectors, fuel cell devices, water desalination devices, capacitive deionization devices, water-splitting devices, water-oil separation devices, water/gas purification devices, sensors, and mechanical dampening device.

In general, in another embodiment, the invention features a powder-based automatic 3D printing apparatus that includes a powder reservoir. The powder reservoir includes a powder including a mixture of a metal powder and a carbon source. The carbon source is not graphene, graphene oxide, or a graphene derivative. At least some of the metal powder is covered by the carbon source. The a powder-based automatic 3D printing apparatus further includes a powder distributor, a build volume, a build platform, and a laser. The powder-based automatic 3D printing apparatus is operable to perform a 3D printing process utilizing the mixture of the metal powder and the carbon source to obtain a specific structure. The laser is operable to covert the carbon source into graphene sheets that cover the metal powder to form a metal scaffold.

Implementations of the invention can include one or more of the following features:

The powder-based automatic 3D printing apparatus can be further operable to utilize the laser to covert the carbon source into graphene sheets while performing the 3D printing process.

The laser can be a $CO_2$ laser.

The wavelength of the laser can be selected based upon the absorption bands of both the metal powder and the carbon source.

The wavelength of the laser can be 10.6 μm.

The laser can be set at a scanning speed of at least about 1000 mm/min.

The laser can be set at a power of at least 4 W.

The laser can be set at a power of at least 15 W.

The laser can be set at a power of at least 37.5 W.

The metal powder can include a metal is selected from a group consisting of Ni, Cu, Ni—Cu alloys, Ru, Ag, Fe, Co, Al, and combinations and alloys thereof.

The metal powder can include Ni.

The metal powder can have an average particle size less than about 100 nm and about 1 cm.

The average particle size can be in the range of about 1 μm and 100 μm.

The carbon source can include a material selected from a group consisting of step growth polymers, chain growth polymers, condensation polymers, vinyl polymers, and combinations thereof.

The carbon source can include a material selected from a group consisting of sucrose, polymethyl methacrylate, glucose, poly(phenylene sulfide), carbohydrates, poly(acrylonitrile), polysaccharides, polyimide, and combinations thereof.

The carbon source can include sucrose.

The weight ratio of the metal powder to the carbon source can be between about 1:1 and 20:1.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

It is also to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

FIGS. 1A-1F are, respectively, reproductions of FIGS. 2A-2F of the Tour '060 PCT Application.

FIG. 2A is a flowchart showing a method to form a 3D graphene material involving a combined metal and carbon growth source.

FIG. 3 is a reproduction of FIG. 2 of the Tour '815 PCT Application.

FIG. 4B is a schematic of changing the shape of the pellet to prepare 3D rebar GF in screw shape.

FIG. 4C is a photograph of all-carbon 3D rebar-18 graphene foam screw. FIGS. 4A-4C are, respectively, reproductions of FIGS. 11A-11C of the Tour '815 PCT Application.

FIGS. 5A-5C are SEM images of graphene grown by laser using Ni/sucrose precursor.

FIGS. 8A-8D are, respectively, reproductions of FIGS. 1A-1D of Kinstlinger 2016.

FIG. 10 is the Raman spectra of laser-irradiated Ni/sucrose powders with different laser scanning speeds.

FIGS. 16C-16D are Raman characterizations for the 3D printed Ni/binder objects shown in FIGS. 16A-16B, respectively.

FIGS. 17A-17B are SEM images for as-grown 3D Ni/graphene objects after CVD treatments with FIG. 17A being the inside structure of the objects and FIG. 17B being the outside surface of the objects. (105% saturation is used for the 3D printing of Ni/binder objects prior to the CVD treatments).

FIGS. 17C-17D are Raman characterizations for the 3D printed Ni/binder objects shown in FIGS. 17A-17B, respectively.

FIGS. 19A-19B are SEM images for 3D graphene foam after CPD drying with FIG. 19A being the inside structure of the objects and FIG. 19B being the outside surface of the objects. (70% saturation is used for the 3D printing of Ni/binder objects prior to the CVD treatments).

FIGS. 19C-19D are Raman characterizations for the 3D graphene foam after CPD drying shown in FIGS. 19A-19B, respectively.

FIGS. 20C-20D are Raman characterizations for the 3D graphene foam after CPD drying shown in FIGS. 20A-20B, respectively.

FIGS. 28A-28D are, respectively (FIG. 28A) Raman spectrum, (FIG. 28B) XPS curves, (FIG. 28C) XRD pattern, and (FIG. 28D) TGA curve of 3D printed graphene foams after removing Ni prepared using 100P and 2S in a $H_2$ atmosphere. The inset in FIG. 28B is the elemental scanning result of C 1s peak.

FIGS. 29B-29C are, respectively, graphs showing current-voltage curves (I vs. V) in (FIG. 29B) semilogarithmic scale and (FIG. 29C) linear scale of 3D printed graphene foams after removing Ni prepared using 100P and 2S in a $H_2$ atmosphere.

(FIG. 30A) storage modulus and loss modulus and (FIG. 30B) damping capacity at room temperature. The frequency of testing is 1 Hz.

DETAILED DESCRIPTION

Figure 1B:
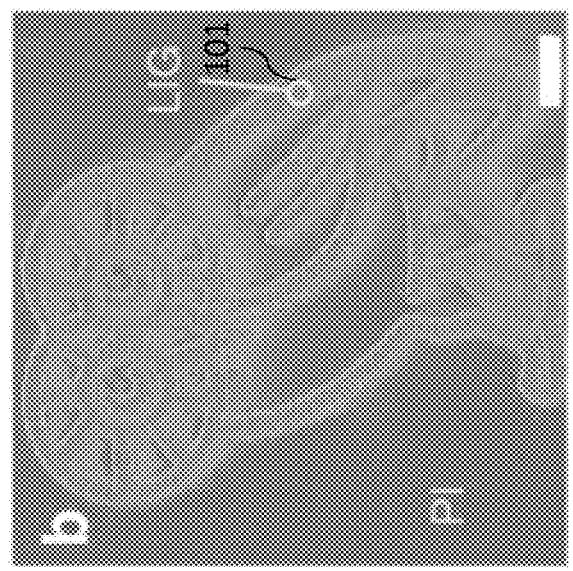
FIG. 1B is an SEM image of LIG patterned into an owl shape (scale bar, 1 mm). The bright contrast corresponds to LIG surrounded by the darker-colored insulating PI substrates.
Figure 1A:
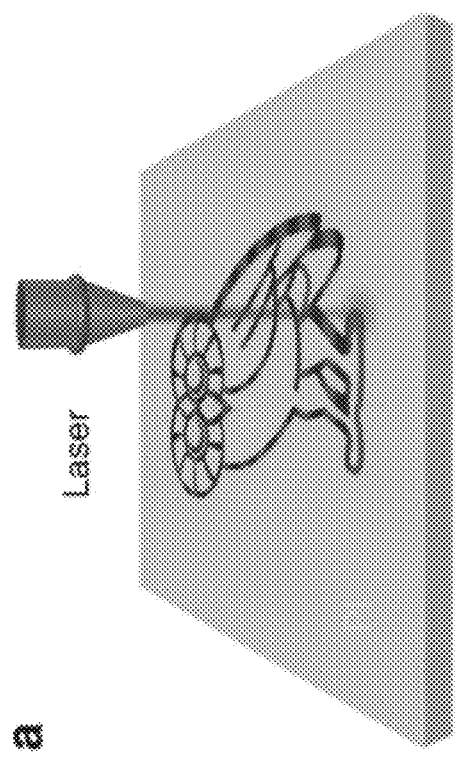
FIG. 1A is a schematic of the synthesis process of LIG from PI.
Figure 1D:
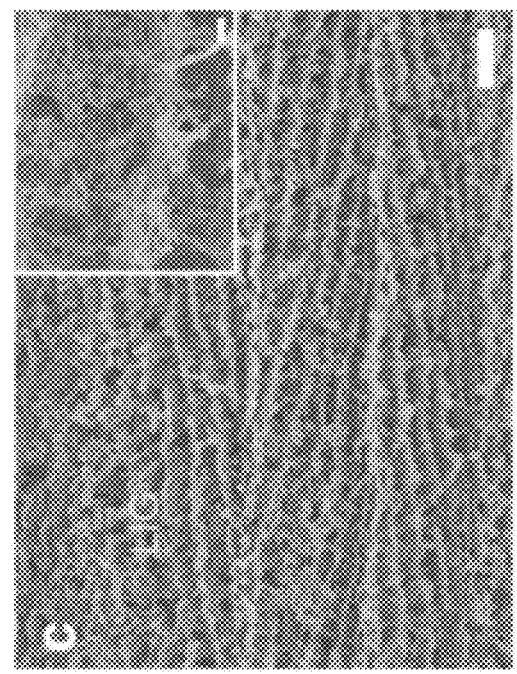
FIG. 1D is a cross-sectional SEM image of the LIG film on the PI substrate (scale bar, 20 μm). The inset is an SEM image showing the porous morphology of LIG (scale bar, 1 μm).
Figure 1C:
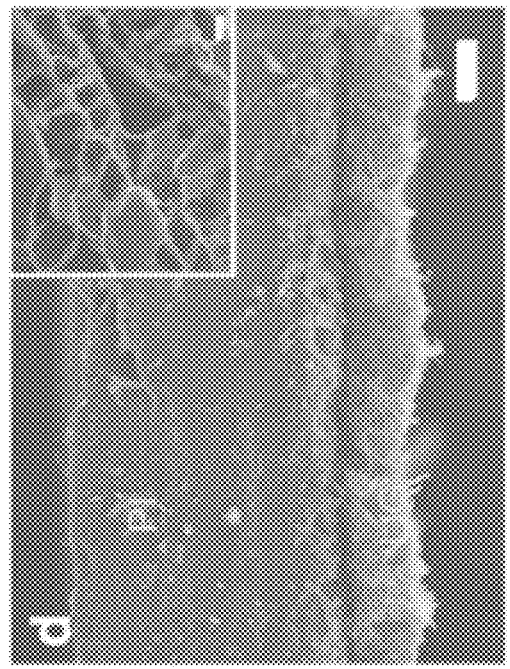
FIG. 1C is a magnified portion 101 of the SEM image of the LIG film in FIG. 1B (scale bar, 10 μm). The inset is the corresponding higher magnification SEM image (scale bar, 1 μm).
Figure 1F:
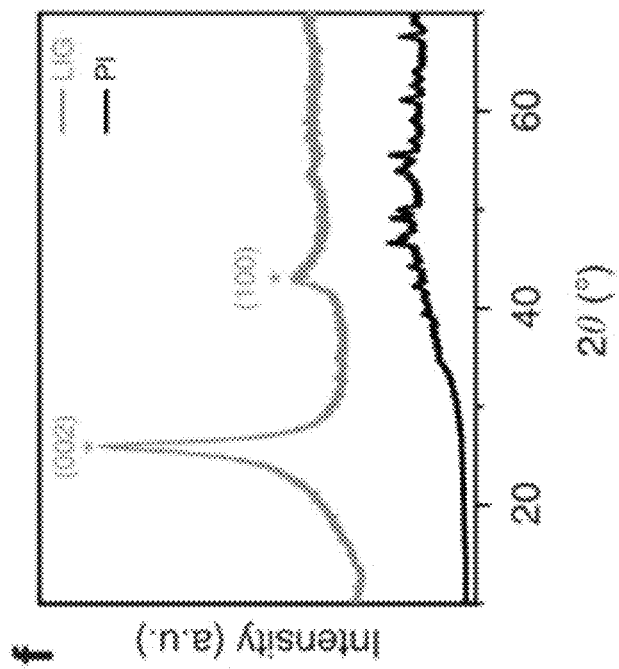
FIG. 1F is an XRD of powdered LIG scraped from the PI film.
Figure 1E:
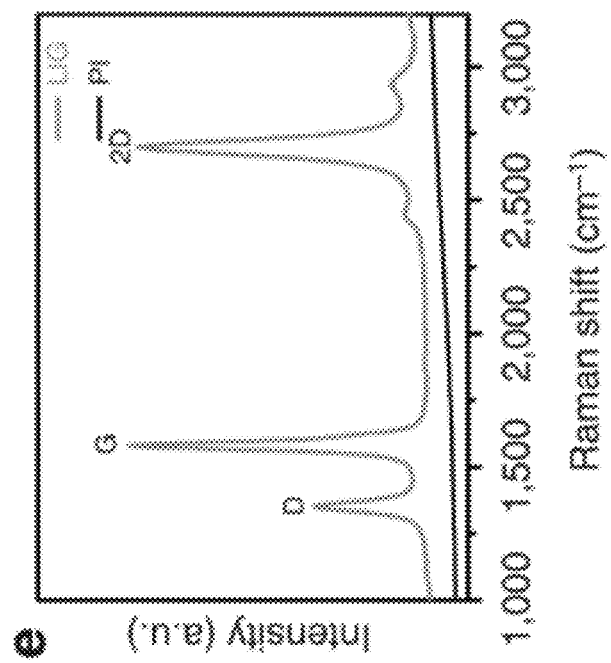
FIG. 1E is a representative Raman spectrum of a LIG film and the starting PI film.

Embodiments of the present invention pertain to three dimensional (3D) graphene materials and three dimensional metal/graphene composite materials (e.g., films, sheets, layers, or objects), including on a surface. Embodiments of the present invention further include methods and apparatuses for 3D printing of same.

3D Printing of Graphene Materials Using Combined Metal Powders and Carbon Sources In some embodiments, the methods utilize a combination of powder metallurgy (e.g., nickel) along with a carbon source (e.g., sucrose). Such methods generally include one or more of the following steps, which are shown in the flowchart of FIG. 2A:

Step 201: Mixing a metal powder (e.g., nickel powder) and a carbon source (e.g., sucrose or polymer, such as polyphenylene sulfide or polyacrylonitrile) to provide a mixture (e.g., a powder mixture) of metal and carbon source (e.g., nickel/sucrose).

Step 202: Utilizing the mixture in a 3D printer to fuse the metal powder into a specific structure.

Step 203: Converting the carbon source into graphene sheets that cover the metal powder utilizing a laser, which forms a metal scaffold. In some embodiments, steps 202 and 203 can be performed simultaneously.

Step 204: Etching away (or otherwise removing) the formed metal scaffold to obtain the final 3D graphene object.

The methods of the present disclosure can also include a step of heat-treating the 3D graphene material.

The etching can occur by various methods, such as by using a solution etchant. Optionally, the etched metal can be recovered and recycled for further use in the method. The formed graphene material can match the shape of the 3D patterned design. The 3D printer can be a metal 3D printer. The 3D printer can include a laser source.

In some embodiments, a powder mixture of nickel and sucrose (Ni/sucrose) is used as a feedstock for 3D printing of graphene. Thereafter, a laser is used during printing to fuse the Ni powders into specific structures while converting the sucrose into graphene sheets that cover the Ni powders. After an optional heating process (which can further improve the quality of the graphene), the Ni scaffold is etched away using a solution etchant, hereby leaving a free-standing graphene object that matches the shape of the 3D patterned design.

The present invention also pertains to the printed 3D graphene materials that are formed by such 3D printing methods. In some embodiments, the printed 3D graphene materials consist essentially of graphene materials. In some embodiments, the printed 3D graphene materials have high specific surface areas, good crystallization, good electrical conductivity, and mechanical robustness. For example, the printed 3D graphene materials can have a surface area ranging from about 50 $m^2/g$ to about 2,500 $m^2/g$. In some embodiments, the surface area is a high specific surface area that is at least 650 $m^2/g$, and further at least 650 $m^2/g$. Further, for example, the printed 3D graphene materials have can an electric conductivity ranging from about 6.9 S/cm to about 10.5 S/cm. Further, for example, the printed 3D graphene materials have a mechanical robustness that is at least about 11 kPa storage modulus. Also, for example, the printed 3D graphene materials have a damping capacity of at least 0.05, further at least 0.06, and still further at least 0.13.

In some embodiments, the printed 3D graphene materials are porous. For example, the printed 3D graphene material can have an average pore diameter in the range between about 1 nm and about 1 cm, further in the range between about 1 nm and 500 nm and still further in the range between about 1 nm and about 10 nm. Further, for example, the printed 3D graphene material can have a porosity of at least about 98%, and in some embodiments at least about 99%, and in still further embodiments at least about 99.5%.

The printed 3D graphene materials can be in the form of a foam. A non-automated metal powder 3D printing method for in situ synthesis of free-standing 3D graphene foams (GFs) can be made by manually placing a mixture of Ni and sucrose onto a platform, and then using a commercial $CO_2$ laser to convert the Ni/sucrose mixture into 3D GFs. The 3D GFs were fabricated in situ by manually feeding multiple layers of a mixture of Ni and sucrose onto a stage. After each layer was deposited, the Ni/sucrose was sintered by a $CO_2$ laser, The sucrose acted as the solid carbon source for graphene and the sintered Ni metal acted as the catalyst and template for graphene growth.

Such process paralleled an automated 3D laser metal additive printing process. This simple and efficient method combined powder metallurgy templating with 3D printing techniques, and enables direct in situ 3D printing of GFs with no high-temperature furnace or lengthy growth process required. Further, this method is not limited to inkjet-printable and UV-curable ink materials, and not limited to starting graphene-derived inks, and can be used to form macroscopic monoliths of various shapes, thus providing for the fabrication of 3D graphene materials.

In some embodiments, the printed 3D graphene materials are free-standing. In some embodiments, the printed 3D graphene objects include, without limitation, films, sheets, layers, and combinations thereof.

Optionally, in some embodiments, the etching process can be eliminated or only partially performed such that the 3D object is a 3D graphene material that is a 3D metal/graphene composite material. In such instance, the 3D metal/graphene composite material can have added strength or mechanical properties as compared to that of 3D objects that a predominately (or entirely) graphene or metal.

Figure 2B:
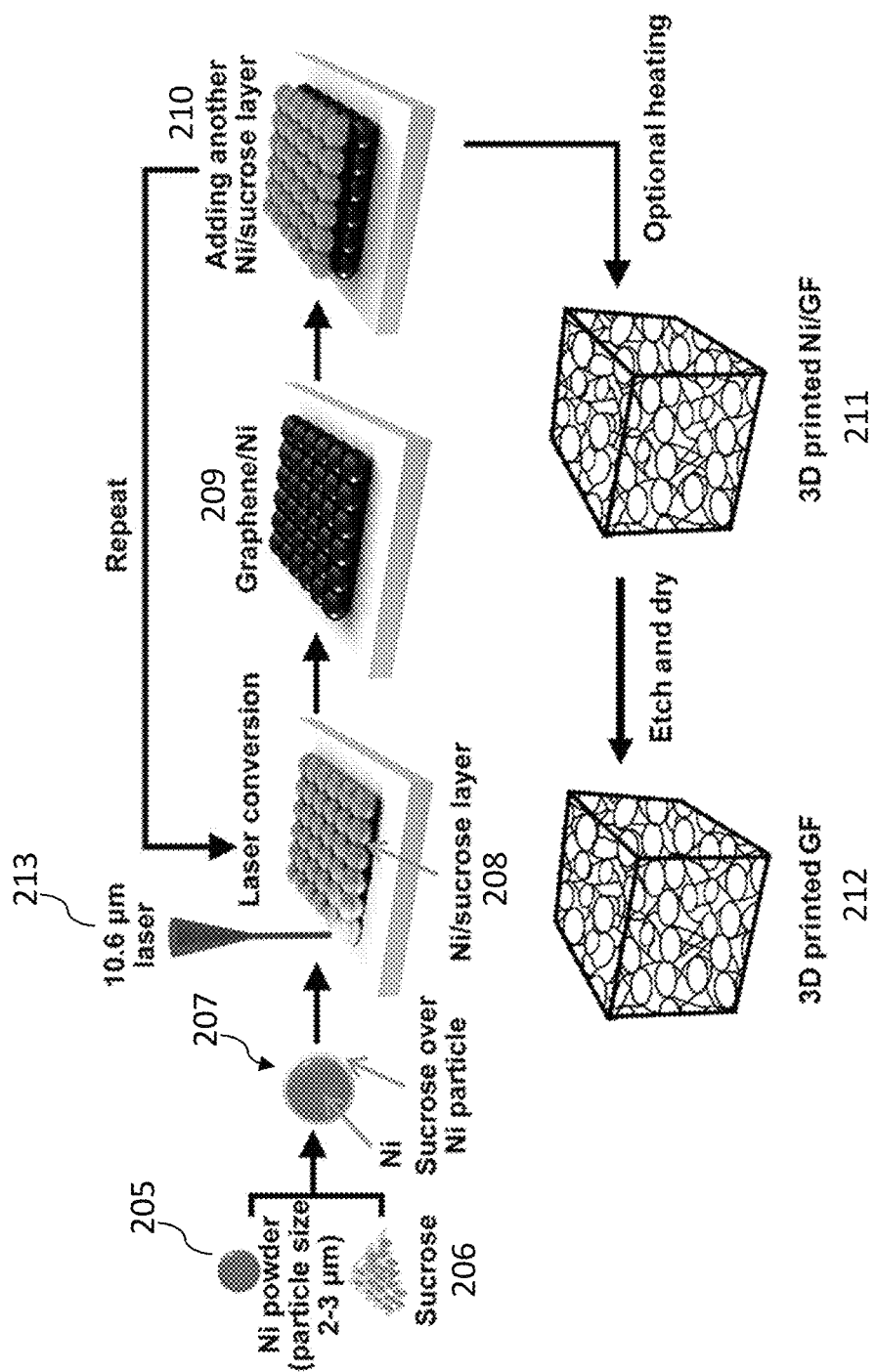
FIG. 2B is a schematic of in situ synthesis of a graphene foam using a 3D printing process.

FIG. 2B is a schematic of 3D printing of 3D graphene foam and 3D graphene enhanced Ni composite materials. Through this process of FIG. 2B, porous free-standing 3D graphene materials are created with Ni (Ni powder 205) as the catalyst and sucrose 202 as the carbon source.

The Ni powder 205 and sucrose 206 are mixed in DI water. The mixture is stirred mechanical while heating (which will evaporate water) to form a mixture of the Ni powder/sucrose 207 (i.e., the Ni powder coated with sucrose). The ratio of Ni/sucrose can be, for example at a weight ratio between about 1:1 and about 20:1, and can be around a weight ratio of 6:1. These weight ratios can be adjusted based upon the different precursors used. The average particle size in the range can be between about 100 nm and about 1 cm average size and is generally in the range of about 1 µm to about 100 µm.

This mixture 207 is then utilized in a 3D printing process to print a structure 208 (such as a layer or a few layers). For instance, the metal/sucrose powders can be deposited layer by layer (or few layers by few layers) by manually shaking new layers of powder over the object (as in metal 3D printing).

The Ni particles are sintered (using laser 213) by laser treatment of the structure 208 (concurrently converting the carbon sources to graphene films on the Ni particles). This can be done in an $H_2$ or Ar atmosphere at room temperature to obtain a 3D graphene reinforced (or enhanced) Ni composite 209. A heating treatment can optionally be performed. During this laser treatment, the Ni powders are sintered into Ni scaffolds, and graphene grows on the surface and interface regions of the Ni scaffolds, which can also absorb the carbon, and thereby form a graphene network between the Ni scaffolds.

As shown in FIG. 2B, the mixture 207 can be utilized in a 3D printing process to print additional structures 210 (additional layers), which laser treatment will add to the 3D graphene/Ni composite 209. Such layering process is repeated to further form the 3D graphene printed Ni/graphene foam composite 211.

The Ni scaffold is then removed from the 3D graphene/NI composite 211, such as by etching in a $FeCl_3$ solution, purifying in DI water, and then drying by a critical point dryer (CPD) to obtain a 3D printed graphene object 212. CPD uses liquid/supercritical $CO_2$ (whose critical point lies at 31° C. and 74 bar) to dry the structures. The 3D printed graphene object 212 has high specific surface area, good crystallization, good electrical conductivity, and a mechanically robust structure.

Figure 2C:
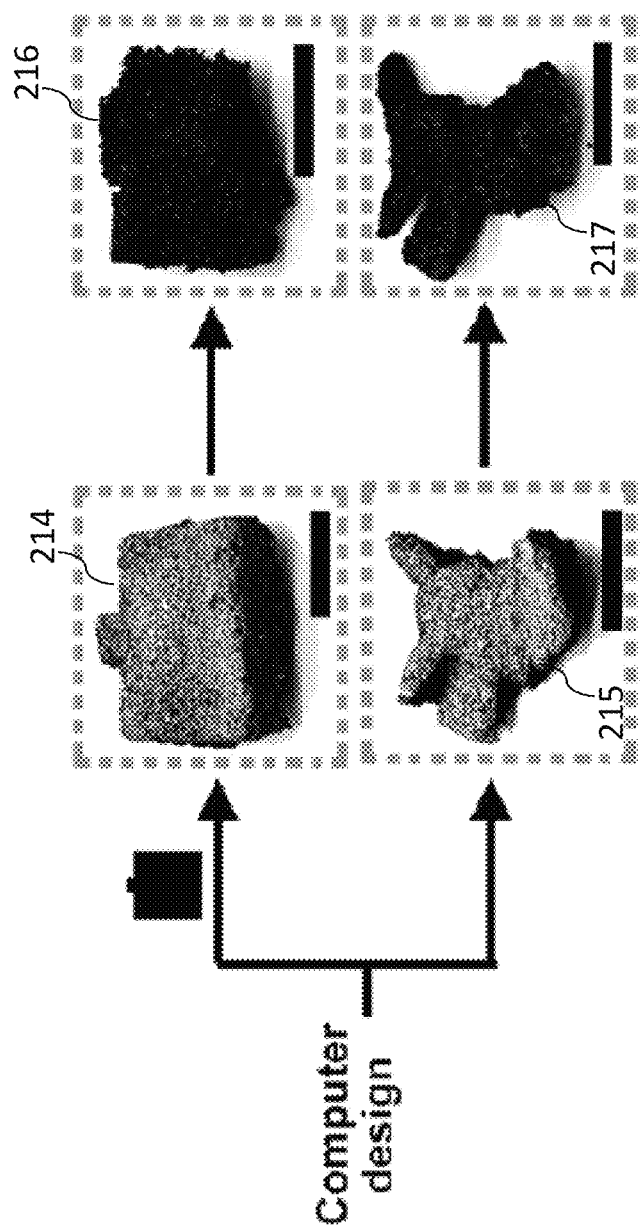
FIG. 2C are photographs of 3D printed graphene foam before and after dissolving Ni. The scale bars are 5 mm.

Again, the starting materials are only the metal powder (Ni powder) and carbon source (sucrose), which are inexpensive and abundant, without any binder additives added, and not limited to inkjet-printable and UV curable ink materials. Moreover, the shapes of the samples are designable by the laser cutter, as shown in FIG. 2C. Photographs 214-215 are of 3D printed foam before dissolving the Ni. Photographs 216-217 are of the same 3D printed foam after dissolving the Ni. The freestanding 3D printed graphene objects can be designed into various structures, which can be well-maintained after the etching and drying process. Compared to freeze-drying and heat-drying, the CPD can dry the GF samples with minimum changes in volume, ensuring the structural integrity of the 3D printed graphene objects [Lindahl 2012; Bolotin 2008; Inoue 1988].

Compared to the desired size of 1 cm in width, the 3D printed graphene object showed ~20% shrinkage in width, which can be avoided, such as by introducing carbon nanotubes (CNTs), as demonstrated in Applicant's previous work [Sha 2017]. In addition, this shrinkage can also be addressed by reducing the size of the particles in the Ni powder, further changing to other carbon precursors, and/or quantities of carbon precursors.

Figure 3:
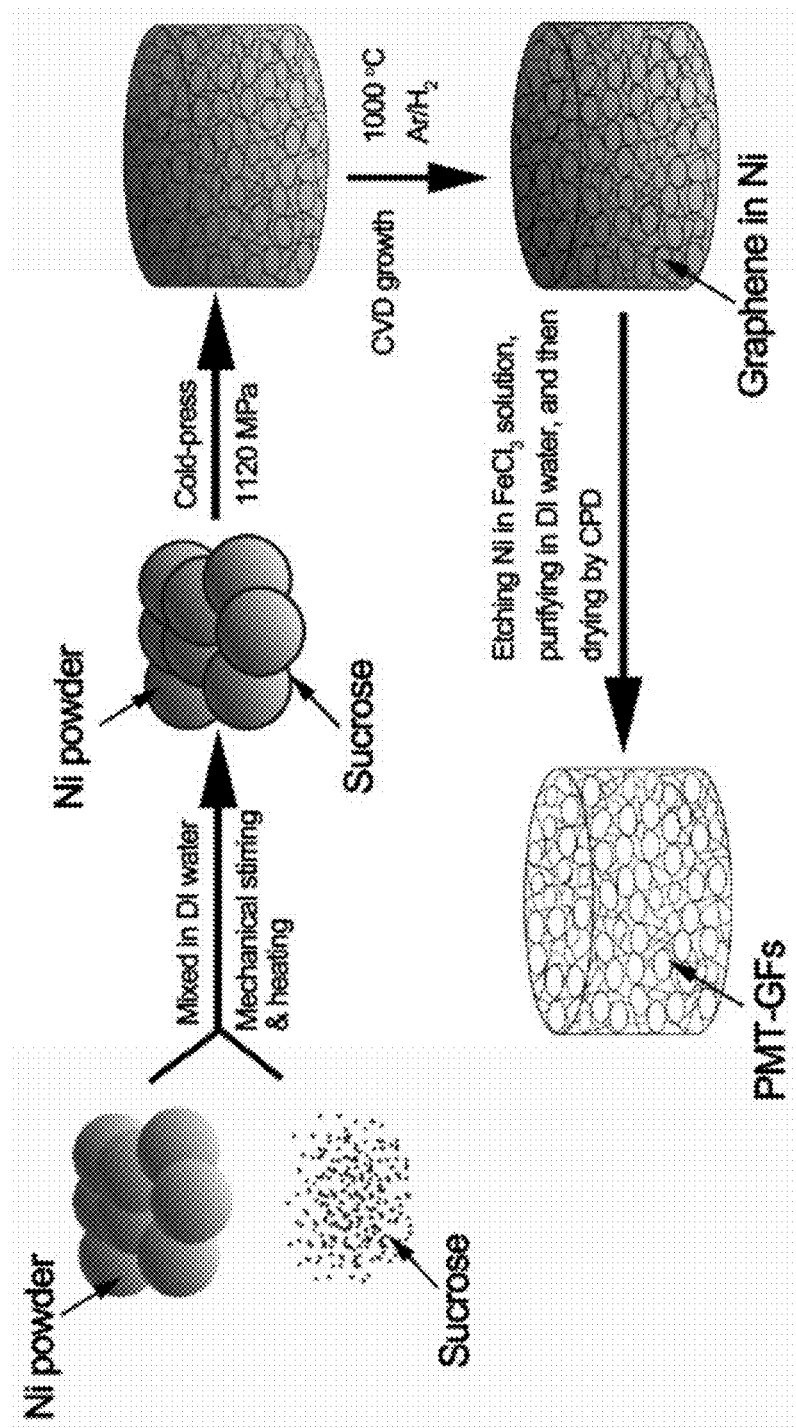
FIG. 3 is a schematic of powder metallurgy-chemical method to prepare 3D graphene foam.
Figure 4A:
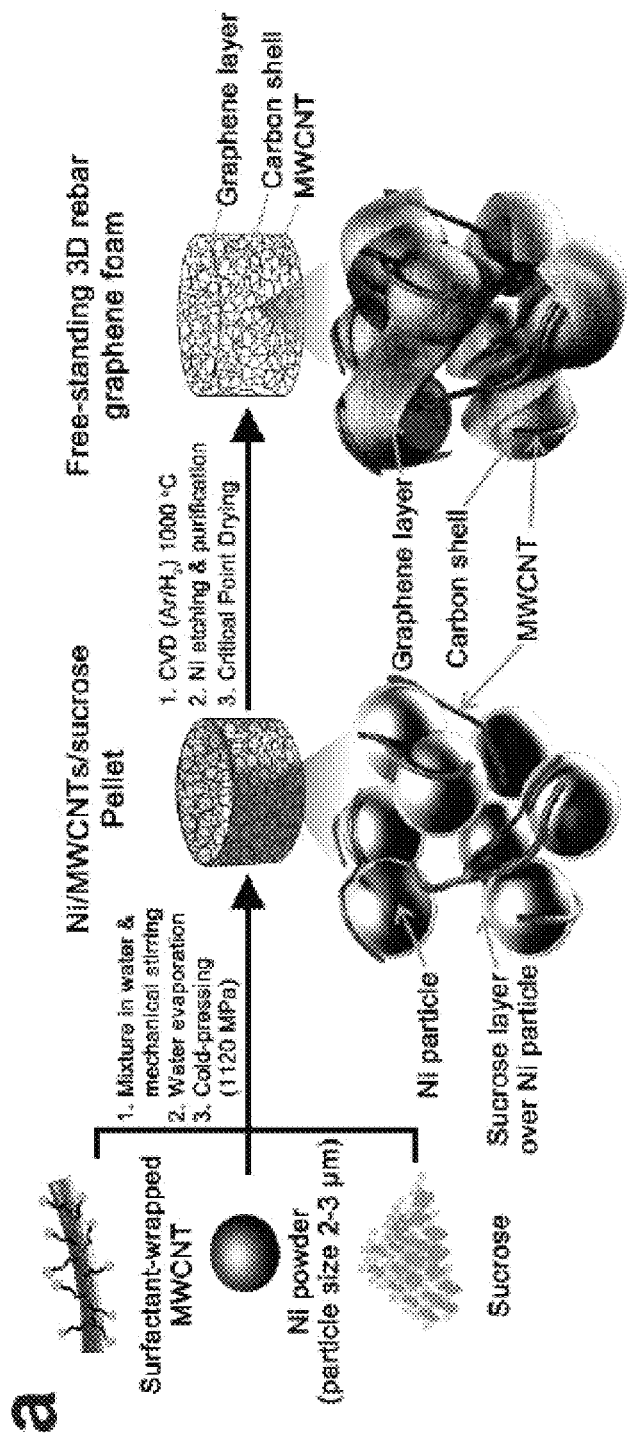
FIG. 4A is a schematic of powder metallurgy-chemical method to prepare 3D rebar graphene foam.
Figure 5D:
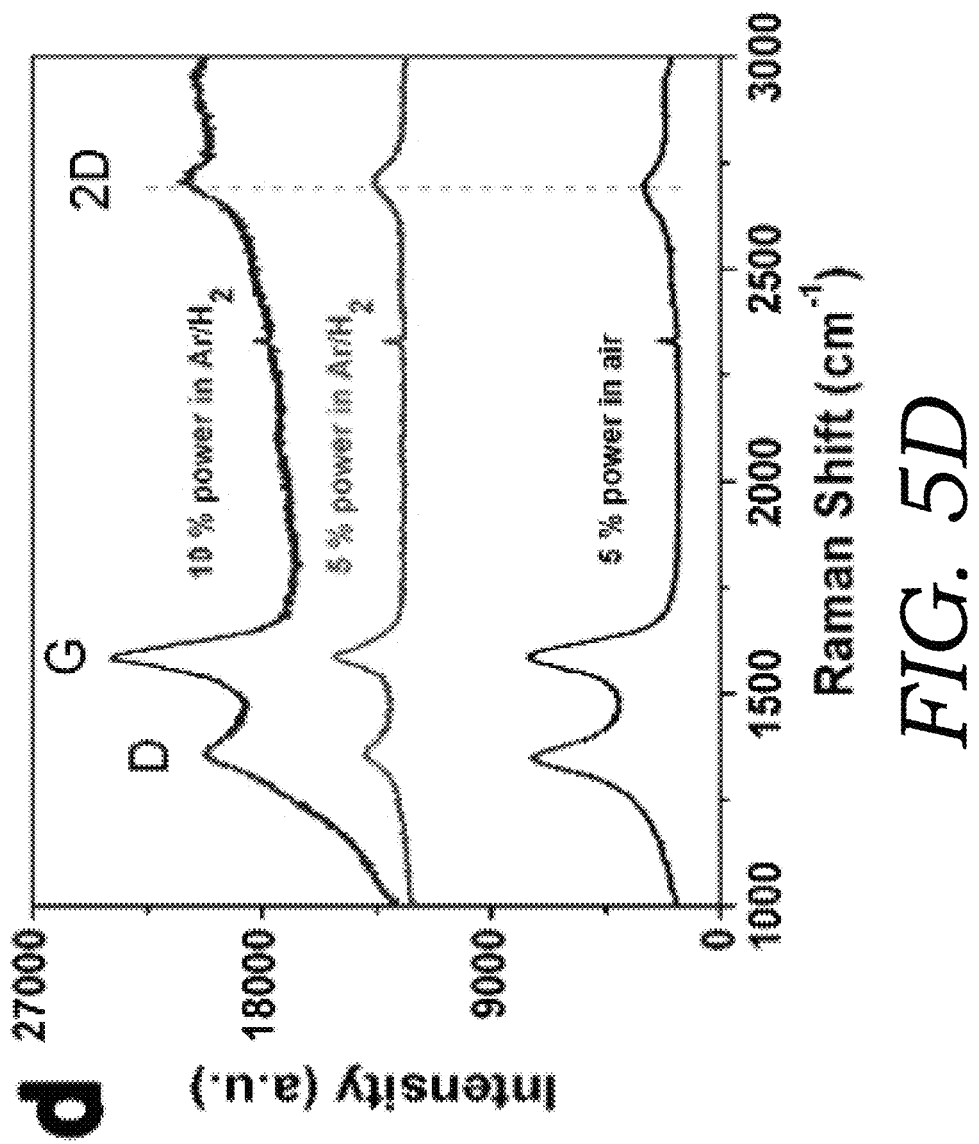
FIG. 5D is the Raman spectra of graphene grown by laser using Ni/sucrose precursor.

Certain of the steps of the method of the present invention are similar to Applicant's previously disclosed 3D graphene foam (as shown in FIG. 3) and 3D rebar graphene foam (as shown in FIGS. 4A-4C), which previously disclosed methods were prepared by powder metallurgy template (PMT) methods (rather than 3D printing methods of the present invention). [Tour '815 PCT Application]. FIGS. 3 and 4A-4C are, respectively, FIGS. 2 and 11A-11C of the Tour '815 PCT Application.

For instance, a 3D printing graphene material fabrication process of the schematic shown in FIG. 2B was performed as follows: About 3 g of Ni powders (particle size: 2.2-3.0 µm) and 0.5 g of sucrose were mixed in 150 mL of deionized (DI) water. This mixture was heated at 120° C. to evaporate water under mechanical stirring. The hybrid powders were dried at 80° C. in vacuum overnight and ground using a mortar and pestle. Next, the powders were loaded into a metal 3D printer, and the structure of the product was designed on computer. After laser treatment layer by layer in air (or $H_2$ or Ar atmosphere) at room temperature, 3D graphene reinforced Ni composite was obtained. To improve the crystallization of graphene, as well as the performance of the composite, further heat-treatment may be applied. Finally, the Ni scaffold were removed in 1 M $FeCl_3$ aqueous solution (200 mL, refilled with new solution every day until no color change). Next, the object was transferred into DI water for purification and dried using a critical point dryer (CPD) to obtain free-standing 3D graphene foams.

To further confirm that the growth of graphene on the Ni foam by laser was occurring, the Ni/sucrose hybrid powder was prepared and then pressed into pellets instead of performing the 3D printing step. A pulsed $CO_2$ laser (10.6 µm) was applied on the pellets to grow graphene. The samples were tested using SEM and Raman, as shown in FIGS. 5A-5D. Graphene sheets can be clearly observed in the SEM images of FIGS. 5A-5C, and the D, G, and 2D bands in Raman spectra (of FIG. 5D) indicated the growth of graphene. Therefore, the growth of graphene on Ni foam by laser was successfully shown.

Figure 6:
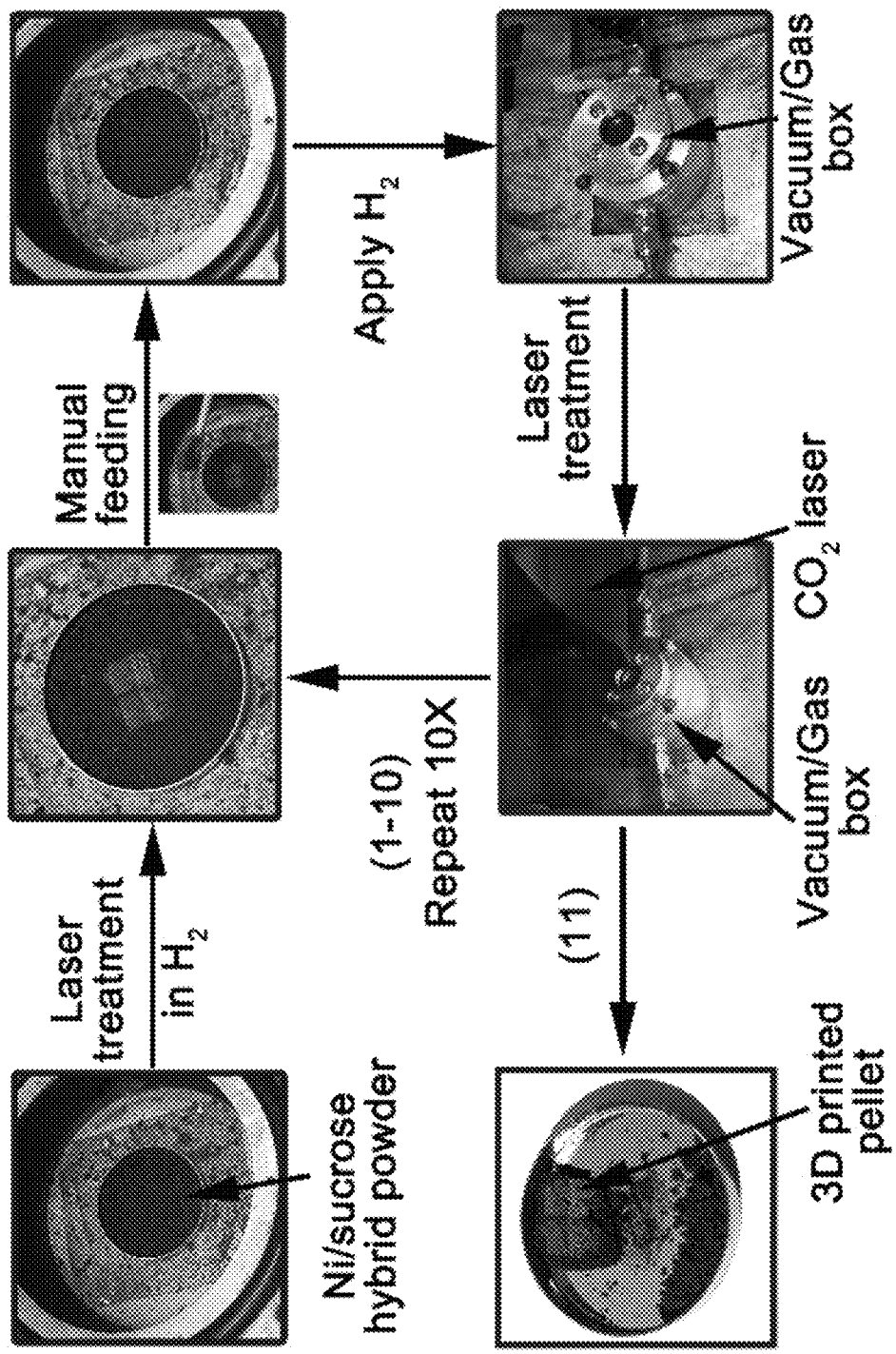
FIG. 6 is a schematic of the synthesis of 3D printed Ni/graphene discs.
Figure 7:
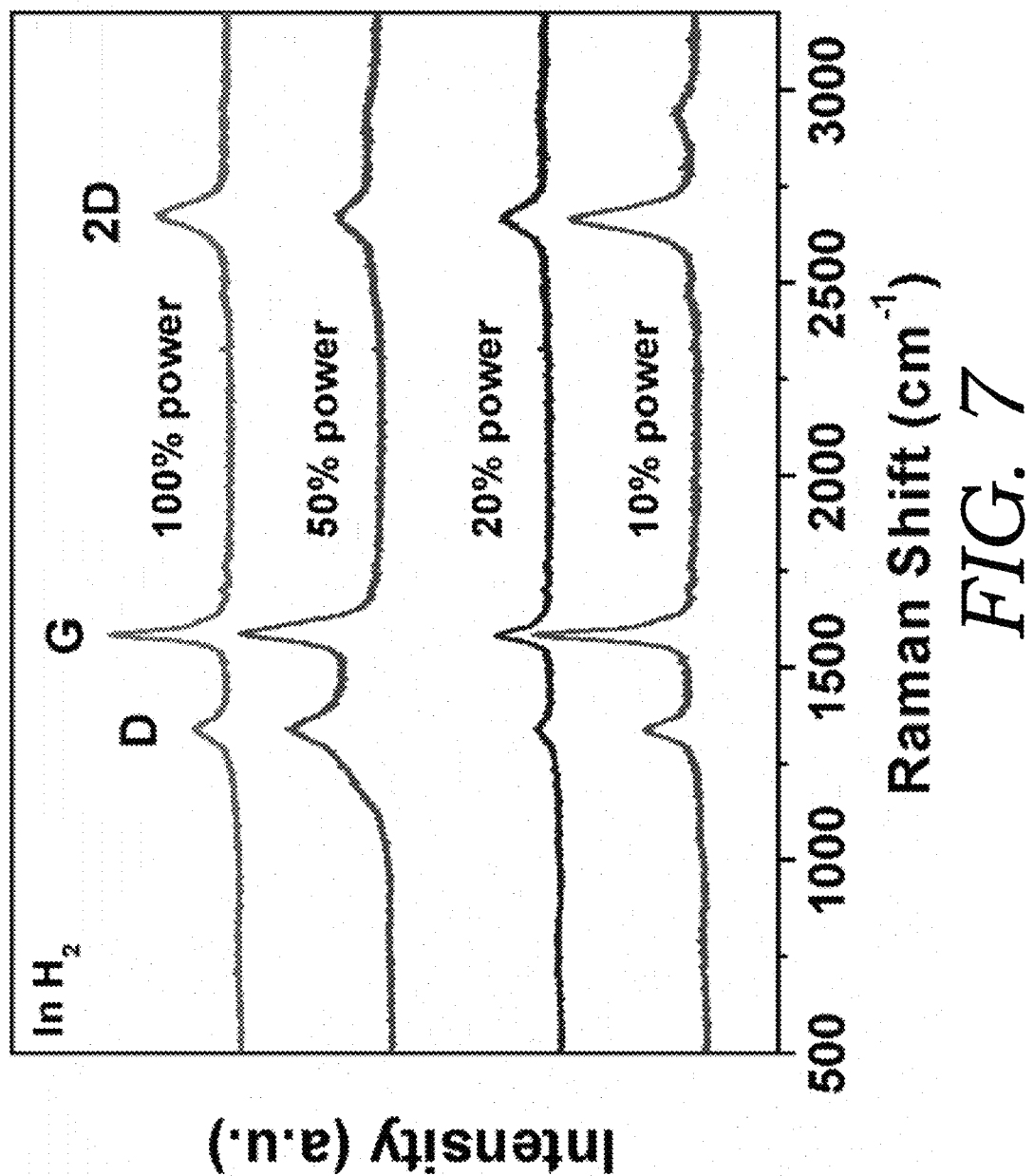
FIG. 7 is the Raman spectra of 3D printed Ni/graphene discs using 10, 20, 50, and 100% of power.
Figure 8A:
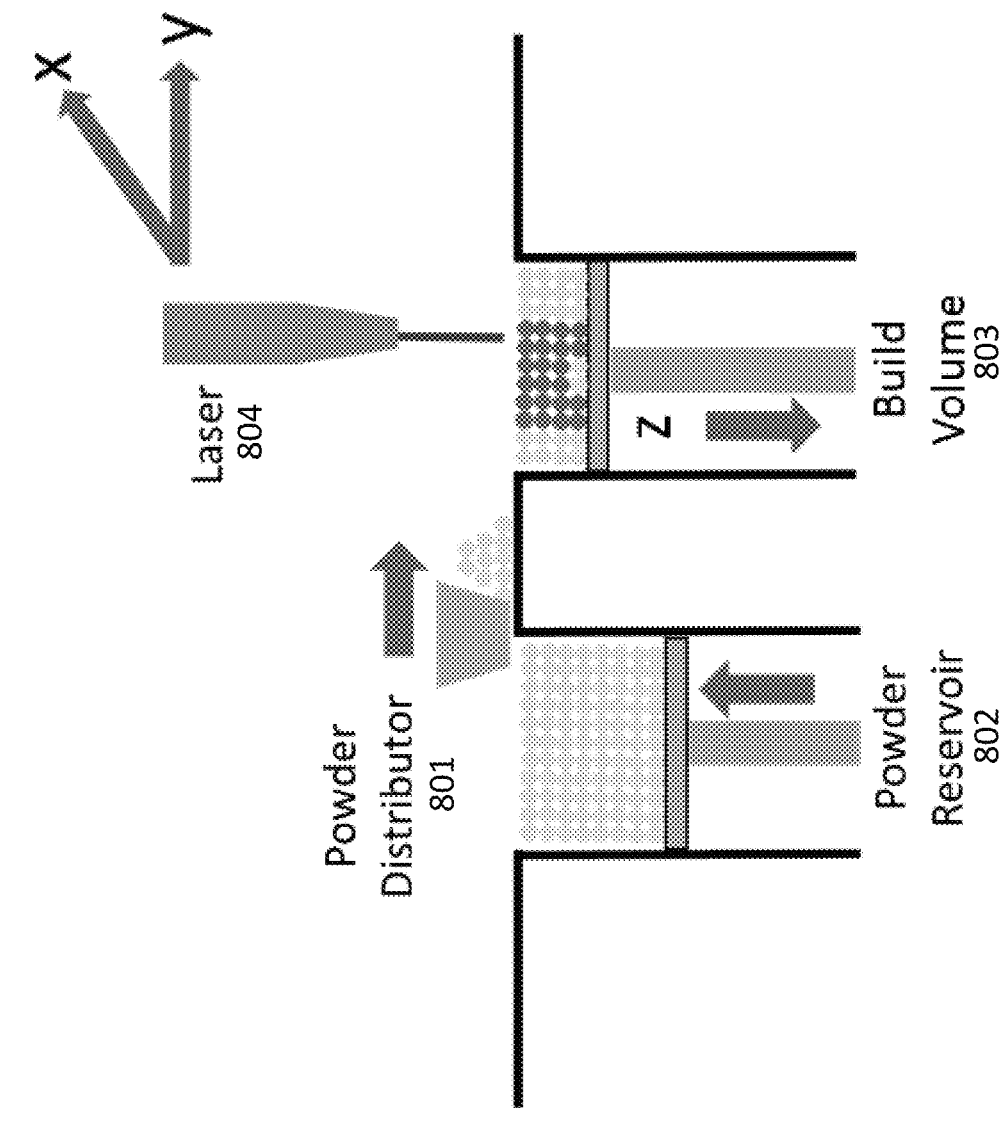
FIG. 8A is a schematic for a powder-bed system that can be used in embodiments of the present invention.
Figure 8B:
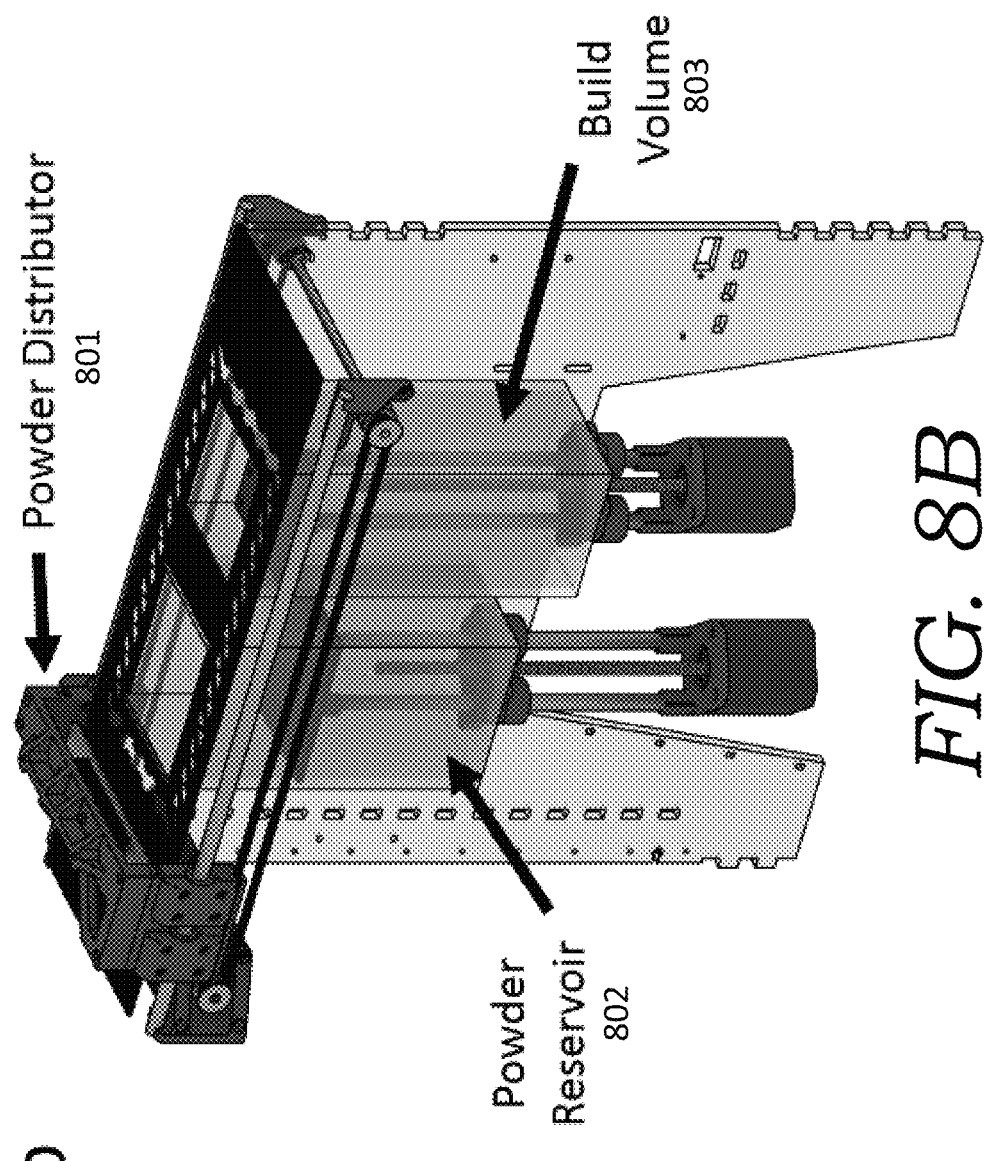
FIG. 8B is an illustration of a custom powder handing module that can be used in embodiments of the present invention.
Figure 8C:
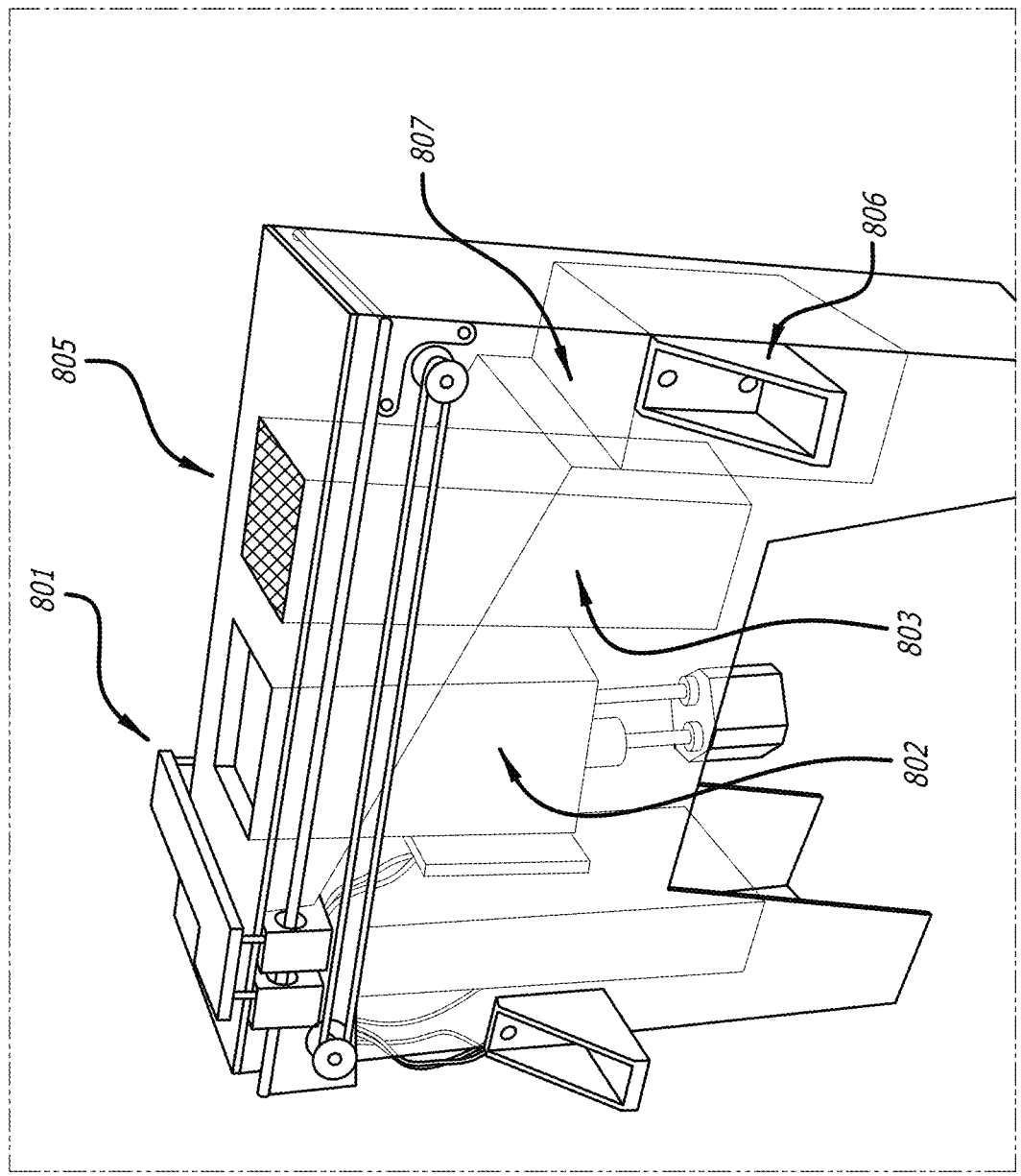
FIG. 8C is a photograph of an assembled powder handling module illustrated in FIG. 8B.
Figure 8D:
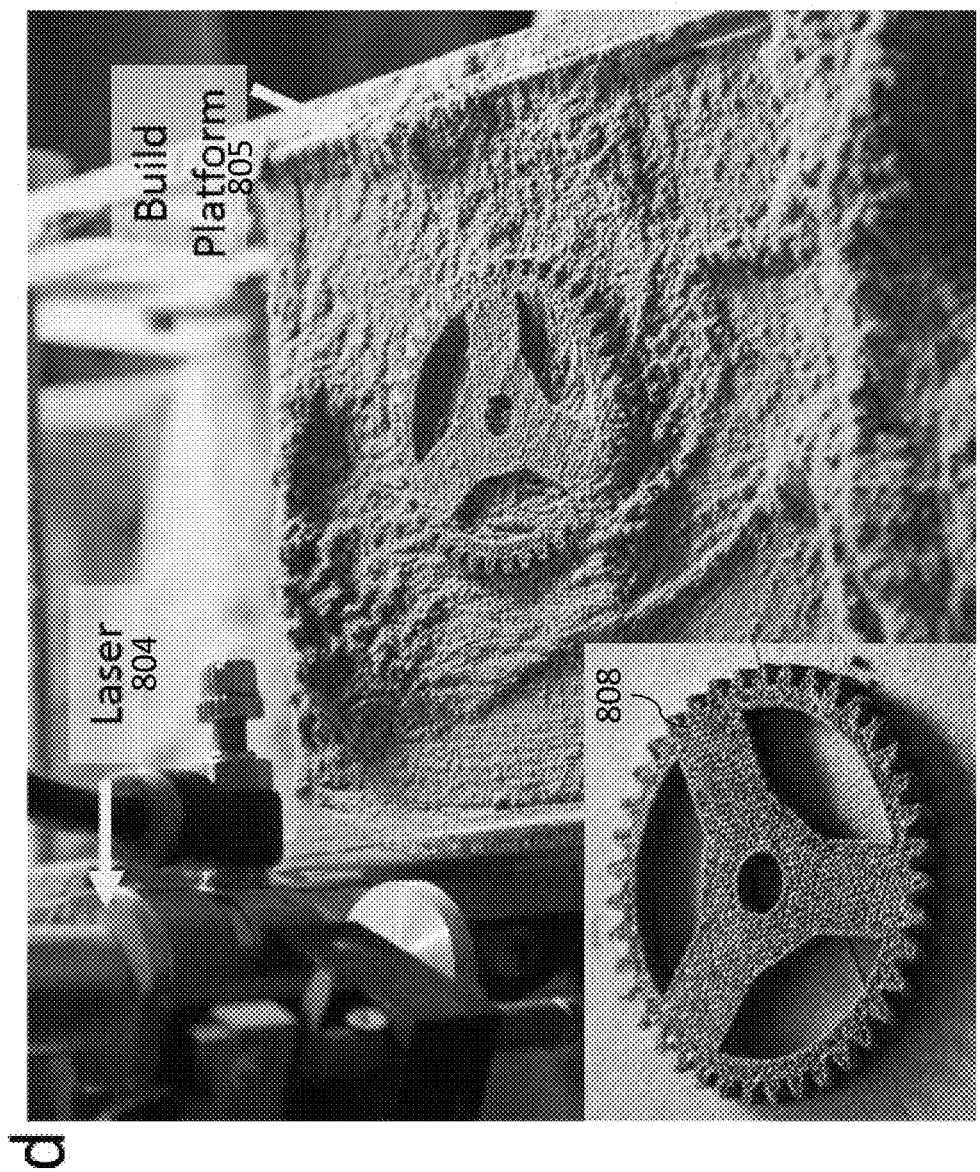
FIG. 8D is a photograph of a gear 808 that was made after the powder module shown in FIG. 8C was mounted to a laser cutter. Gear 808 was not made by an embodiment of the present invention, but rather via selective laser sintering.

The hybrid powder was also manually fed 10 times in succession, by hand, to prepare 3D printed discs to simulate the process of 3D printing, as shown in the schematic of FIG. 6. After laser treatment, 3D printed Ni/graphene discs were obtained. The sample was tested using Raman, which Raman spectra are shown in FIG. 7. The D, G, and 2D bands in this Raman spectra also demonstrated the growth of graphene.

The present invention can include numerous variations.

For instance, various metal powders may be utilized. In some embodiments, the metal powder include, without limitation, Ni, Cu, Ni—Cu alloys, Ru, Ag, Fe, Co, Al, and combinations and alloys thereof.

Moreover, various carbon sources may be utilized. For instance, in some embodiments, the carbon sources include, without limitation, sucrose, polymethyl methacrylate, glucose, poly(phenylene sulfide), carbohydrates, poly(acrylonitrile), polysaccharides, polyimide, and combinations thereof.

By changing the components of metal powders (e.g., Ni, Cu, Ni—Cu alloys, Ru, Ag, Fe, Co, Al, and the like), and by adding different carbon sources and additives (e.g., sucrose, polymethyl methacrylate, glucose, poly(phenylene sulfide), carbohydrates, poly(acrylonitrile), polysaccharides, polyimide, and the like), various types of 3D graphene materials can be directly printed. For instance, in some embodiments, the 3D graphene materials can include, without limitation, in-situ N-doped graphene foams, carbon nanotube/graphene composites, carbon fibers, carbon nanotube fibers, carbon nanoonions/graphene composites, phosphorene foams, 3D MX and/or $MX_2$ foams (e.g., where M=Mo, W, Bi, Hf, Ga, Ge, Ta, Sn, Zn, Cd, Pb, B, Nb, Zr, and the like; and where X=S, N, Se, P, and the like), and their related composite foams.

In some embodiments, the carbon nanotube-graphene rebar type printing could significantly toughen the 3D graphene materials.

The shape or structure of the 3D graphene materials can be designed by various methods. For instance, in some embodiments, the shape or structure of the 3D graphene materials of the present disclosure can be designed on a computer.

Furthermore, in some embodiments, the method can combine a powder metallurgy template method with LIG, and 3D printing techniques, which can be used to prepare large scale designable 3D carbon objects through a simple 3D printing process. Such a methods can be advantageous as it overcomes potential issues of the individual processes.

Powder-Bed Based Automatic 3D Printing of Graphene Materials

Figure 9B:
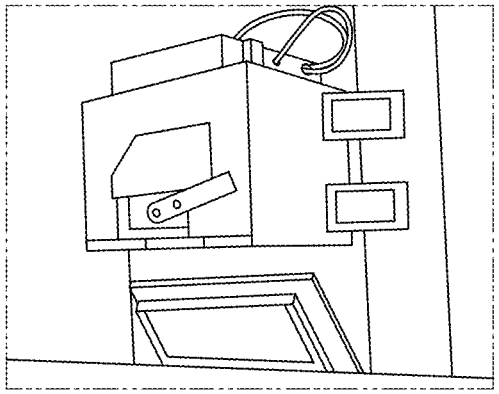
FIGS. 9A-9B are photographs of a power bed system utilized for embodiments of the present invention.
Figure 9C:
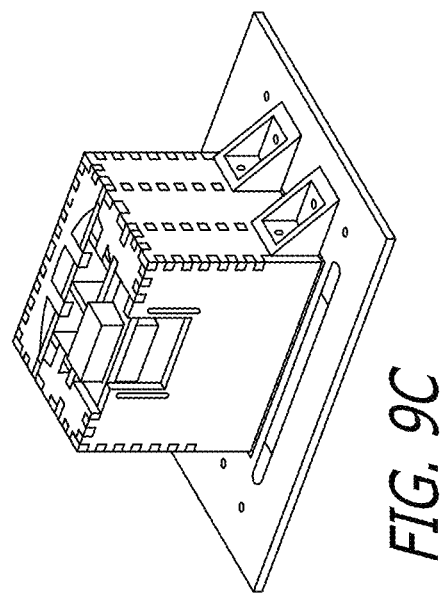
FIG. 9C is an illustration of the powder bed system in FIGS. 9A-9B.
Figure 9A:
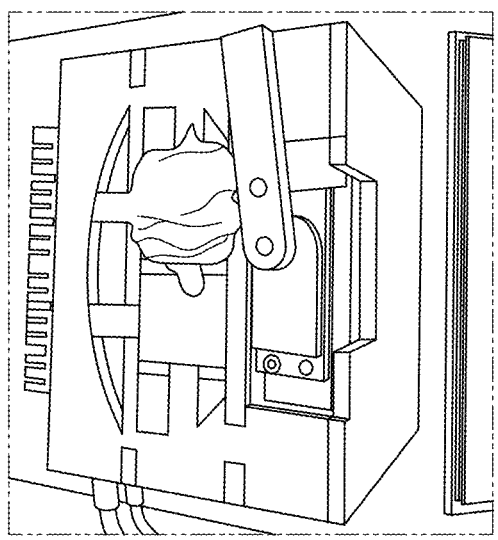

In some embodiments, a powder-bed based system to automatically 3D print graphene materials using the combined powder metallurgy and carbon growth source (such as Ni/sucrose powders). For instance, a powder-bed based system described in Kinstlinger 2016 can be utilized (modified to use the powder metallurgy and carbon growth source. FIGS. 8A-8D are reproduced from Kinstlinger 2016 (FIGS. 1A-1D therein) and show various components of the system, which can include: powder distributor 801, powder reservoir 802, build volume 803, laser 804, build platform 805, mounting bracket 806, and ducting for excess powder 807. FIGS. 9A-9B are photographs of a power bed system utilized for embodiments of the present invention. FIG. 9C is an illustration of the powder bed system in FIGS. 9A-9B.

For embodiments of the present invention, a different set of laser settings can be used. For instance, a 20 W $CO_2$ laser (10.6 µm) was used under continuous firing, with a spot size of ~300 µm. $N_2$ gas was used to flushing the laser environment.

The influence of different laser settings on the formation of graphene was tested using only one thin layer of Ni/sucrose powders. FIG. 10 shows the Raman spectra of different laser scanning speed, namely 100 mm/min, 200 mm/min, 1,000 mm/min, 2,000 mm/min, 5,000 mm/min, and 10,000 mm/min shown in plots 1001-1006, respectively (all with 100% laser power of a 20 W $CO_2$ laser). Graphene Raman signals can be observed clearly with the speeds of 1,000 mm/min and 2,000 mm/min.

Figure 11A:
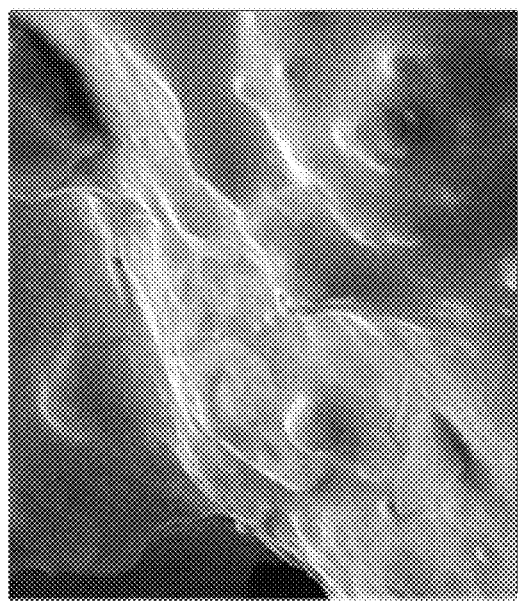
FIGS. 11A-11B are, respectively, an SEM image and the Raman spectra of a laser-irradiated Ni/sucrose powder with a laser setting of 2,000 mm/min, 20% power of a 20 W $CO_2$ laser.
Figure 11B:
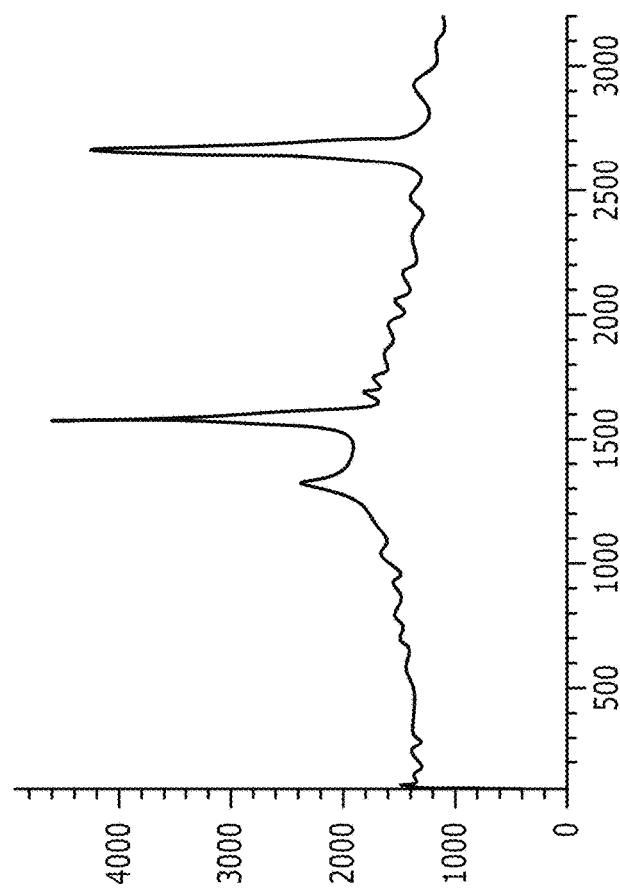
Figure 11C:
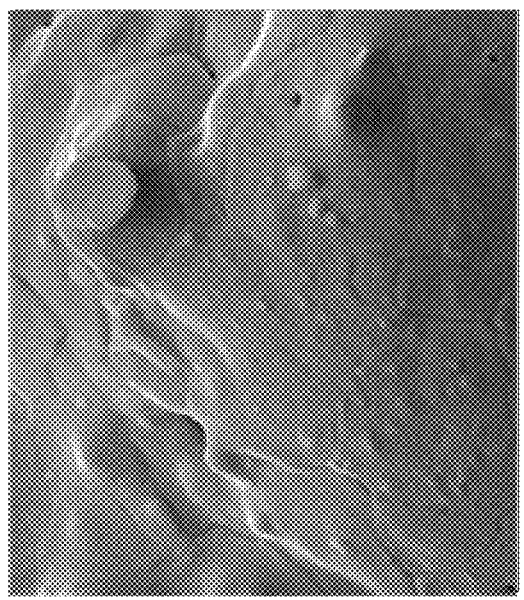
FIGS. 11C-11D are, respectively, an SEM image and the Raman spectra of a laser-irradiated Ni/sucrose powder with a laser setting of 2,000 mm/min, 50% power of a 20 W $CO_2$ laser.
Figure 11D:
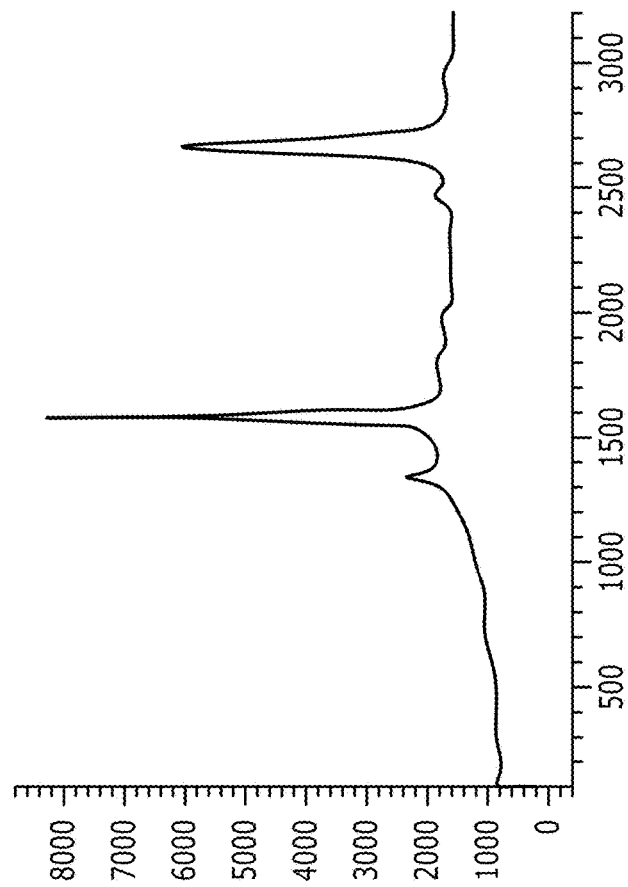
Figure 11E:
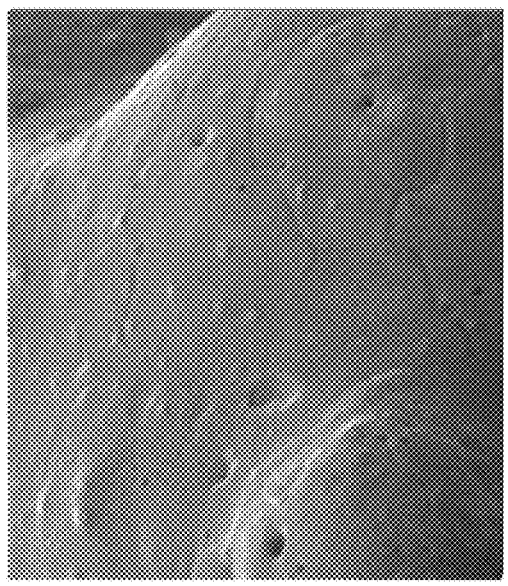
FIGS. 11E-11F are, respectively, an SEM image and the Raman spectra of a laser-irradiated Ni/sucrose powder with a laser setting of 2,000 mm/min, 100% power of a 20 W $CO_2$ laser.
Figure 11F:
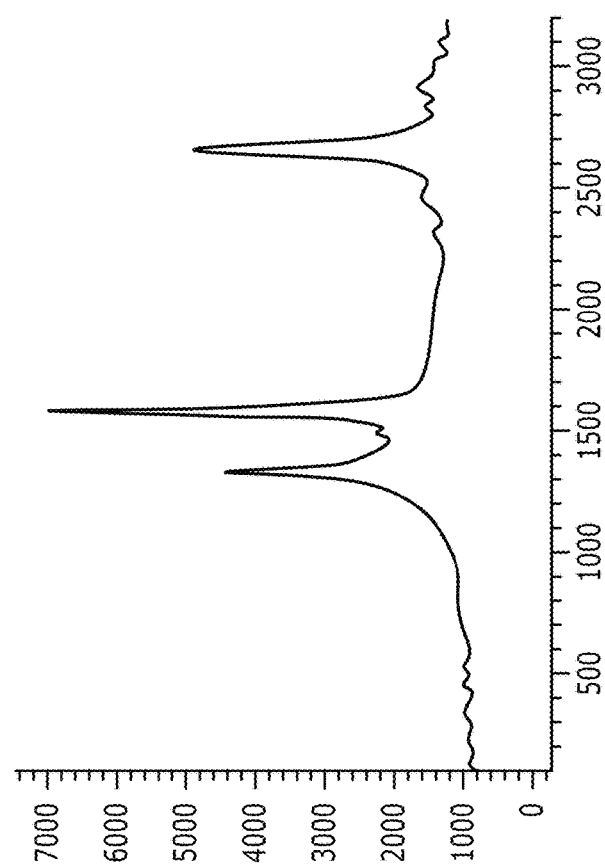

The laser settings also can be used to control the formation and quality of the resulting graphene. FIGS. 11A-11F show SEM images and Raman spectra of graphene formed for selected conditions. FIGS. 11A, 11C, and 11E are the SEM images of a laser-irradiated Ni/sucrose powder with a laser setting of 2,000 mm/min, at, respectively, 20%, 50%, and 100% power of a 20 W $CO_2$ laser. FIGS. 11B, 11D, and 11F are the Raman spectra corresponding to the laser-irradiated Ni/sucrose powder of FIGS. 11A, 11C, and 11E, respectively. Graphene wrinkles and Raman signals can be clearly observed in FIGS. 11A-11F.

After use of the powder-bed based system to automatically 3D print graphene materials, this can be followed by etching and drying processes such as described above.

Figure 12:
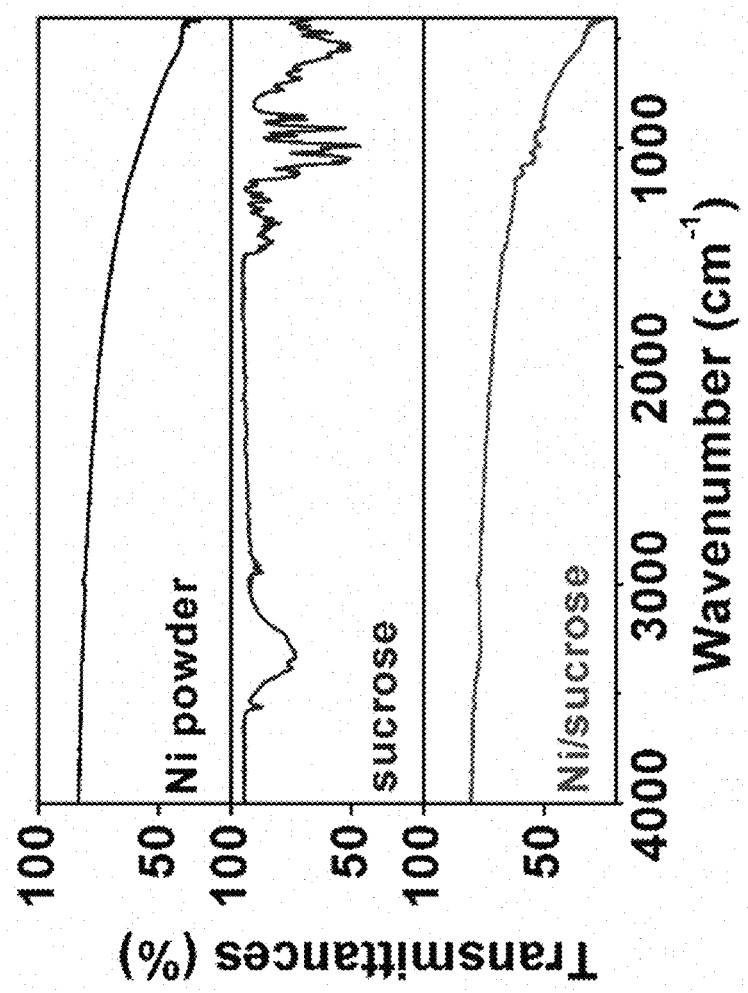
FIG. 12 is an ATR-IR spectra of Ni powder, sucrose, and Ni/sucrose hybrid powder.

Hybrid powders of Ni coated with sucrose were prepared and then used in a simulated powder bed system for 3D printing. The specific 3D printing process is similar to the previously reported laser sintering process [Kruth 2004]. During the irradiation process (such as under $H_2$ atmosphere), both the Ni powder and sucrose absorbed the laser light were locally heated to a high temperature (see FIG. 12), enabling the sintering of Ni powders to Ni scaffolds at the laser spot. (As shown in FIG. 12, sucrose absorbs light about 1000 cm$^{-1}$ (about 10 µm). Ni absorbs at low wavenumbers. Thus, a 10.6 µm $CO_2$ laser, which should heat both Ni and sucrose, was employed in this work to grow graphene [Lin 2014; Peng 2015]. Based on known graphene growth mechanisms, the Ni particles will be sintered and sucrose will decompose to generate atomic C. The C will dissolve in the hot Ni and precipitate during the fast cooling process to form multi-layered graphene on the Ni surface).

Simultaneously, the sintered Ni scaffolds acted as the template and catalyst for graphene growth through the dissolution-precipitation process [Li 2009], while the sucrose acted as the solid carbon source [Sun 2010]. As the laser rastered across the entire printing area, each laser spot (about 100 µm) exposure time was less 1 ms before the laser moved to another spot.

For each spot, the local heating first allowed the carbon from sucrose to dissolve in the Ni, and as the laser moved away, the carbon would then precipitate during the fast cooling process to form graphene on the surface of the sintered Ni scaffolds. The laser rastered over the entire area. After the first rastering, another thin layer of powder was manually added onto the top of the sample, followed by another laser irradiating process. After repeating 20 times, the 3D printed graphene foam/Ni was obtained. After etching of Ni in an $FeCl_3$ aqueous solution (1M), purifying in DI water, and drying by a critical point dryer (CPD), a free standing 3D printed graphene foam with the designated shape was obtained.

3D Printing of Graphene Materials Using Metal Powder with Binder

In other embodiments of the present invention, a 3D graphene object can be prepared through the CVD treatment of a 3D printed metal/binder object.

Figure 13A:
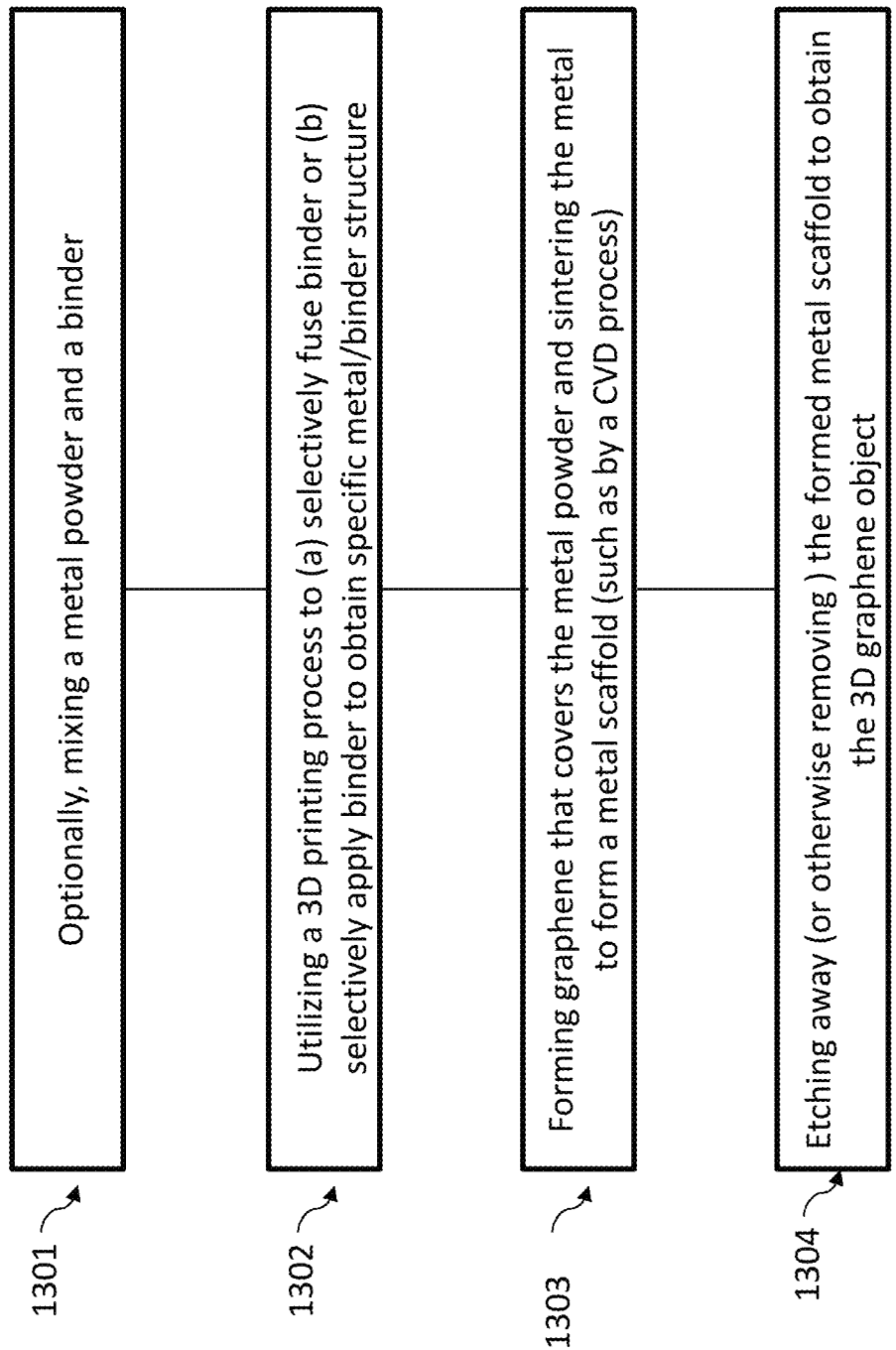
FIG. 13A is a flowchart showing a method to form a 3D graphene material involving a metal powder with a binder.

Such methods generally include one or more of the following steps, which are shown in the flowchart of FIG. 13A:

Step 1301: (Optionally) Mixing a metal powder (e.g., nickel) with a binder (e.g., a polymer-based binder) to provide a mixture (e.g., a powder mixture) of metal and binder (e.g., nickel/binder).

Step 1302: Utilizing a 3D printer method to selectively fuse the binder or selectively apply binder to obtain specific metal/binder structures.

Step 1303: Forming graphene sheets that cover the metal powder, such as by a CVD process. In some instances, this forming is converting the binder into the graphene sheets. In other instances, this forming is by performing the CVD process utilizing a separate carbon source.

Step 1304: Etching away (or otherwise removing) the formed metal scaffold to form the 3D graphene material.

It should be noted that in some embodiments, the binder is optionally mixed with the metal powder in step 1301. However, untreated metal power can be used in step 1302, in which case, the binder is applied in situ during the 3D printing process of step 1302. In such case, the metal powder is not fused in step 1302, but rather the metal powder is held together by the binder.

Optionally, in some embodiments, the etching process can be eliminated or only partially performed such that the 3D object is a 3D graphene material that is a 3D metal/graphene composite material. Again, the 3D metal/graphene composite material can have added strength or mechanical properties as compared to that of 3D objects that a predominately (or entirely) graphene or metal.

Figure 13B:
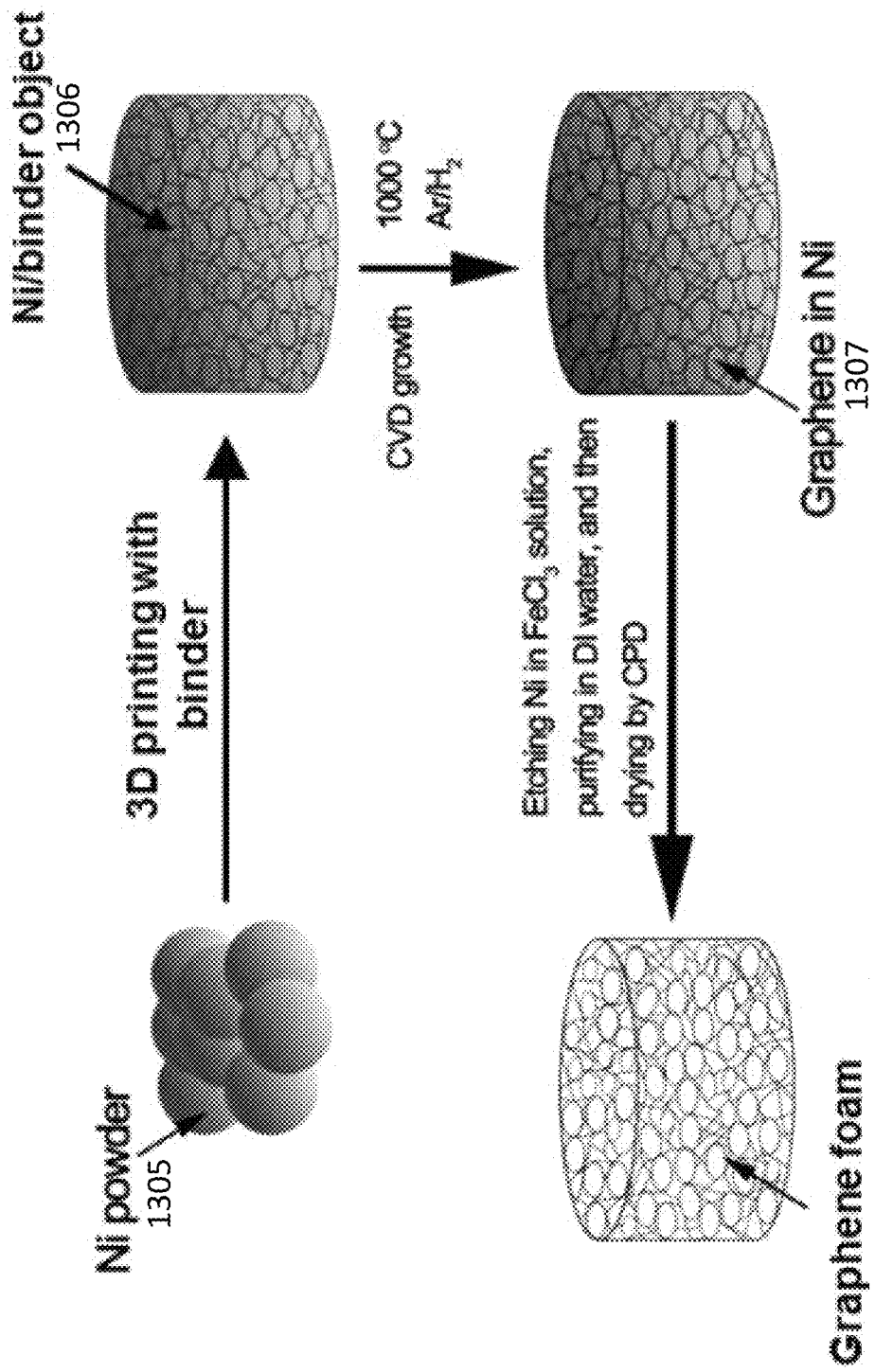
FIG. 13B is a schematic of the preparation of 3D graphene material from 3D printed metal/binder object.

A schematic of such a 3D printing process is shown in FIG. 13B. Metal powders (such as Ni powder 1305) can be used as the feedstock for 3D printing, with the assist of a polymer-based binder to stick the metal particles together in the 3D printed Ni/binder object 1306. The Ni/binder object 1306 then goes through a CVD process where the polymer-based binder is converted into graphene sheets that cover the Ni powders (graphene in Ni 1307). The polymer-based binder acts as the carbon source for graphene growth on the surface of the Ni powders. The Ni converts the binder into carbon atoms that dissolved in the graphene upon heating (such as to 1000° C.) in the CVD furnace, and then the carbon precipitated out as graphene upon cooling.

As shown in the process of FIG. 13B, embodiments, the binder is the carbon source. The heating in the CVD furnace can be done under an atmosphere of $H_2$ (or $H_2/Ar$) to prevent oxidation at that temperature. In this CVD process, neither hydrogen nor other chemicals are being deposited to become part of the structure. Such heating can alternatively be done in a non-CVD furnace using $H_2$ and/or Ar.

In an alternative embodiment, the binder can be a substance the metal powder together until sintered but is not the carbon source. The heating in the CVD furnace can be done under an atmosphere of a carbon source, such as methane ($CH_4$), which carbon source (such as methane) can be used as a growth gas for the graphene during the CVD process (in which there is deposition taking place).

Returning to FIG. 13B, after the formation of the graphene in NI 1307, the Ni scaffold is then etched away, such as using a solution etchant (such as with ferric chloride/water) thereby leaves a free-standing graphene object 1308 that matches the shape of the 3D patterned design. The object can be monolithic, but that is not required. The resulting all-graphene object can have high specific surface area, good crystallization, good electrical conductivity, and mechanically robustness. The average particle size in the range can be between about 100 nm and about 1 cm average size and is generally in the range of about 1 µm to about 100 µm.

Figure 14:
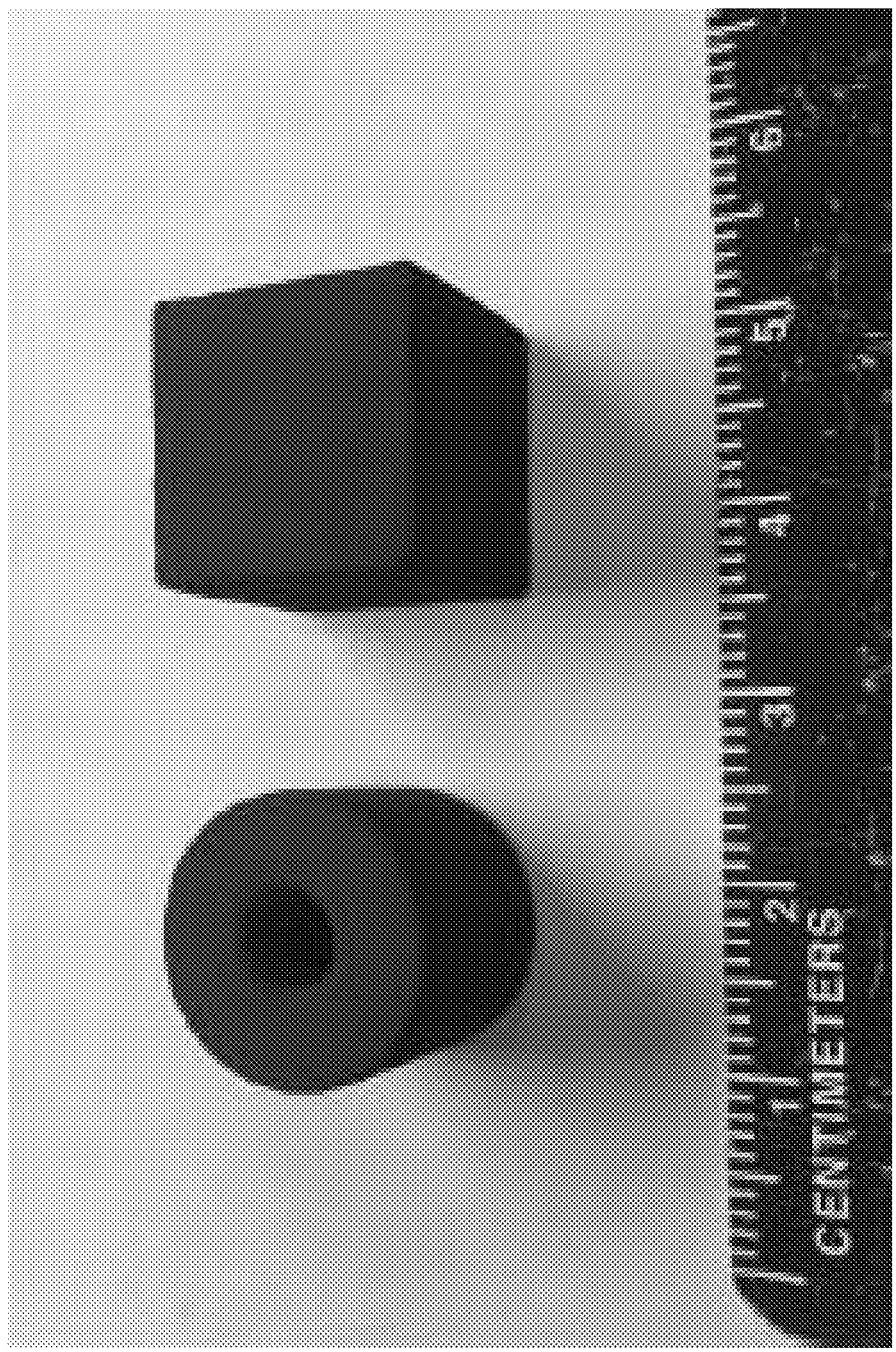
FIG. 14 is a photograph of as-printed 3D Ni/binder objects. (70% saturation was used for the 3D printing).
Figure 15B:
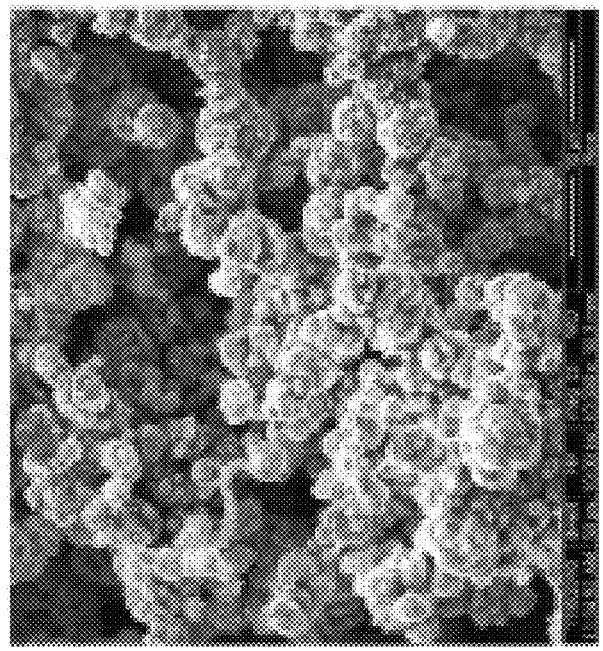
FIGS. 15A-15B are SEM images for the 3D printed Ni/binder objects with FIG. 15A being the inside structure of the objects and FIG. 15B being the outside surface of the objects. (70% saturation was used for the 3D printing of Ni/binder objects).
Figure 15A:
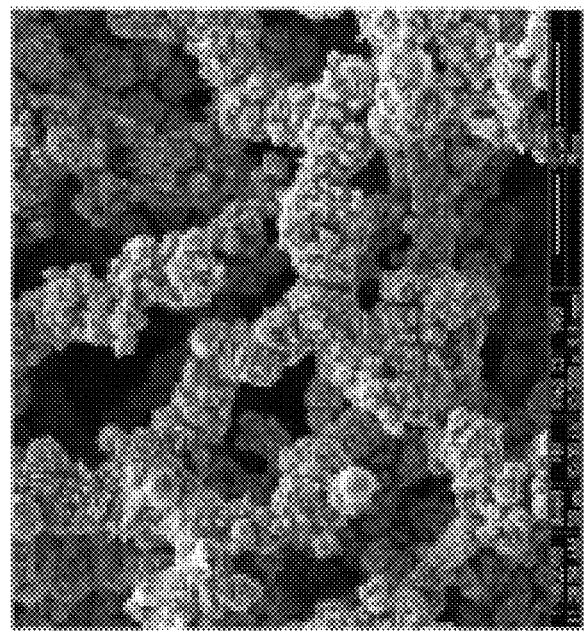
Figure 15D:
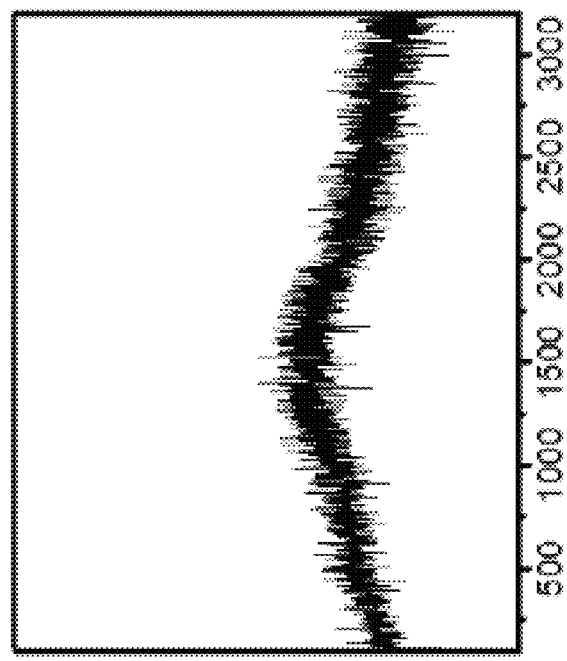
FIGS. 15C-15D are Raman characterizations for the 3D printed Ni/binder objects shown in FIGS. 15A-15B, respectively.
Figure 15C:
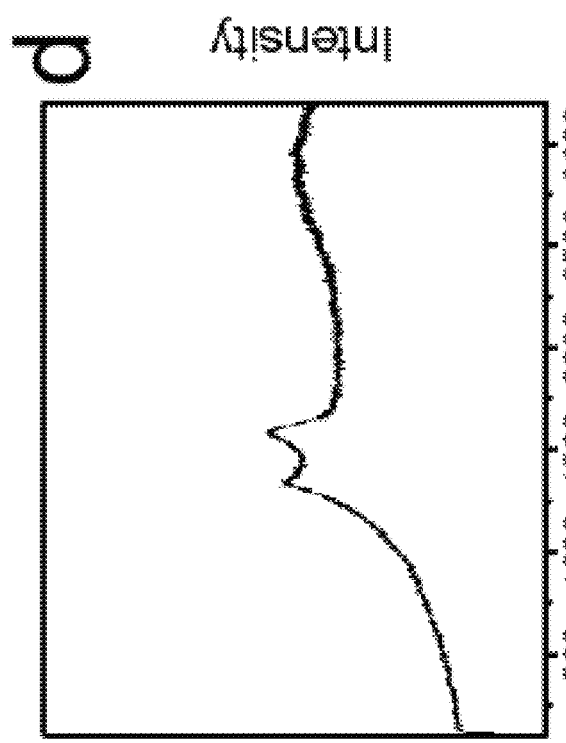
Figure 16B:
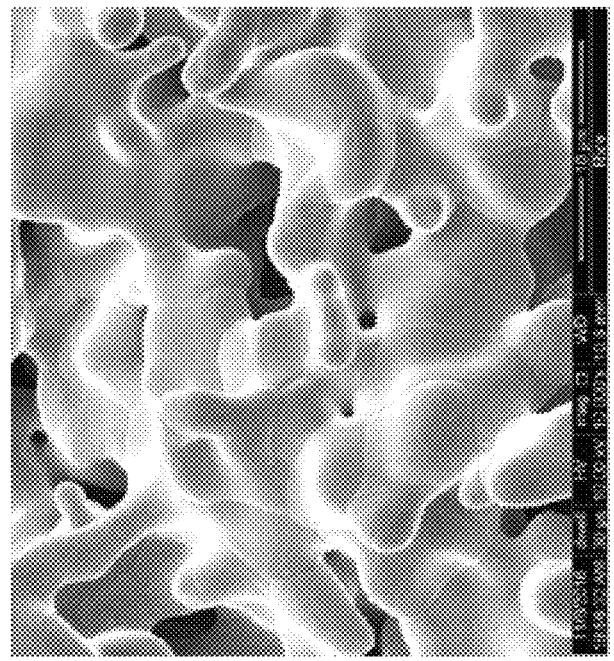
FIGS. 16A-16B are SEM images for as-grown 3D Ni/graphene objects after CVD treatments with FIG. 16A being the inside structure of the objects and FIG. 16B being the outside surface of the objects. (70% saturation is used for the 3D printing of Ni/binder objects before the CVD treatments).
Figure 16A:
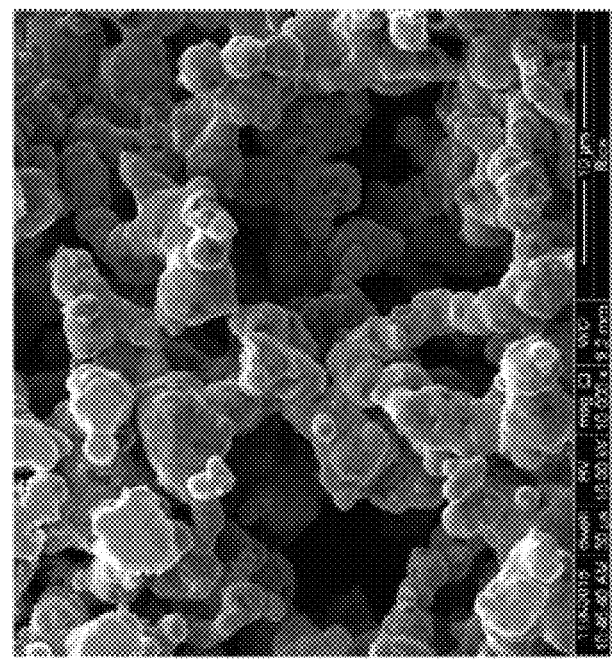
Figure 18B:
FIGS. 18A-18B are photographs of free-standing 3D graphene foam during purification. For FIG. 18A, 70% saturation is used for the 3D printing of Ni/binder objects prior to the CVD treatments. For FIG. 18B, 105% saturation is used for the 3D printing of Ni/binder objects prior to the CVD treatments.
Figure 18A:
Figure 18C:
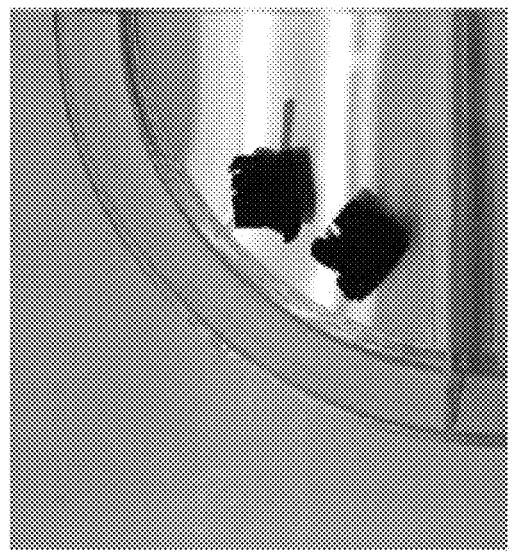
FIGS. 18C-18D are photographs of free-standing 3D graphene foam of FIGS. 18A-18B, respectively, after CPD drying. The objects of FIGS. 18C-18D were intact after CPD drying, but were cut into two pieces before the photographs were taken.
Figure 18D:
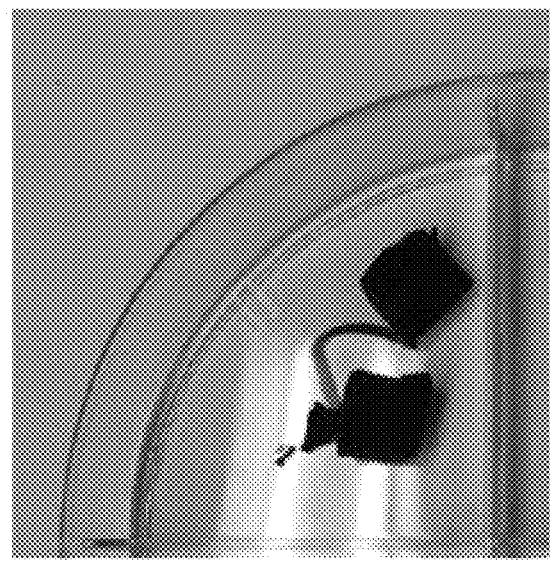
Figure 20A:
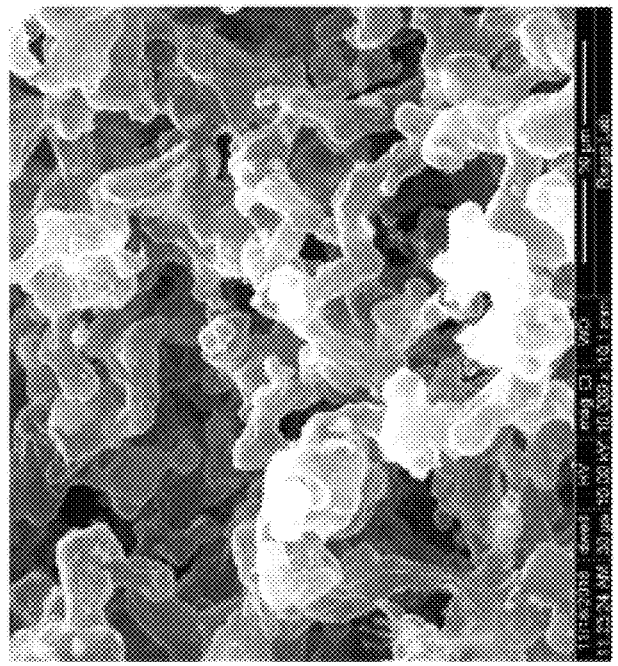
FIGS. 20A-20B are SEM images for 3D graphene foam after CPD drying with FIG. 20A being the inside structure of the objects and FIG. 20B being the outside surface of the objects. (105% saturation is used for the 3D printing of Ni/binder objects prior to the CVD treatments).
Figure 20B:
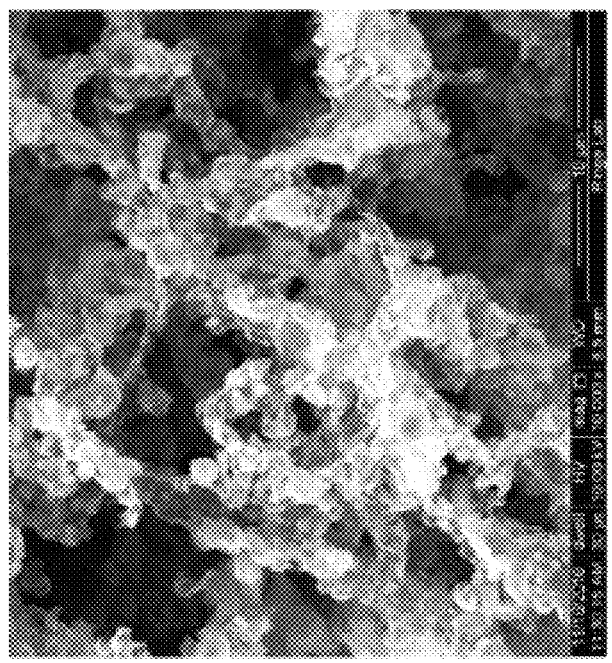

For example, Ni powders (particle size: 2.2-3.0 µm) were loaded into a metal 3D printer (ExOne), and a polymer-based binder (a polysaccharide) was used to 3D print Ni/binder objects with the designed shape. A photograph of the as-printed objects is shown in FIG. 14 and SEM images and Raman characterizations are shown in FIGS. 15A-15D. FIGS. 15A-15B are SEM images for the 3D printed Ni/binder objects with FIG. 15A being the inside structure of the objects and FIG. 15B being the outside surface of the objects. (70% saturation was used for the 3D printing of Ni/binder objects). FIGS. 15C-15D are Raman characterizations for the 3D printed Ni/binder objects shown in FIGS. 15A-15B, respectively.

These objects then went through a CVD process: the objects were placed in the center position of a tube-furnace inside a quartz tube, under a flow of $Ar/H_2$ (500 sccm/200 sccm, 9 Torr), the temperature of the furnace was slowly increased to 1000° C. (10° C./min), held at 1000° C. for 30 min, and then the objects were quickly removed from the hot zone with a magnetic boat slider, and allowed to cool to room temperature in over a period of about 10 min.

FIGS. 16A-16D and 17A-17D show the SEM and Raman characterization data of the as-grown objects. As seen in FIGS. 16A-16D and 17A-17D, graphene signal, i.e. sheet-like structure and D/G/2D Raman peaks, can be observed for almost all cases, indicating the successful preparation of 3D Ni/graphene forms.

The Ni scaffold were then removed by etching in 1 M $FeCl_3$ aqueous solution, and the object was then transferred into DI water for washing from the residual metals (Ni and Fe salts), and finally dried using a critical point dryer (CPD) to obtain free-standing 3D graphene foams. This constitutes 3D printing of graphene foams. FIGS. 18A-18D show the 3D graphene foams during purification and after CPD drying. FIGS. 19A-19D and 20A-20D show the SEM and Raman characterization data of the 3D graphene foams, and, again, the graphene signal can be observed for almost all spot excitations, indicating the successful preparation of 3D graphene foams.

Unlike other methods in which the shape of the graphene foam is limited by the shape of the mold/die (which has advantages for mass production), for the method of the present invention, the shape of the graphene foam can be directly controlled through the 3D printing of the Ni/binder object, thus favored for more complicated applications where a specific shape of the graphene foam is required and perfect for prototyping en route to the scaled process.

Such process can also be utilized as a complementary method to the laminated object technique disclosed and described in Applicant's Tour '574 Application.

The present invention can include numerous variations.

By changing the components of metal powders (such as Ni, Cu, Ni—Cu alloys, Ru, Ag, Fe, Co, Al, etc.), using different binder and/or additives (such as sucrose, polymethyl methacrylate, glucose, poly(phenylene sulfide), carbohydrates, poly(acrylonitrile), polysaccharides, polyimide, etc.), various types of 3D materials can be directly printed. This could include in-situ N-doped graphene foams, carbon nanotube/graphene composites, carbon nano-onions/graphene composites, phosphorene foams, 3D MX and/or $MX_2$ foams (M=Mo, W, Bi, Hf, Ga, Ge, Ta, Sn, Zn, Cd, Pb, B, Nb, Zr, etc.; X=S, N, Se, P, etc.), and their related composite foams. The binder can vary from sugars, polysaccharides, synthetic polymers, as long as they contain carbon for graphene growth.

By adding other elements to the binder as part of the binder or as a mixture to the binder, other elements can be incorporated in the graphene structure, such as B, N, P, S, and other chalcogenides or metals, such as Fe.

Furthermore, carbon nanotubes can be added to the binder (multi-walled or single-walled or BN nanotubes) and make reinforced structures. [See Sha 2017 regarding other types of graphene materials].

Additionally, other gases (or solid or liquid sources such as ammonia borane with flowing gas over them) can be used during the CVD step to incorporate heteroatoms, such as N, B, P and S, into the graphene.

Laser Irradiation

Two noteworthy variables for control of the laser irradiation process are the laser duty cycle and the rastering speed. In general, higher laser duty cycle and lower rastering speed will result in higher energy input per unit area. In embodiments of the present invention, samples fabricated using different rastering speeds and duty cycles were systematically analyzed. The rastering speeds were 1, 2, 3, and 5%, which are referred to as 1S, 2S, 3S, and 5S, respectively. Similarly, the laser duty cycles used in this experiment are 10, 20, 50, and 100%, which are referred to as 10P, 20P, 50P, and 100P, respectively.

Figure 21A:
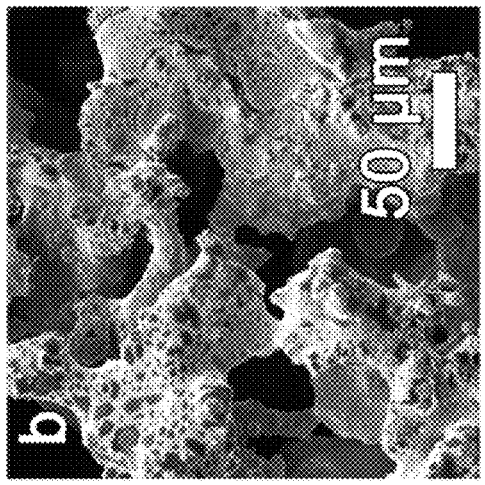
FIGS. 21A-21H are SEM images of 3D printed graphene foams with a Ni scaffold prepared using 100P and (FIGS. 21A-21B) 5S, (FIGS. 21C-21D) 3S, (FIGS. 21E-21F) 2S, and (FIGS. 21G-21H) 1S in a $H_2$ atmosphere.
Figure 21B:
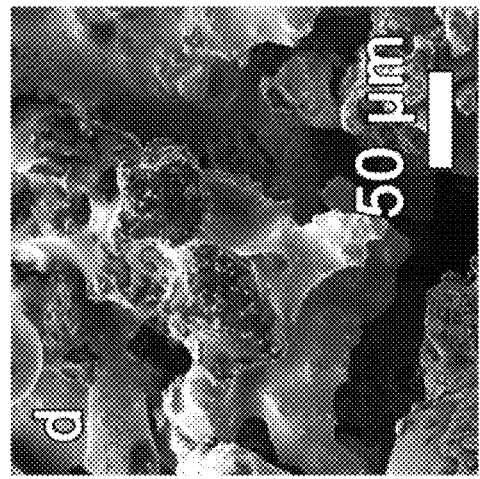

As shown in the scanning electron microscope (SEM) images in FIGS. 21A-21H and 22A-22D, although graphene sheets can be grown on the surface of sintered Ni scaffolds with 100P and 1S, 2S, 3S, and 5S, large amounts of unreacted observed in FIGS. 21A-21B at the highest 5S speed, indicating that the sucrose was not completely converted. When the rastering speed was decreased, the amount of unreacted sucrose decreased, and the sintered Ni scaffolds were larger and had smoother surfaces. With the slower rastering speed, the laser remained at each spot for more time, delivering more energy and heat to each particular spot. This increased energy and heat converted more sucrose to graphene and allowed the Ni crystalline grain to grow larger.

Figure 21C:
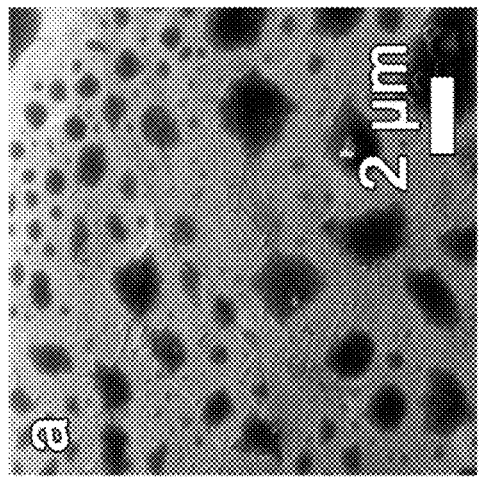
Figure 21D:
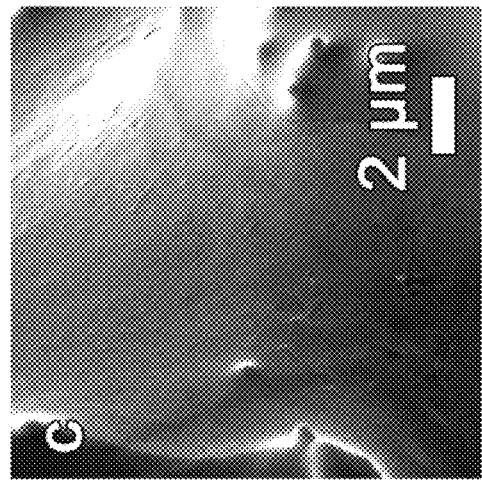
Figure 21F:
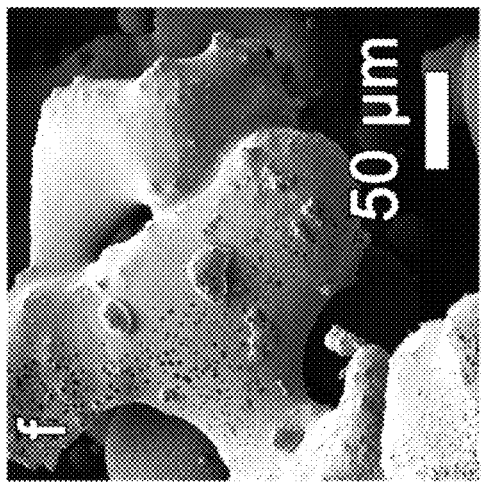
Figure 21H:
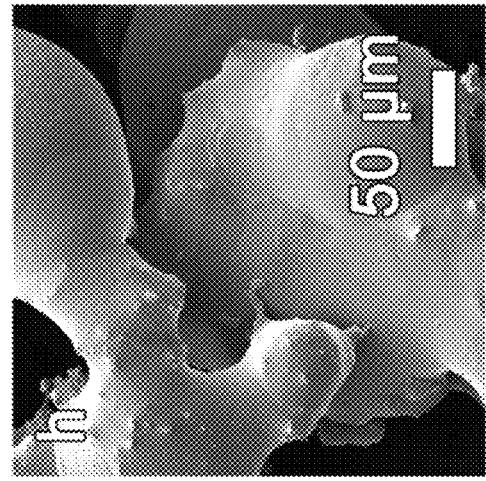
Figure 21E:
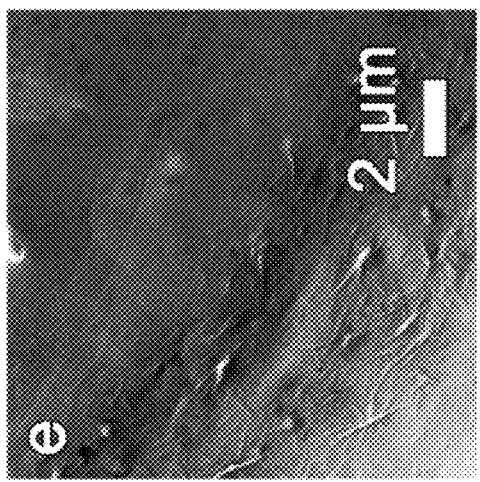
Figure 21G:
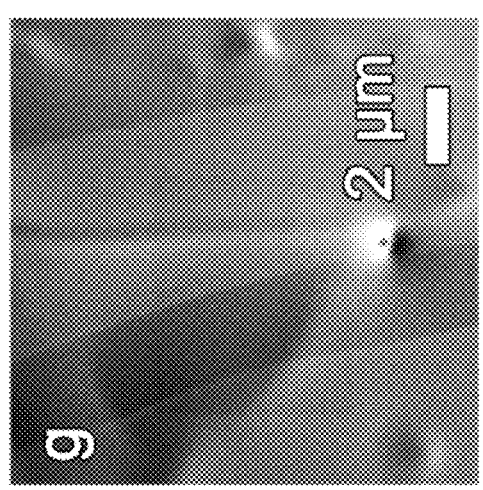
Figure 22A:
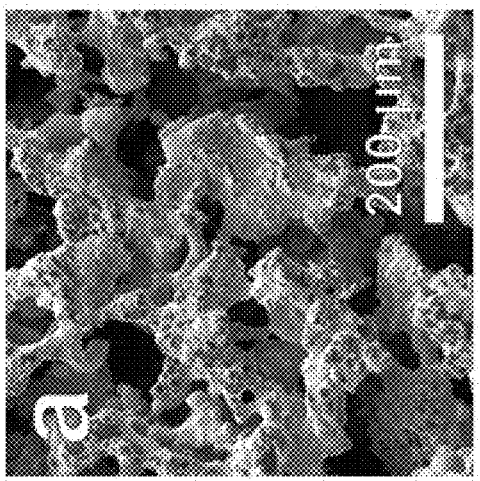
FIGS. 22A-22D are low magnification SEM images of 3D printed graphene foams with Ni scaffold prepared using 100P and (FIG. 22A) 5S, (FIG. 22B) 3S, (FIG. 22C) 2S, and (FIG. 22D) 1S in a $H_2$ atmosphere.
Figure 22B:
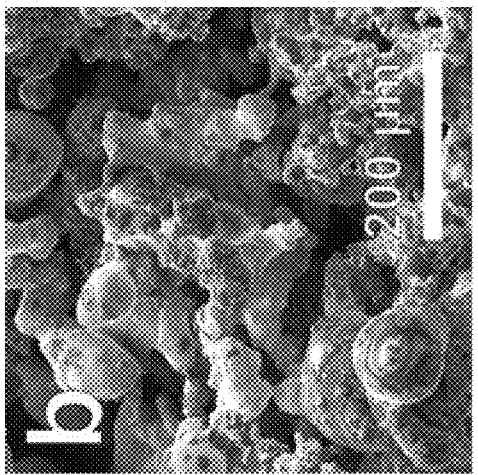
Figure 22C:
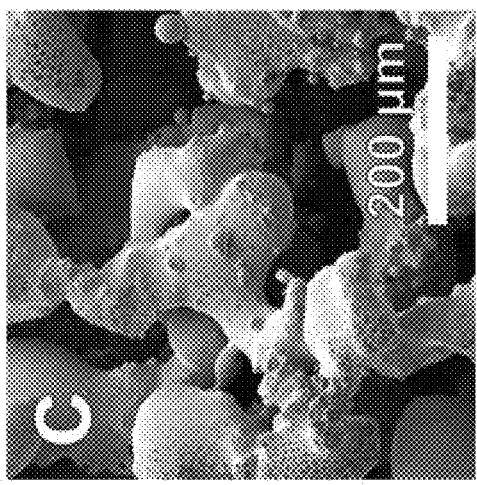
Figure 22D:
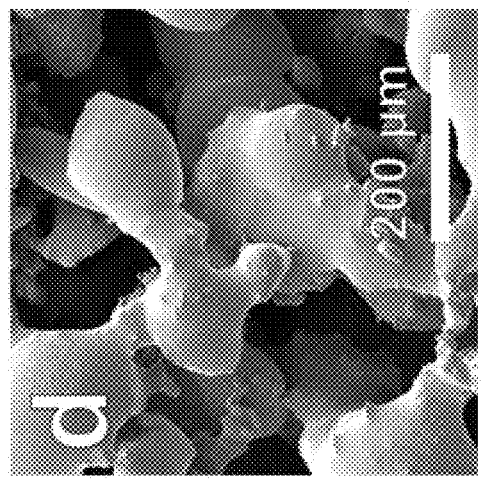
Figure 23A:
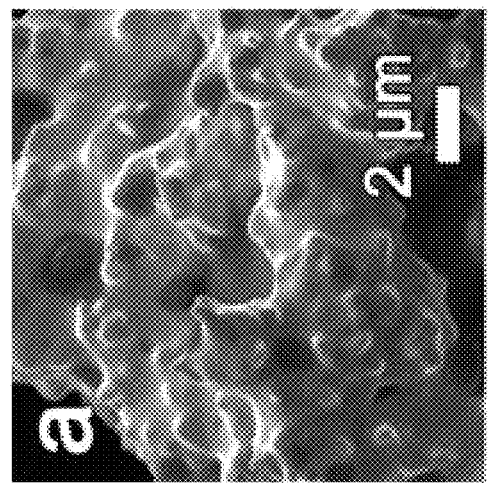
FIGS. 23A-23H are SEM images of 3D printed graphene foams with Ni scaffold prepared using 5S and (FIGS. 23A-23B) 10P, (FIGS. 23C-23D) 20P, (FIGS. 23E-23F) 50P, and (FIGS. 23G-23H) 100P in a $H_2$ atmosphere.
Figure 23B:
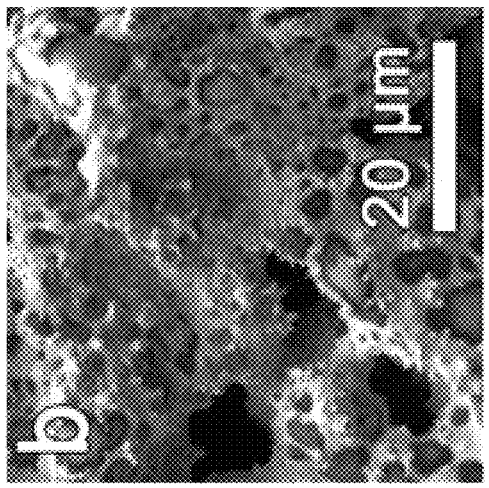
Figure 23C:
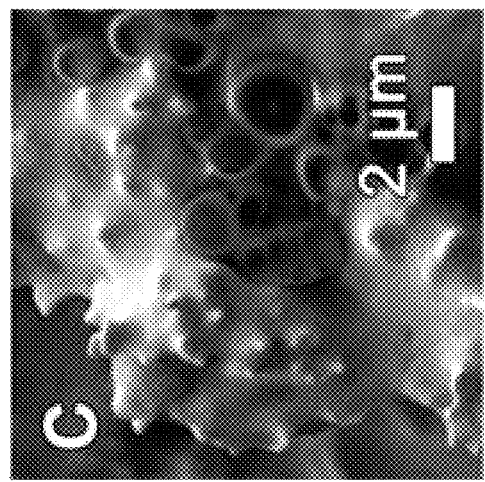
Figure 23D:
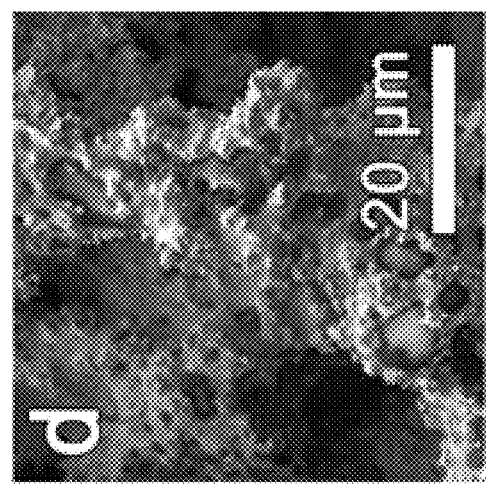
Figure 23F:
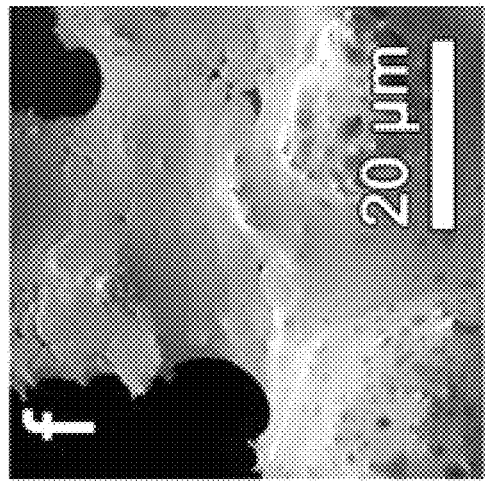
Figure 23H:
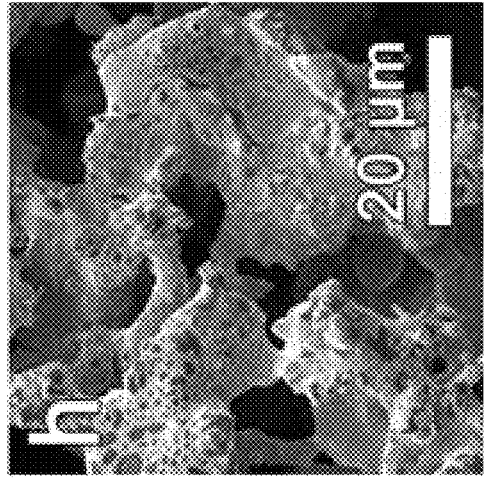
Figure 23E:
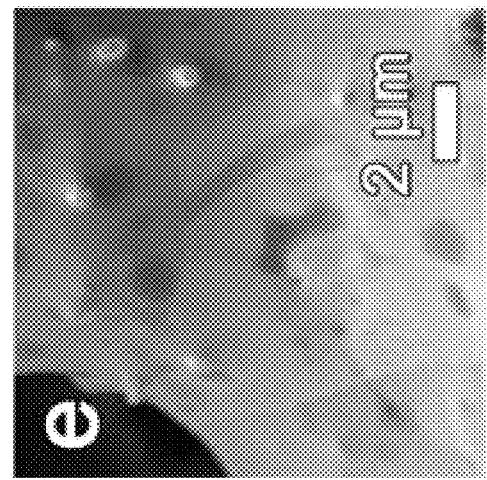
Figure 23G:
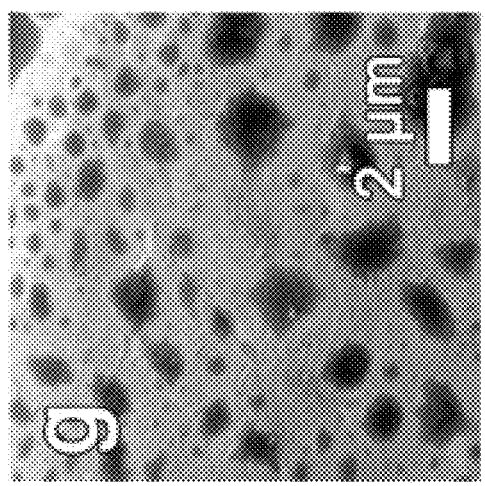

While graphene wrinkles can be observed on the surface of Ni scaffolds for 2S, 3S, and 5S, as shown in FIGS. 21A, 21C, and 21E, when the rastering speed was decreased to 1S, no graphene wrinkles were observed (FIG. 21G), an indication that the graphene was much thinner with 1S. With a fixed speed at 5S, higher duty cycles also reduced the amount of unreacted sucrose and resulted in higher graphene quality because of the higher heat and energy input, as illustrated in FIGS. 23A-23H.

Laser Duty Cycles

The effect of changing laser duty cycles was systematically investigated at a constant rastering speed of 5S. With lower laser duty cycles of 10P and 20P, graphene was not detected on the surface of the Ni scaffolds, as shown in FIG. 23A-23D. When increasing the laser duty cycle (50P for FIGS. 23E-23F and 100P for FIGS. 23G-23H), graphene with wrinkled features was observed on the surface of the Ni scaffolds. Even at a duty cycle of 100P (FIGS. 23G-23H), large amounts of unreacted sucrose was still observed, indicating that the 5S rastering speed of was too fast.

Figure 24B:
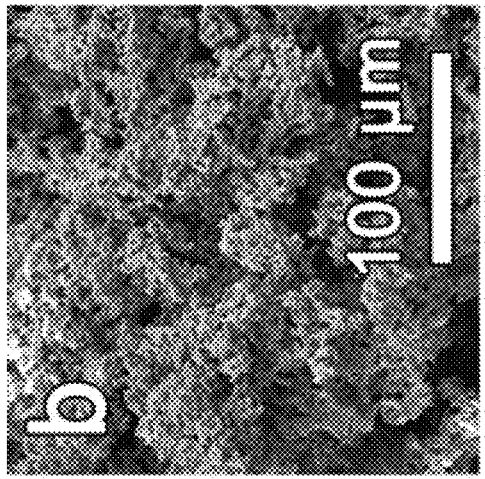
FIGS. 24A-24B are SEM images of a Ni/sucrose mixture sample without laser treatment.
Figure 24A:
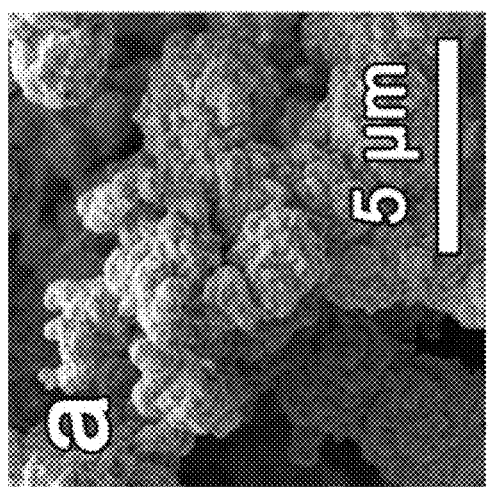
Figure 24C:
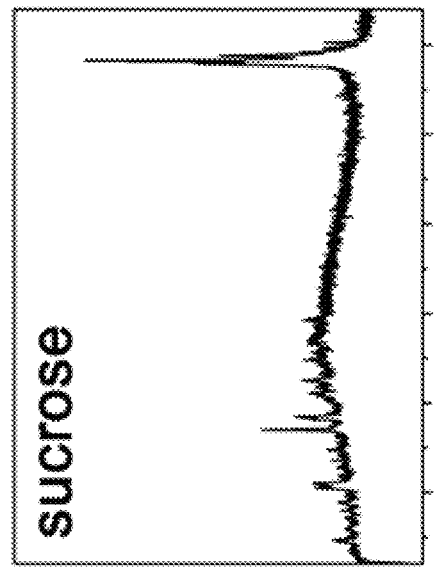
FIG. 24C is the Raman spectrum of the sample imaged in FIGS. 24A-24B.

Untreated sucrose coated Ni particles were analyzed by SEM, as shown in FIGS. 24A-24B. The Ni particles were aggregated, with sucrose apparently acting as a binder. The charging effect was observed during SEM operation, indicating the low conductivity of the Ni/sucrose mixture. The sucrose on the surface was detected by Raman spectroscopy, as shown in FIG. 24C.

Figure 24D:
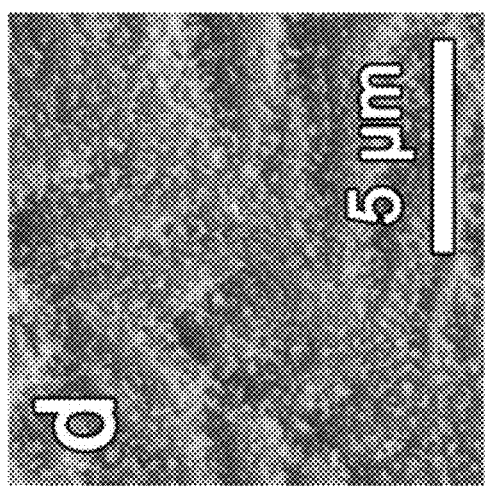
FIGS. 24D-24E are SEM images of the sample imaged in FIGS. 24A-24B but after laser treatment prepared using 100P and 2S in air.
Figure 24E:
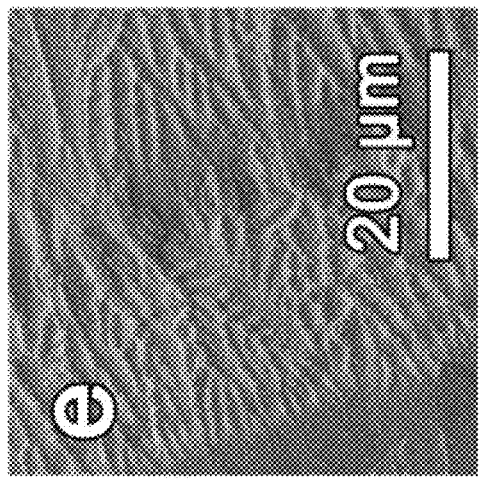
Figure 24F:
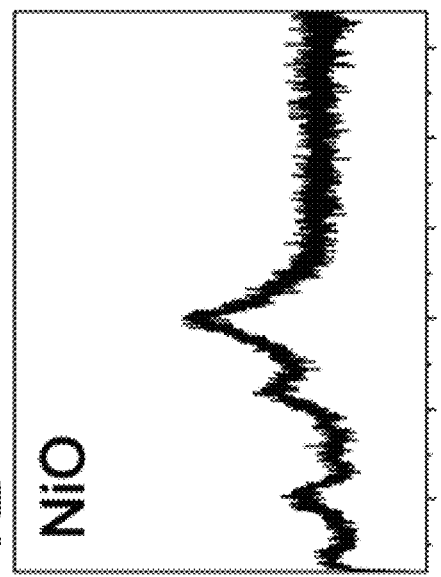
FIG. 24F is the Raman spectrum of the sample imaged in FIGS. 24D-24E.

The 3D printing process was performed in air using a laser duty cycle of 100P and rastering speed of 2S. (100P was chosen in view of the indications from FIGS. 23A-23H). As shown in FIG. 24D-24E, a large number of particles were observed on the surface of the sintered Ni scaffolds, and little or no graphene was present. The Raman spectrum in FIG. 24F displays $NiO_x$ signals, and no graphene-based D, G, or 2D bands. It is believed that the sucrose was burned away by the laser in air; the Raman analysis shows the Ni was oxidized. Based on this result, this reflected that the laser reaction should be done in an inert or reducing ($H_2$) atmosphere.

Laser Wavelength

Figure 25A:
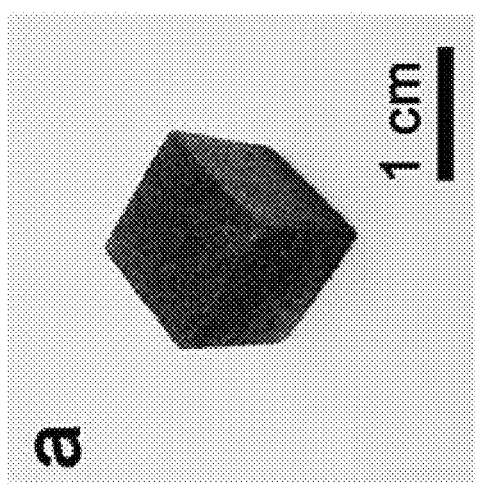
FIG. 25A is a photograph of a 3D printed sample prepared using the same mixture of Ni and sucrose imaged in FIGS. 24A-24B and after laser treatment with a commercial fiber laser 3D metal printer at 20 W of power and 100 cm/s rastering speed in a $N_2$-flushed atmosphere.
Figure 25B:
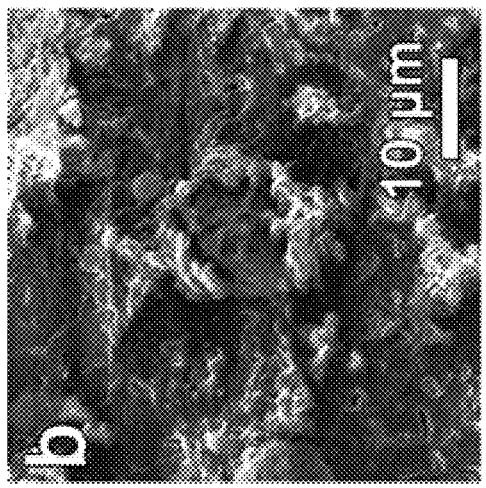
FIGS. 25B-25C are SEM images of the sample imaged in FIG. 25A.
Figure 25C:
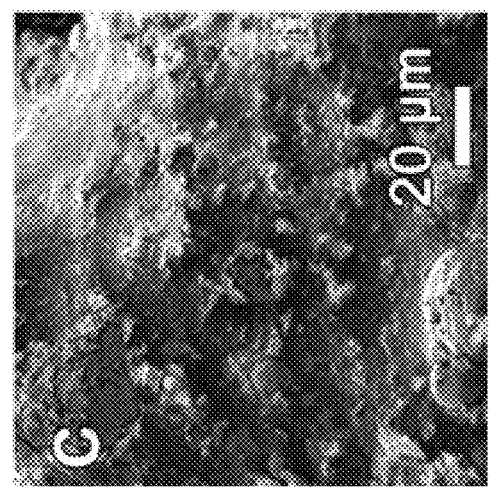
Figure 25D:
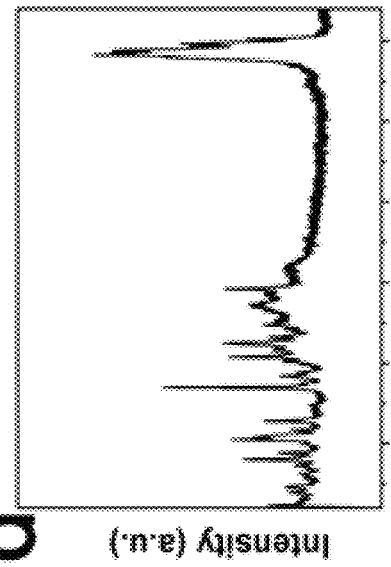
FIG. 25D is the Raman spectrum of the sample imaged in FIG. 25A.

A commercial automated 3D metal printer (Concept Laser, Mlab) at Qualified Rapid Products Company was utilized to attempt to synthesize 3D graphene objects using the process of the present invention. The 3D metal printer was equipped with a 1.06 μm fiber laser system. The samples were printed under a $N_2$-flushed atmosphere. As shown in FIG. 25A, a 1 cm×1 cm×1 cm product was obtained. The SEM images (FIGS. 25B-25C) indicated the lack of graphitic structures and the presence of what was believed to be unconverted sucrose. Ni particles, rather than sintered Ni scaffolds, were observed. It was further believed that the sucrose melted under the high heat conditions and acted as a binder in the cubic sample, instead of decomposing. The Raman spectrum in FIG. 25D shows no graphene.

This result indicated that use of a 10.6 μm $CO_2$ laser is optimal for making 3D GFs with Ni/sucrose mixtures. By contrast, the wavelength of the 1.06 um laser overlapped strongly with the absorption band of the Ni metal but poorly with that of sucrose (see FIG. 12) resulting in uneven heating that was not conducive to graphene formation.

Matching the laser wavelength to the absorption bands of both the carbon source and the metal powder would yield optimal results.

Characterization

Considering the experimental time for rastering, the amount of residual sucrose, and the fact that thicker graphene will possess better mechanical performance, the combination of a rastering speed of 2S and a laser duty cycle of 100P was selected for further experiments and characterization.

Figure 26A:
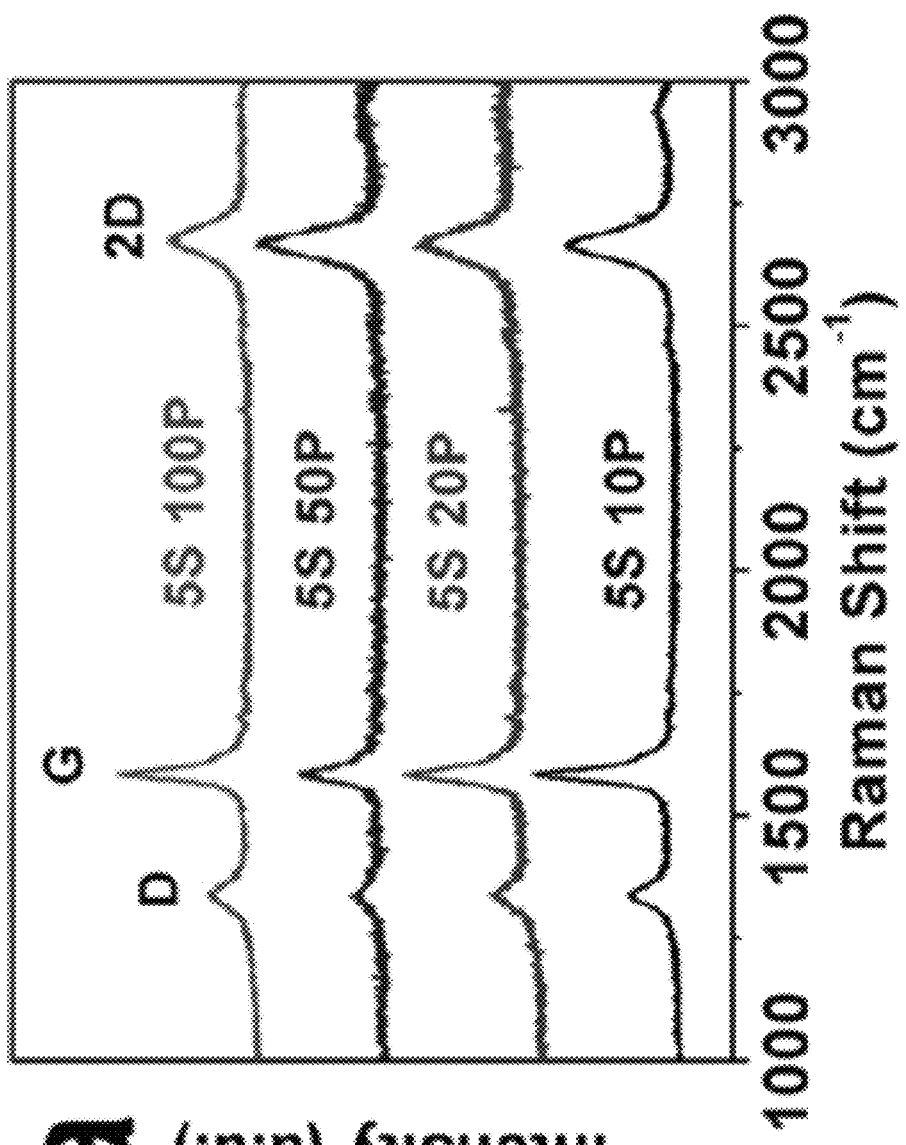
FIGS. 26A-26B are Raman spectra of 3D printed graphene foams with a Ni scaffold prepared using (FIG. 26A) 10 to 100P with 5S and (FIG. 26B) 1 to 5S and 100P for in a H2 atmosphere.
Figure 26B:
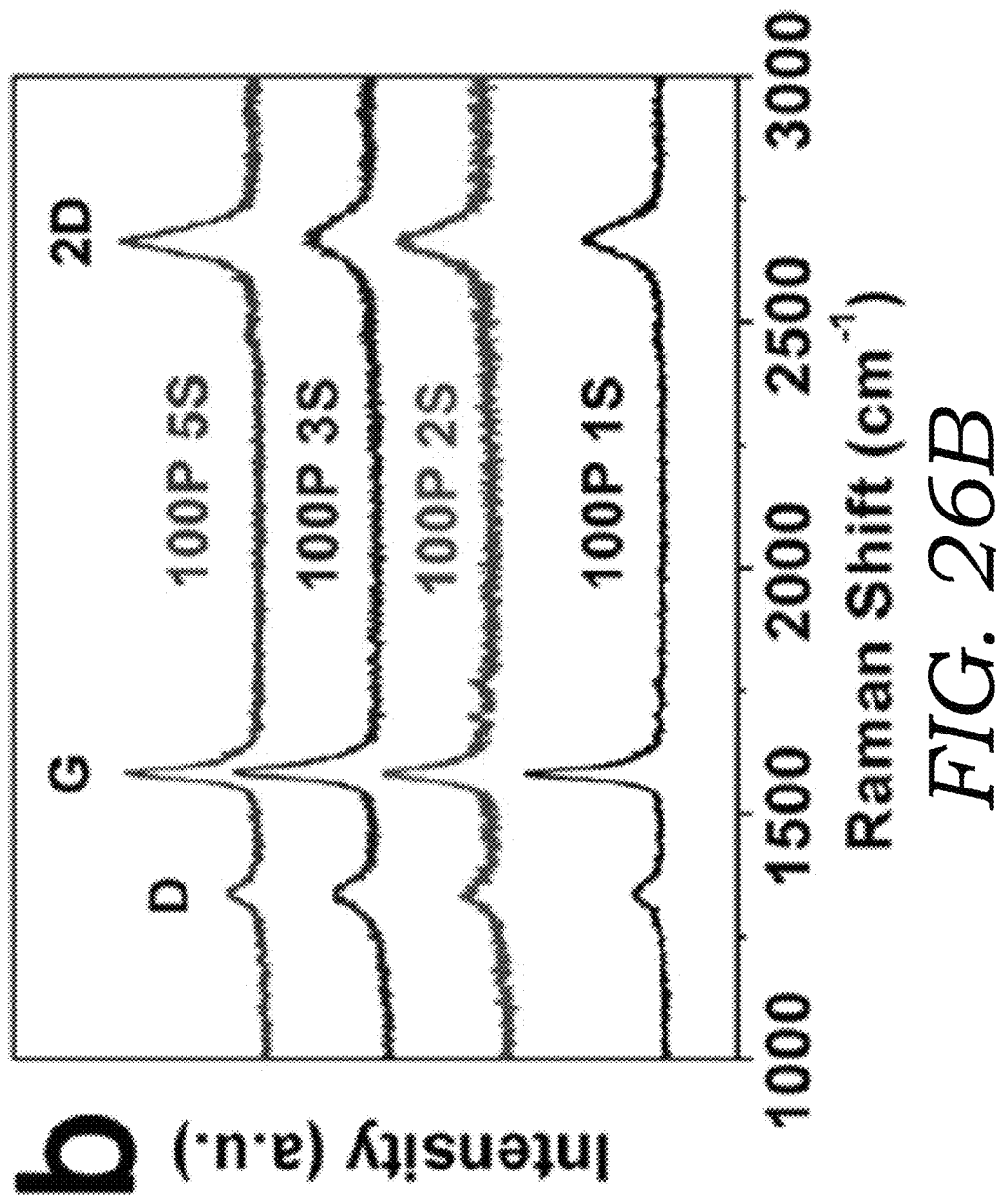

Raman spectroscopy was employed to further investigate the quality of the graphene printed by varying the laser duty cycle and rastering speed. This Raman spectroscopy is shown in FIGS. 26A-26B. For all duty cycles and rastering speeds, the Raman spectra have the typical $sp^2$ carbon modes, showing the D bands (~1350 $cm^{-1}$), G bands (~1580 $cm^{-1}$), and 2D bands (~2670 $cm^{-1}$), indicating the existence of graphene [Li 2015; Singh 2015; Sun 2013; Yan 2014; Wu 2015]. The calculated $I_D/I_G$ ratios are of samples printed with different rastering speeds and laser duty cycles were in the range of 0.2-0.4, demonstrating the high structural quality of the as-printed graphene. The comparable $I_G/I_{2D}$ ratios (0.6 to 1.8) indicated the as-printed samples were multilayered graphene, which would contribute to good mechanical performance of 3D printed GFs.

Moreover, the position of the 2D bands as well as the $I_G/I_{2D}$ ratios indicate that the number of layers in the as-printed GFs should be 1 to 10 layers, as when the layer number is greater than 10, the 2D band shifts to ~2700 $cm^{-1}$ [Ferrari 2006].

Figure 27A:
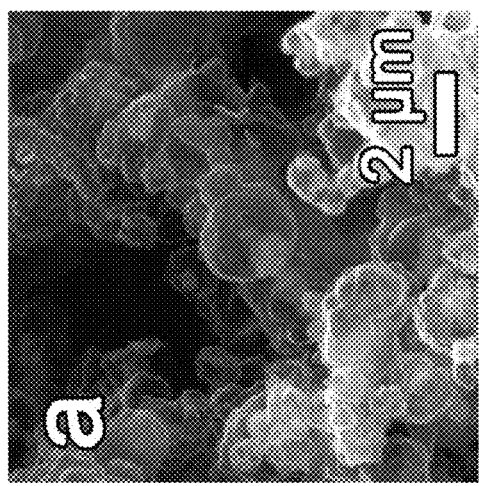
FIGS. 27A-27C are SEM images of 3D printed graphene foams after removing Ni scaffolds prepared using 100P and 2S in a $H_2$ atmosphere.
Figure 27B:
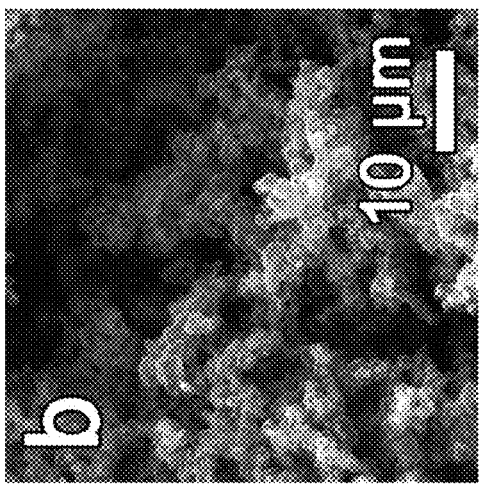
Figure 27C:
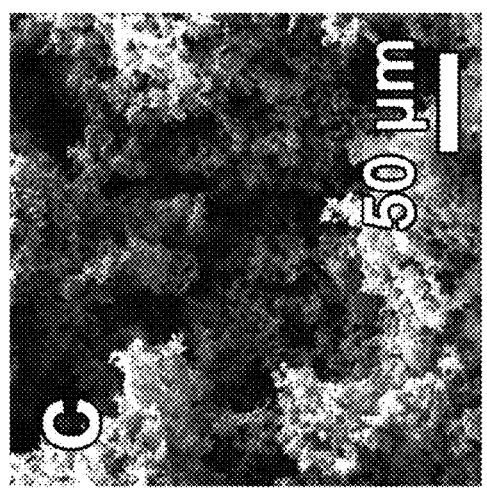

With 100P laser duty cycle and 2S rastering speed, the morphology and structure of 3D printed GFs after removing the Ni scaffolds was investigated by SEM and transmission electron microscope (TEM), as shown in FIGS. 27A-27C and 27D-27F, respectively. Even after the three-step removal of the Ni scaffolds, the 3D printed GFs retained the structure of the sintered Ni scaffold, as shown in FIGS. 27A-27C. The 3D printed GFs include both particle-like hollow carbon shells that show structures similar to the Ni scaffolds and Ni particles since Ni acted as templates during growth, thereby permitting pore size commensurate with the metal particle sizes used. The porous structure of the 3D printed GFs could benefit applications in vibration damping and energy storage related fields [Sha 2016; Sha 2017; Sun 2013]. The density of 3D printed GFs was 0.015±0.003 g $cm^{-3}$ calculated by measuring the mass and volume of the CPD dried monoliths. The porosity of 3D printed GFs was 99.3±0.2% calculated by the equation:

$$\theta = \left(1 - \frac{m}{Vd}\right) \times 100\%, \quad (1)$$

where θ, m, V, and d are the porosity, mass, volume, and density of graphite (which is 2.09 to 2.23 g $cm^{-3}$), respectively [Loisel 2016].

Figure 27D:
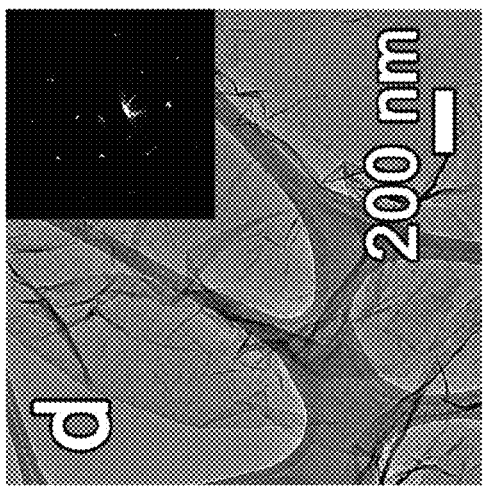
FIGS. 27D-27F are TEM images of 3D printed graphene foams after removing Ni scaffolds prepared using 100P and 2S in a $H_2$ atmosphere. The inset in FIG. 27D is the SAED pattern.
Figure 27E:
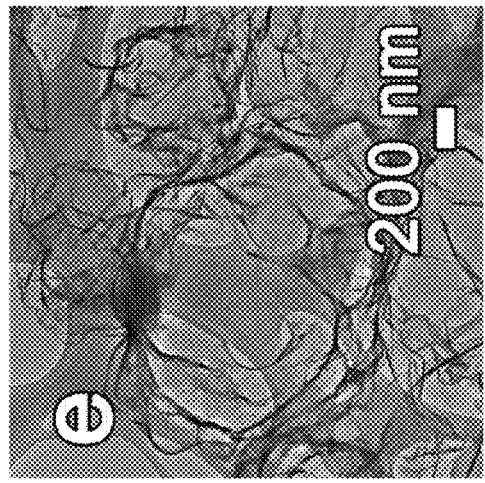
Figure 27F:
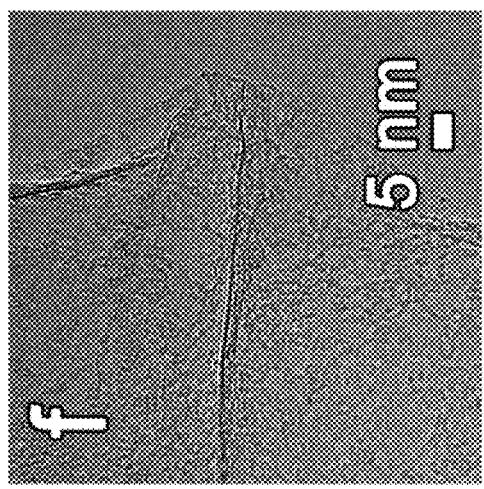

Both the density and porosity values of the 3D printed GFs are comparable to other carbon foam materials [Kim 2012]. The TEM image in FIG. 27D shows a large graphene sheet. The inset of FIG. 27D is the selected area electron diffraction (SAED) pattern showing the hexagonal single crystal signal of the graphene. The carbon shells in FIG. 27E are similar to those shown in the SEM images (FIGS. 27A-27C). The high magnification image in FIG. 27F shows the few-layered structure of 3D printed GFs, which can be observed from the edge of graphene sheet, and is in good accordance with the results from the Raman spectra in FIGS. 26A-26B.

The crystalline quality, elemental composition, phases, and purity of the 3D printed GFs were further investigated by Raman, X-ray photoelectron spectroscopy (XPS), X-ray diffraction (XRD), and thermogravimetric analyses (TGA), as shown in FIGS. 28A-28D, respectively.

Figure 28A:
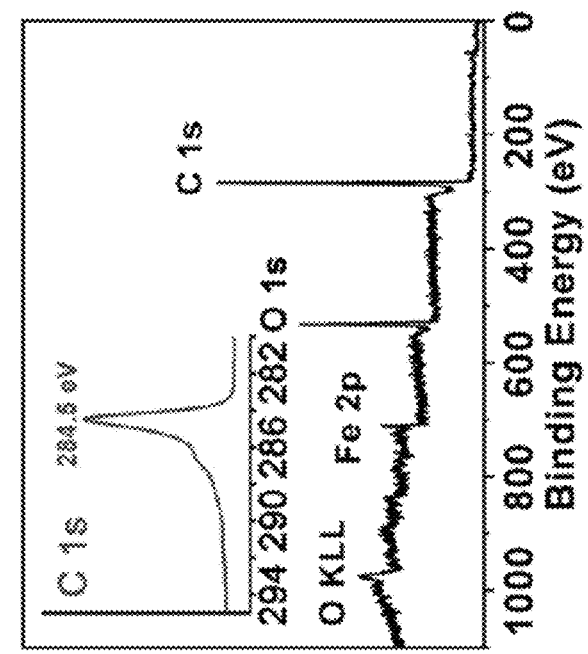

Similar to the spectra in FIGS. 26A-26B, typical D (~1350 $cm^{-1}$), (~1580 $cm^{-1}$) and 2D (~2670 $cm^{-1}$) bands can be detected by Raman, shown in FIG. 28A. The $I_D/I_G$ ratio of the purified GFs was 0.44, indicating a high quality of the 3D printed GFs. The $I_G/I_{2D}$ ratio of 2.28 is indicative of multi-layered graphene [Li 2015; Singh 2015; Sun 2013; Yan 2014], which should contribute to the good mechanical properties of the 3D printed GFs. The 2D bands at ~2670 $cm^{-1}$ demonstrated that the content of the 3D printed GFs was indeed graphene, rather than graphite [Singh 2015].

Figure 28B:
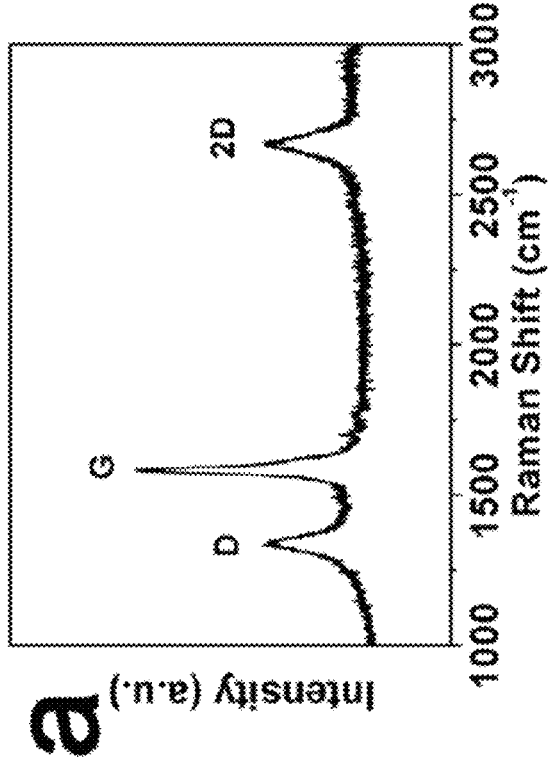

The C 1s peak (284.5 eV) in the XPS elemental spectra, as shown in FIG. 28B, indicated the material was graphene or graphite [Li 2015; Yan 2014; Bae 2010]. Small amounts of Fe impurities (C 1s: 76.7 at %; O 1s: 23.0 at %; Fe 2p3: 0.3 at %.) were also detected by XPS, which came from the $FeCl_3$ etching solution and can be further removed with additional treatment if necessary [Sha 2016].

The XRD patterns in FIG. 28C also indicates the low content of impurities in the 3D printed GFs. No obvious Fe or Ni peaks were detected, and all the peaks matched well with the expected peaks of a graphite phase [Sha 2016; Sha 2017; Dong II 2012]. An additional small peak at ~35° was also detected, as shown in FIG. 28C. The small peak could be attributed to $Fe_2O_3$ [Zeng 2010], arising from the $FeCl_3$ etching solution. Such Fe contamination can be eliminated by using HCl as an alternative etching reagent.

TGA testing was performed in air from room temperature to 900° C., as shown in FIG. 28D. Only ~1.9 wt % remained after testing, demonstrating that the Ni scaffolds and Fe etching residues were almost completely removed by the etching process. However, the rapid weight drop before ~480° C. indicated the existence of amorphous carbon and unreacted sucrose, since the laser rastering process could still be too fast to completely convert the carbon from sucrose into graphene.

Conductivity

Figure 29A:
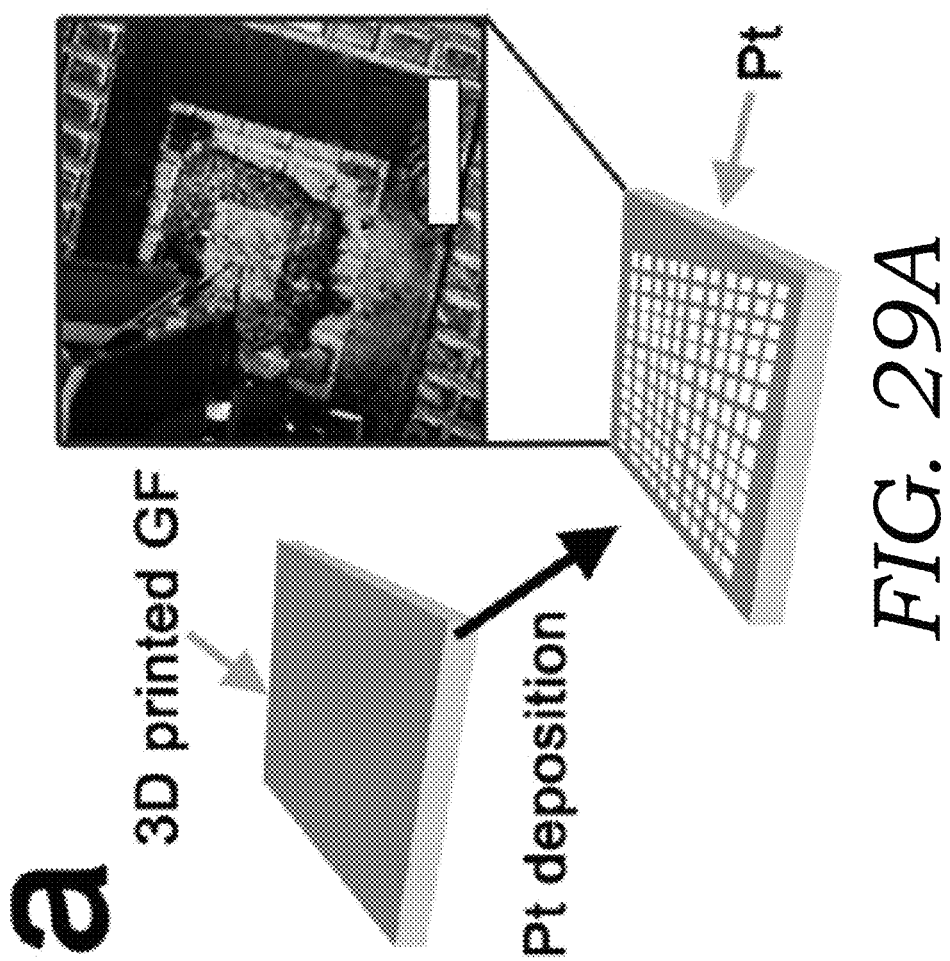
FIG. 29A is a schematic diagram of electrical conductivity testing. The scale bar is 1 cm.

The conductivity of 3D printed GFs was tested, as shown in FIG. 29A. Pt contact pads (250 μm×250 μm) were deposited directly onto the surface of 3D printed GFs using a shadow mask evaporation method. The distance between the contact pads was 120 μm. FIG. 29B shows the room-temperature conductivity of 3D printed GFs. FIG. 29C indicates the ohmic contact between the Pt pads and the 3D printed GFs.

The average electrical conductivity of the 3D printed GFs is $$\sigma = Il/VA = 8.7 \pm 1.8 \text{ S cm}^{-1} \quad (2)$$

where I, l, V, and A are the measured current, channel length, applied voltage, and cross-sectional area of 3D printed GFs, respectively.

This value was comparable but lower than that of 3D GFs (13.8 S $cm^{-1}$) prepared using powder metallurgy templates and other methods [Chen 2011; Choi 2012; Worsley 2010; Liu 2012; Shao 2015; Chen 2013; Yaun 2012; Wu 2003]. Although the high quality and multi-layered graphene features as demonstrated in FIGS. 28A-28D indicates that the 3D printed GFs should possess high electrical conductivity, since the 3D printed GFs were prepared from loose powder rather than a hydraulic cold-pressing process, the resulting GFs have a relatively low density, high porosity structure with low conductivity. The 3D printed GFs were quite soft, so it was difficult to avoid damaging the Pt contact pads when touched by the probe tips during testing, which would also lead to a lower conductivity value. The conductivity of the foamed GFs structure can be improved by introducing CNTs to prepare 3D printed rebar GFs, which can also make the GFs mechanically stronger, as demonstrated in Applicant's previous work [Sha 2017; Yan 2014].

Mechanical Properties

Figure 30A:
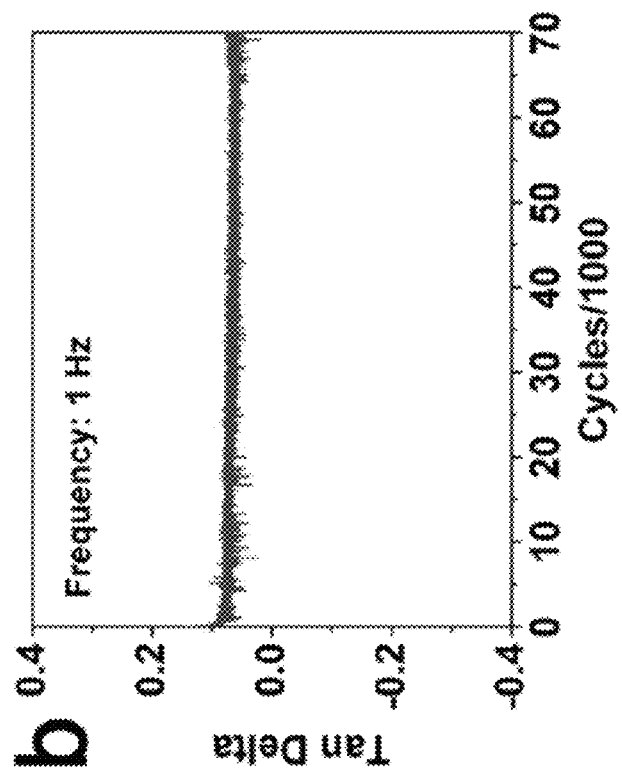
FIGS. 30A-30B are DMA results of as-prepared 3D printed graphene foam after removing Ni prepared using 100P and 2S in a $H_2$ atmosphere.

To further investigate the mechanical properties of the 3D printed GFs, dynamic mechanical analysis (DMA) testing was carried out under a constant frequency of 1 Hz with an amplitude of 20 μm (fixed displacement) up to 70,000 cycles at room temperature. As shown in FIG. 30A, the storage modulus of 3D printed GFs was ~11 kPa, which is comparable with 3D GFs prepared by powder metallurgy templates and other methods [Sha 2017; Sun 2013; Wu 2015].

After testing for 70,000 cycles, no collapse was detected, indicating a good structural stability of the 3D printed GFs. The room temperature damping capacity of 3D printed GFs was calculated using the following equation:

$$\text{Tan } \delta = \text{loss modulus/storage modulus} \quad (3)$$

where Tan δ is the damping capacity of the sample.

Figure 30B:
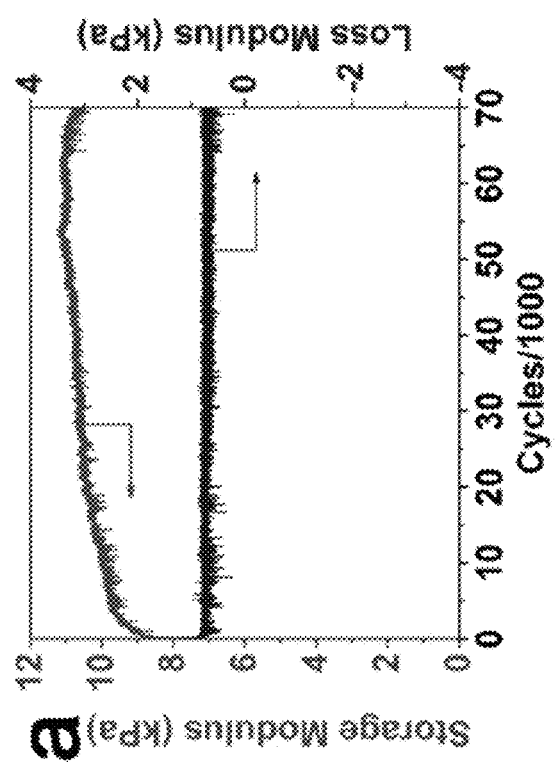

As shown in FIG. 30B, the damping capacity of the 3D printed GFs was 0.13 to 0.06, which is comparable with values reported previously, as listed in Table 1.

TABLE 1

Room temperature damping capacities reported in the literature.

| Materials | Damping capacity | Reference |
|---|---|---|
| 3D printed GF | ~0.06 | Herein |
| 3D GF | 0.19 | Sha 2017 |
| 3D rebar GF with 10 wt % of CNTs | 0.13 | Sha 2017 |
| 3D rebar GF with 18 wt % of CNTs | 0.07 | Sha 2017 |
| Graphene sponge | ~0.04 | Wu 2015 |
| CNTs/GO aerogels | ~0.05-0.1 | Sun 2013 |
| 20 vol % SiC reinforced A365 Al alloy | 0.034-0.04 | Wu 2003 |
| Pure Al foam | 0.022 | Deng 2007 |
| CNTs reinforced 2024Al alloy | ~0.005 | Li 2017 |

The damping capacity of 3D printed GFs was also comparable to that of some foamed metal materials. Moreover, this 3D printing method of the present invention is much easier and faster than other reported 3D GF preparation methods [Chen 2011; Qin 2014 Choi 2012; Zakhidov 1998; Xu 2010; Sha 2016; Wu 2015], and there is no requirement for a high-temperature furnace or long growth process.

Uses of 3D Printed Graphene Materials

The 3D printed graphene materials of the present invention have various utilities. For instance, in some embodiments, the free-standing 3D printed graphene (or other variations) could show high specific surface area, good crystallization, good electrical conductivity, and a mechanically robust structure. Moreover, the 3D printed graphene materials can be utilized in various fields requiring 3D frameworks, such as in electrodes, battery electrodes, supercapacitors, batteries, lithium batteries, lithium ion batteries, fuel cell devices, water desalination, capacitive deionization, catalysts for water decomposition, water splitting, water-oil separation, water/gas purification, sensors, mechanical dampening, cell scaffolds for artificial wood, scaffolds for growth of bone or animal/human tissue in vivo or in vitro, scaffolds for neuronal growth in vitro or in vivo, and spinal cord regeneration scaffolds.

For instance, the 3D printed graphene material can be utilized in a device that is selected from a group consisting of electrodes, battery electrodes, capacitors, supercapacitors, batteries, lithium batteries, lithium ion batteries, photovoltaic devices, photovoltaic cells, transistors, current collectors, fuel cell devices, water desalination devices, capacitive deionization devices, water-splitting devices, water-oil separation devices, water/gas purification devices, sensors, mechanical dampening devices, cell scaffolds for artificial wood, scaffolds for growth of bone or animal/human tissue in vivo or in vitro, scaffolds for neuronal growth in vitro or in vivo, and spinal cord regeneration scaffolds. For instance, the 3D printed graphene material can be utilized as an electrode (such as for a device that is selected from a group consisting of capacitors, supercapacitors, batteries, lithium batteries, lithium ion batteries, photovoltaic devices, photovoltaic cells, transistors, current collectors, fuel cell devices, water desalination devices, capacitive deionization devices, water-splitting devices, water-oil separation devices, water/gas purification devices, sensors, mechanical dampening devices, etc.).

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above.

The disclosures of all patents, patent applications, and publications cited herein are hereby incorporated herein by reference in their entirety, to the extent that they provide exemplary, procedural, or other details supplementary to those set forth herein.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

REFERENCES

Tour, J. M., et al., PCT Int'l Patent Appl. PCT/US2017/038574, "Laser-Induced Graphene (LIG) And Laser-Induced Graphene Scrolls (LIGS) Materials," filed Jun. 21, 2017 ("Tour '574 Application").

Tour, J. M. et al., PCT Int'l Patent Publ. No. WO/2017/091815, "Formation Of Three-Dimensional Materials By Combining Catalytic And Precursor Material," filed Nov. 25, 2016 ("Tour '815 PCT Application").

Tour, J. M. et al., PCT Int'l Patent Publ. No. WO/2015/175060, "Laser Induced Graphene Materials And Their Use In Electronic Devices," filed Feb. 17, 2015 ("Tour '060 PCT Application").

Ai, W. et al. Toward High Energy Organic Cathodes for Li-Ion Batteries: A Case Study of Vat Dye/Graphene Composites. *Adv. Funct. Mater.* 2017, 27, 1603603 ("Ai 2017").

Ai, W. et al. Supermolecular Polymerization Promoted In Situ Fabrication of Nitrogen-Doped Porous Graphene Sheets as Anode Materials for Li-Ion Batteries. *Adv. Energy Mater.* 2015, 5, 1500559 ("Ai 2015").

Ai, W. et al. Nitrogen and Sulfur Codoped Graphene: Multifunctional Electrode Materials for High-Performance Li-Ion Batteries and Oxygen Reduction Reaction. *Adv. Mater.* 2014, 26, 6186-6192 ("Ai 2014").

Azhari, A. et al. Additive Manufacturing of Graphene-Hydroxyapatite Nanocomposite Structures. *Int. J. Appl. Ceram. Technol.* 2015, 12, 8-17 ("Azhari 2015").

Bae, S. et al. Roll-to-Roll Production of 30-Inch Graphene Films for Transparent Electrodes. *Nat. Nanotechnol.* 2010, 5, 574-578 ("Bae 2010").

Banhart, J., et al. Damping Properties of Aluminium Foams. *Materials Science and Engineering: A* 1996, 205, 221-228 ("Banhart 1996").

Biswas, S. et al. Multi layered Nano-Architecture of Variable Sized Graphene Nanosheets for Enhanced Supercapacitor Electrode Performance. *ACS Appl. Mater. Inter.* 2010, 2, 2293-2300 ("Biswas 2010").

Bolotin, K. I. et al. Ultrahigh Electron Mobility in Suspended Graphene. *Solid State Commun.* 2008, 146, 351-355 ("Bolotin 2008").

Botas, C et al. Sn- and SnO2-graphene flexible foams suitable as binder-free anodes for lithium ion batteries. *J. Mater. Chem. A* 2015, 3, 13402-13410 ("Botas 2015").

Bult, J. B. et al. Role of Dopants in Long-Range Charge Carrier Transport for p-Type and n-Type Graphene Transparent Conducting Thin Films. *ACS Nano* 2013, 7, 7251-7261 ("Bult 2013").

Chen, S. et al. Elastic Carbon Foam Via Direct Carbonization of Polymer Foam for Flexible Electrodes and Organic Chemical Absorption. *Energy Environ. Sci.* 2013, 6, 2435-2439 ("Chen 2013").

Choi, B. G. et al. 3D Macroporous Graphene Frameworks for Supercapacitors with High Energy and Power Densities. *ACS Nano* 2012, 6, 4020-4028 ("Choi 2012").

Choo, D. C. et al. Conducting Transparent Thin Films Based on Silver Nanowires and Graphene-Oxide Flakes. *J. Electrochem. Soc.* 2015, 162, H419-H421 ("Choo 2015").

Chen, Z. et al. Three-Dimensional Flexible and Conductive Interconnected Graphene Networks Grown by Chemical Vapour Deposition. *Nat. Mater.* 2011, 10, 424-428 ("Chen 2011").

Compton, B. G. et al. 3D-Printing of Lightweight Cellular Composites. *Adv. Mater.* 2014, 26, 5930-5935 ("Compton 2014").

Deng, C. et al. Damping Characteristics of Carbon Nanotube Reinforced Aluminum Composite. *Mater. Lett.* 2007, 61, 3229-3231 ("Deng 2007").

Dong, X. et al. Synthesis of a MnO2-graphene foam hybrid with controlled MnO2 particle shape and its use as a supercapacitor electrode. *Carbon* 2012, 50, 4865-4870 ("Dong I 2012").

Dong, X. et al. Hybrid Structure of Zinc Oxide Nanorods and Three Dimensional Graphene Foam for Supercapacitor and Electrochemical Sensor Applications. *RSC Advances* 2012, 2, 4364-4369 ("Dong II 2012").

Farahani, R. D. et al. Three-Dimensional Printing of Multifunctional Nanocomposites: Manufacturing Techniques and Applications. *Adv. Mater.* 2016, 28, 5794-5821 ("Farahani 2016").

Ferrari, A. C. et al. Raman Spectrum of Graphene and Graphene Layers. *Phys. Rev. Lett.* 2006, 97, 187401-187404 ("Ferrari 2006").

Garcia-Tunon, E. et al. Printing in Three Dimensions with Graphene. *Adv. Mater.* 2015, 27, 1688-1693 ("Garcia-Tunon 2015").

Geim, A. K. et al. The rise of graphene. *Nat Mater* 2007, 6, 183-191 ("Geim 2007").

Guo, S. J. et al. Graphene nanosheet: synthesis, molecular engineering, thin film, hybrids, and energy and analytical applications. *Chem. Soc. Rev.* 2011, 40, 2644-2672 ("Guo 2011").

Hu, C. et al. Scalable Preparation of Multifunctional Fire-Retardant Ultralight Graphene Foams. *ACS Nano* 2016, 10, 1325-1332 ("Hu 2016").

Huang, L. et al. Gram-Scale Synthesis of Graphene Sheets by a Catalytic Arc-Discharge Method. *Small* 2013, 9, 1330-1335 ("Huang 2013").

Inoue, T. et al. A New Drying Method of Biological Specimens for Scanning Electron Microscopy: The T-Butyl Alcohol Freeze-Drying Method. *Archives of Histology and Cytology* 1988, 51, 53-59 ("Inoue 1988").

Ji, J. et al. Graphene-Encapsulated Si on Ultrathin-Graphite Foam as Anode for High Capacity Lithium-Ion Batteries. *Adv. Mater.* 2013, 25, 4673-4677 ("Ji 2013").

Kim, J. H. et al. 3D Printing of Reduced Graphene Oxide Nanowires. *Adv. Mater.* 2015, 27, 157-161 ("Kim 2015").

Kim, K. H. et al. Graphene Coating Makes Carbon Nanotube Aerogels Superelastic and Resistant to Fatigue. *Nat. Nanotechnol.* 2012, 7, 562-566 ("Kim 2012").

Kim, K. S. et al. Large-scale pattern growth of graphene films for stretchable transparent electrodes. *Nature* 2009, 457, 706-710 ("Kim 2009").

Kinstlinger, I. S. et al. Open-Source Selective Laser Sintering (openSLS) of Nylon and Biocompatible Polycaprolactone. *PLoS One* 2016, 11(2) ("Kinstlinger 2016").

Kruth, J. P. et al. Selective Laser Melting of Iron-Based Powder. *J. Mater. Process. Technol.* 2004, 149, 616-622 ("Kruth 2004").

Li, X. et al. Rivet Graphene. *ACS Nano* 2016, 10, 7307-7313 ("Li 2016").

Li, Y. et al. Laser-Induced Graphene in Controlled Atmospheres. From Superhydrophilic to Superhydrophobic Surfaces. *Adv. Mater.* 2017, 1700496 ("Li 2017").

Li, Y.; et al. Rebar Graphene from Functionalized Boron Nitride Nanotubes. *ACS Nano* 2015, 9, 532-538 ("Li 2015").

Lindahl, N. et al. Determination of the Bending Rigidity of Graphene Via Electrostatic Actuation of Buckled Membranes. *Nano Lett.* 2012, 12, 3526-3531 ("Lindahl 2012").

Lee, D. W. et al. Highly controllable transparent and conducting thin films using layer-by-layer assembly of oppositely charged reduced graphene oxides. *J. Mater. Chem.* 2011, 21, 3438-3442 ("Lee 2011").

Lei, Z. et al. Incorporation of MnO2-Coated Carbon Nanotubes between Graphene Sheets as Supercapacitor Electrode. *ACS Appl. Mater. Inter.* 2012, 4, 1058-1064 ("Lei 2012").

Li, F. et al. Flexible free-standing graphene foam supported silicon films as high capacity anodes for lithium ion batteries. *Mater. Lett.* 2014, 128, 132-135 ("Li 2014").

Li, X. et al. Evolution of Graphene Growth on Ni and Cu by Carbon Isotope Labeling. *Nano Lett.* 2009, 9, 4268-4272 ("Li 2009").

Liao, Q. et al. All-Solid-State Symmetric Supercapacitor Based on Co3O4 Nanoparticles on Vertically Aligned Graphene. *ACS Nano* 2015, 9, 5310-5317 ("Liao 2015").

Lin, J. et al. Laser-induced porous graphene films from commercial polymers. *Nat. Commun.* 2014, 5, 5714 ("Lin 2014").

Liu, F. et al. Folded Structured Graphene Paper for High Performance Electrode Materials. *Adv. Mater.* 2012, 24, 1089-1094 ("Liu 2012").

Loisel, L. et al. Oxidation-Based Continuous Laser Writing in Vertical Nano-Crystalline Graphite Thin Films. *Sci. Rep.* 2016, 6, 26224 ("Loisel 2016").

Luo, J. et al. Three-Dimensional Graphene Foam Supported Fe3O4 Lithium Battery Anodes with Long Cycle Life and High Rate Capability. *Nano Lett.* 2013, 13, 6136-6143 ("Luo 2013").

Mattevi, C. et al. Evolution of Electrical, Chemical, and Structural Properties of Transparent and Conducting Chemically Derived Graphene Thin Films. *Adv. Funct. Mater.* 2009, 19, 2577-2583 ("Mattevi 2009").

Peng, Z. W. et al. Flexible Boron-Doped Laser-Induced Graphene Microsupercapacitors. *ACS Nano* 2015, 9, 5868-5875 ("Peng 2015").

Qin, J. et al. Graphene Networks Anchored with Sn@Graphene as Lithium Ion Battery Anode. *ACS Nano* 2014, 8, 1728-1738.

Qiu, H. et al. In situ synthesis of $GeO_2$/reduced graphene oxide composite on Ni foam substrate as a binder-free anode for highcapacity lithium-ion batteries. *J. Mater. Chem. A* 2015, 3, 1619-1623 ("Qiu 2015").

Sha, J. et al. Three-Dimensional Rebar Graphene. *ACS Appl. Mater. Interf.* 2017, 9, 7376-7384 ("Sha 2017").

Sha, J. W. et al. Preparation of Three-Dimensional Graphene Foams Using Powder Metallurgy Templates. *ACS Nano* 2016, 10, 1411-1416 ("Sha 2016").

Sha, J. W. et al. In situ synthesis of ultrathin 2-D TiO2 with high energy facets on graphene oxide for enhancing photocatalytic activity. *Carbon* 2014, 68, 352-359 ("Sha 2014").

Shao, Y. et al. Graphene-Based Materials for Flexible Supercapacitors. *Chem. Soc. Rev.* 2015, 44, 3639-3665 ("Shao 2015").

Singh, M. et al. Thick Electrodes for High Energy Lithium Ion Batteries. *J. Electrochem. Soc.* 2015, 162, A1196-A1201 ("Singh 2015").

Sun, H. et al. Multifunctional, Ultra-Flyweight, Synergistically Assembled Carbon Aerogels. *Adv. Mater.* 2013, 25, 2554-2560 ("Sun 2013").

Sun, Z. Z. et al. Growth of graphene from solid carbon sources. *Nature* 2010, 468, 549-552 ("Sun 2010").

Veronese, G. P. et al. Graphene as transparent conducting layer for high temperature thin film device applications. *Sol. Energ. Mater. Sol. C.* 2015, 138, 35-40 ("Veronese 2015").

Wang, G., et al. Annealed Graphene Sheets Decorated with Silver Nanoparticles for Inkjet Printing. *Chemical Engineering Journal* 2015, 260, 582-589 ("Wang 2015").

Wang, S. J. et al. Fabrication of highly conducting and transparent graphene films. *Carbon* 2010, 48, 1815-1823 ("Wang 2010").

Wang, Z. Y. et al. A large ultrathin anatase TiO2 nanosheet/reduced graphene oxide composite with enhanced lithium storage capability. *J. Mater. Chem. A* 2014, 2, 8893-8901 ("Wang 2014").

Williams, G. et al. TiO2-graphene nanocomposites. UV-assisted photocatalytic reduction of graphene oxide. *ACS Nano* 2008, 2, 1487-1491 ("Williams 2008").

Worsley, M. A. et al. Synthesis of Graphene Aerogel with High Electrical Conductivity. *J. Am. Chem. Soc.* 2010, 132, 14067-14069 ("Worsley 2010").

Wu, J. Damping and Sound Absorption Properties of Particle Reinforced Al Matrix Composite Foams. *Compos. Sci. Technol.* 2003, 63, 569-574 ("Wu 2003").

Wu, Y. et al. Three-Dimensionally Bonded Spongy Graphene Material with Super Compressive Elasticity and near-Zero Poisson's Ratio. *Nat. Commun.* 2015, 6, 6141 ("Wu 2015").

Xiang, Q. et al. Graphene-based semiconductor photocatalysts. *Chem. Soc. Rev.* 2012, 41, 782-796 ("Xiang 2012").

Xie, B. et al. Shape-Tailorable Graphene-Based Ultra-High-Rate Supercapacitor for Wearable Electronics. *ACS Nano* 2015, 9, 5636-5645 ("Xie 2015").

Xu, Y. et al. Self-Assembled Graphene Hydrogel Via a One-Step Hydrothermal Process. *ACS Nano* 2010, 4, 4324-4330 ("Xu 2010").

Yan, Z. et al. Rebar Graphene. *ACS Nano* 2014, 8, 5061-5068 ("Yan 2014").

Ye, S. et al. Deposition of Three-Dimensional Graphene Aerogel on Nickel Foam as a Binder-Free Supercapacitor Electrode. *ACS Appl. Mater. Inter.* 2013, 5, 7122-7129 ("Ye 2013").

Yuan, C. et al. Flexible Hybrid Paper Made of Monolayer $Co_3O_4$ Microsphere Arrays on RGO/CNTs and Their Application in Electrochemical Capacitors. *Adv. Funct. Mater.* 2012, 22, 2560-2566 ("Yuan 2012").

Zakhidov, A. A. et al. Carbon Structures With Three-Dimensional Periodicity at Optical Wavelengths. *Science*. 1998, 282, 897-901 ("Zakhidov 1998").

Zeng, Y. et al. One-Pot Synthesis of $Fe_3O_4$ Nanoprisms with Controlled Electrochemical Properties. *Chem. Commun.*, 2010, 46, 3920-3922 ("Zeng 2010").

Zhang, C. et al. Facile preparation of flower-like NiCo2O4/three dimensional graphene foam hybrid for high performance supercapacitor electrodes. *Carbon* 2015, 89, 328-339 ("Zhang 2015").

Zhang, H. et al. P25-Graphene Composite as a High Performance Photocatalyst. *ACS Nano* 2010, 4, 380-386 ("Zhang 2010").

Zhu, Y. W. et al. Carbon-Based Supercapacitors Produced by Activation of Graphene. *Science* 2011, 332, 1537-1541 ("Zhu 2011").

Zhu, Y. W. et al. Graphene and Graphene Oxide: Synthesis, Properties, and Applications. *Adv. Mater.* 2010, 22, 3906-3924 ("Zhu 2010").

What is claimed is:

1. A method of making a 3D graphene material comprising:
   (a) mixing a metal powder and a carbon source to form a metal and carbon source mixture, wherein
      (i) the carbon source is not graphene, graphene oxide, or a graphene derivative, and
      (ii) at least some of the metal powder is covered by the carbon source;
   (b) utilizing a 3D printing process to fuse the metal powder in the metal and carbon source mixture into a specific structure, wherein the 3D printing process comprises
      (i) depositing one or more layers of the metal and carbon source mixture,
      (ii) performing a first laser sintering step, wherein
         (A) the metal powder in the one or more layers of the metal and carbon source mixture is fused such that at least some of the metal power bonds together to form a laser sintered structure comprising metal,
      (iii) depositing an additional one or more layers of the metal and carbon source mixture on the laser sintered structure,
      (iv) performing an additional laser sintering step, wherein
         (A) the metal powder in the additional one or more layers of the metal and carbon source mixture is fused such that at least some of the metal power bonds together and bonds with the metal of the laser sintered structure to form a further laser sintered structure comprising the metal, and
      (v) repeating steps (iii)-(iv) utilizing the further laser sintered structure as the laser sintered structure, to form the specific structure comprising the metal;
   (c) using a laser to convert the carbon source in the metal and carbon source mixture into graphene to form a graphene and metal scaffold, wherein
      (i) during or after performing the first laser sintering step, using a laser to convert the carbon source in the one or more layers of the metal and carbon source mixture into first graphene that is on a surface and interface regions of the laser sintered structure,
      (ii) during or after performing the additional laser sintering step, using the laser to convert the carbon source in the additional one or more layers of the metal and carbon source mixture into additional graphene that is on a surface and interface regions of the further laser sintered structure,
      (iii) the graphene and metal scaffold comprises the specific structure and the graphene, wherein the graphene comprises the first graphene and the additional graphene, and
      (iv) the graphene is on a surface and interface regions of the specific structure; and
   (d) removing the metal from the graphene and metal scaffold to form the 3D graphene material.

2. The method of claim 1, wherein
   (a) the first laser sintering step is performed while performing the step of using the laser to convert the carbon source into the first graphene; and
   (b) the additional laser sintering step is performed while performing the step of using the laser to convert the carbon source into the additional graphene.

3. The method of claim 1, wherein the laser is set at a scanning speed of at least about 1000 mm/min.

4. The method of claim 1, wherein the laser is set at a power of at least 4 W.

5. The method of claim 1, wherein the metal powder comprises a metal is selected from a group consisting of Ni, Cu, Ni—Cu alloys, Ru, Ag, Fe, Co, Al, and combinations and alloys thereof.

6. The method of claim 1, wherein the metal powder comprise Ni.

7. The method of claim 1, wherein the metal powder has an average particle size in the range between about 100 nm and about 1 cm.

8. The method of claim 1, wherein the carbon source comprises a material selected from a group consisting of sucrose, polymethyl methacrylate, glucose, poly(phenylene sulfide), carbohydrates, poly(acrylonitrile), polysaccharides, polyimide, and combinations thereof.

9. The method of claim 1, wherein the carbon source comprises sucrose.

10. The method of claim 1, wherein weight ratio of the metal powder to the carbon source is between about 1:1 and 20:1.

11. The method of claim 1, wherein the 3D graphene material is selected from a group consisting of in-situ N-doped graphene foams, carbon nanotube/graphene composites, carbon fibers, carbon nanotube fibers, carbon nanoonions/graphene composites, phosphorene foams, 3D MX and/or $MX_2$ foams, and combinations thereof, wherein
   (a) M is selected from a group consisting of Mo, W, Bi, Hf, Ga, Ge, Ta, Sn, Zn, Cd, Pb, B, Nb, Zr, and combinations thereof, and
   (b) X is selected from a group consisting of S, N, Se, P, and combinations thereof.

12. The method of claim 1, wherein the 3D graphene material has a porosity of at least 98%.

13. The method of claim 1, wherein the 3D graphene material is a graphene foam.

14. The method of claim 1, wherein the 3D graphene material has an average pore diameter in the range between 1 nm and about 1 cm.

15. The method of claim 1, wherein the 3D graphene material comprises a surface area ranging from about 50 $m^2/g$ to about 2,500 $m^2/g$.

16. The method of claim 1, wherein the 3D graphene material has an electrical conductivity ranging from about 6.9 S/cm and about 10.5 D/cm.

17. The method of claim 1, wherein the 3D graphene material has a mechanical robustness that is at least about 11 kPa storage modulus.

18. The method of claim 1, wherein the 3D graphene material has a damping capacity of at least 0.05.

19. The method of claim 1, wherein the step of removing the metal to form the 3D graphene material comprises etching away the metal.

20. The method of claim 1, wherein the metal powder is at room temperature and the metal powder and the carbon source are converted into graphene sheets that cover the metal powder without preheating.

21. The method of claim 1, wherein the step of converting the carbon source into graphene sheets that cover the metal powder is performed in air.

22. The method of claim 1, wherein the step of converting the carbon source into graphene sheets that cover the metal powder is performed in an atmosphere of $H_2$, Ar, or both.

23. The method of claim 1 wherein the step of converting the carbon source into graphene sheets that cover the metal powder further comprises a step of heat treatment.

24. The method of claim 1, wherein the step of mixing the metal powder and the carbon source to form the metal and carbon source mixture comprises mixing the metal powder and the carbon source in water, and then removing the water to form the metal and carbon source mixture.

25. The method of claim 1, wherein
  (a) the carbon source is an organic polymer, and
  (b) the step of mixing the metal powder and the carbon source to form the metal and carbon source mixture comprises mixing the metal powder and the carbon source in a solvent, and then removing the solvent to form the metal and carbon source mixture.

26. A method comprising:
  (a) mixing a metal powder and a carbon source to form a metal and carbon source mixture, wherein
    (i) the carbon source is not graphene, graphene oxide, or a graphene derivative, and
    (ii) at least some of the metal powder is covered by the carbon source;
  (b) utilizing a 3D printing process to fuse the metal powder in the metal and carbon source mixture into a specific structure, wherein the 3D printing process comprises
    (i) depositing one or more layers of the metal and carbon source mixture,
    (ii) performing a first laser sintering step, wherein
      (A) the metal powder in the one or more layers of the metal and carbon source mixture is fused such that at least some of the metal power bonds together to form a laser sintered structure comprising metal,
    (iii) depositing an additional one or more layers of the metal and carbon source mixture on the laser sintered structure,
    (iv) performing an additional laser sintering step, wherein
      (A) the metal powder in the additional one or more layers of the metal and carbon source mixture is fused such that at least some of the metal power bonds together and bonds with the metal of the laser sintered structure to form a further laser sintered structure comprising the metal, and
    (v) repeating steps (iii)-(iv) utilizing the further laser sintered structure as the laser sintered structure, to form the specific structure comprising the metal;
  (c) using a laser to convert the carbon source in the metal and carbon source mixture into graphene to form a graphene and metal scaffold, wherein
    (i) during or after performing the first laser sintering step, using a laser to convert the carbon source in the one or more layers of the metal and carbon source mixture into first graphene that is on a surface and interface regions of the laser sintered structure,
    (ii) during or after performing the additional laser sintering step, using the laser to convert the carbon source in the additional one or more layers of the metal and carbon source mixture into additional graphene that is on a surface and interface regions of the further laser sintered structure,
    (iii) the graphene and metal scaffold comprises the specific structure and the graphene, wherein the graphene comprises the first graphene and the additional graphene, and
    (iv) the graphene is on a surface and interface regions of the specific structure; and
  (d) removing the metal from the graphene and metal scaffold to form 3D graphene material; and
  (e) incorporating the 3D graphene material into a device.

27. The method of claim 26, wherein the device is selected from is a group consisting of electrodes, battery electrodes, capacitors, supercapacitors, batteries, lithium batteries, lithium ion batteries, photovoltaic devices, photovoltaic cells, transistors, current collectors, fuel cell devices, water desalination devices, capacitive deionization devices, water-splitting devices, water-oil separation devices, water/gas purification devices, sensors, mechanical dampening devices, cell scaffolds for artificial wood, scaffolds for growth of bone or animal/human tissue in vivo or in vitro, scaffolds for neuronal growth in vitro or in vivo, and spinal cord regeneration scaffolds.

28. A method comprising:
  (a) mixing a metal powder and a carbon source to form a metal and carbon source mixture, wherein
    (i) the carbon source is not graphene, graphene oxide, or a graphene derivative, and
    (ii) at least some of the metal powder is covered by the carbon source;
  (b) utilizing a 3D printing process to fuse the metal powder in the metal and carbon source mixture into a specific structure, wherein the 3D printing process comprises
    (i) depositing one or more layers of the metal and carbon source mixture,
    (ii) performing a first laser sintering step, wherein
      (A) the metal powder in the one or more layers of the metal and carbon source mixture is fused such that at least some of the metal power bonds together to form a laser sintered structure comprising metal,
    (iii) depositing an additional one or more layers of the metal and carbon source mixture on the laser sintered structure,
    (iv) performing an additional laser sintering step, wherein
      (A) the metal powder in the additional one or more layers of the metal and carbon source mixture is fused such that at least some of the metal power bonds together and bonds with the metal of the laser sintered structure to form a further laser sintered structure comprising the metal, and
    (v) repeating steps (iii)-(iv) utilizing the further laser sintered structure as the laser sintered structure, to form the specific structure comprising the metal;
  (c) using a laser to convert the carbon source in the metal and carbon source mixture into graphene to form a graphene and metal scaffold, wherein
    (i) during or after performing the first laser sintering step, using a laser to convert the carbon source in the one or more layers of the metal and carbon source mixture into first graphene that is on a surface and interface regions of the laser sintered structure,
(ii) during or after performing the additional laser sintering step, using the laser to convert the carbon source in the additional one or more layers of the metal and carbon source mixture into additional graphene that is on a surface and interface regions of the further laser sintered structure,
(iii) the graphene and metal scaffold comprises the specific structure and the graphene, wherein the graphene comprises the first graphene and the additional graphene, and
(iv) the graphene is on a surface and interface regions of the specific structure;
(d) removing the metal from the graphene and metal scaffold to form 3D graphene material; and
(e) incorporating the 3D graphene material into an electrode.

29. The method of claim 28 further comprising incorporating the electrode into a device that is selected from a group consisting of capacitors, supercapacitors, batteries, lithium batteries, lithium ion batteries, photovoltaic devices, photovoltaic cells, transistors, current collectors, fuel cell devices, water desalination devices, capacitive deionization devices, water-splitting devices, water-oil separation devices, water/gas purification devices, sensors, and mechanical dampening devices.

30. The method of claim 28, wherein
(a) the first laser sintering step is performed while performing the step of using the laser to convert the carbon source into the first graphene; and
(b) the additional laser sintering step is performed while performing the step of using the laser to convert the carbon source into the additional graphene.

31. The method of claim 26, wherein
(a) the first laser sintering step is performed while performing the step of using the laser to convert the carbon source into the first graphene; and
(b) the additional laser sintering step is performed while performing the step of using the laser to convert the carbon source into the additional graphene.

* * * * *